United States Patent [19]

Zalenski

[11] Patent Number: 5,101,487

[45] Date of Patent: Mar. 31, 1992

[54] METHOD FOR RETRIEVING COMPRESSED DATA FROM A MEMORY STORING A LOOK-UP TABLE

[75] Inventor: Thomas Zalenski, Killingworth, Conn.

[73] Assignee: Summagraphics Corporation, Seymour, Conn.

[21] Appl. No.: 352,493

[22] Filed: May 16, 1989

Related U.S. Application Data

[62] Division of Ser. No. 860,231, May 6, 1986, Pat. No. 4,857,903.

[51] Int. Cl.$^5$ .......................... G06F 7/00; G06F 12/04
[52] U.S. Cl. .................. 395/425; 364/236.8; 364/256.4; 364/259.8; 364/260.6; 364/929.12; 364/947.2; 364/951.3; 364/DIG. 2
[58] Field of Search ... 364/200 MS File, 900 MS File

[56] References Cited

U.S. PATENT DOCUMENTS

| | | | |
|---|---|---|---|
| 3,541,521 | 1/1970 | Koster | 364/521 |
| 3,541,541 | 3/1970 | Engelbart | 340/710 |
| 3,586,396 | 6/1971 | Barr | 384/49 |
| 3,892,963 | 7/1975 | Hawley | 250/231.16 |
| 4,142,180 | 2/1979 | Burns | 340/709 |
| 4,303,914 | 12/1981 | Page | 340/706 |
| 4,306,232 | 12/1981 | Burns | 340/706 |
| 4,409,479 | 10/1983 | Sprague | 250/237 G |
| 4,521,772 | 6/1985 | Lyon | 360/710 |
| 4,691,199 | 9/1987 | Shell | 360/710 |
| 4,926,314 | 5/1990 | Dhuey | 364/200 |

Primary Examiner—Thomas C. Lee
Assistant Examiner—Ayni Mohamed
Attorney, Agent, or Firm—Rosen, Dainow & Jacobs

[57] ABSTRACT

A method for storing a k-bit output value for each of a plurality of m-bit input values in a memory having an n-bit word stored at each of $2^n$ n-bit addresses, wherein m, n and k are positive integers, $m > n > k$ and $m - n \geq k$, the method comprising the steps of storing a first k-bit output value corresponding to a first m-bit input value at a first n-bit address in the memory, and storing the $2n - m$ most significant bits of the first n-bit address at a second n-bit address, the stored $2n - m$ most significant bits of the first n-bit address occupying the $2n - m$ most significant bits at the second n-bit address, the first and second n-bit addresses being selected such that the n most significant bits of the first m-bit input value correspond to the n bits making up the second n-bit address and the $m - n$ least significant bits of the first m-bit input value correspond to the $m - n$ least significant bits making up the first n-bit address.

5 Claims, 10 Drawing Sheets

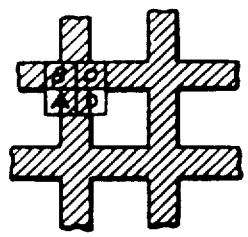 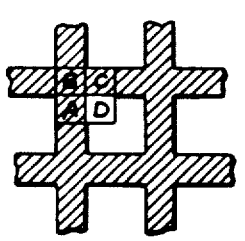 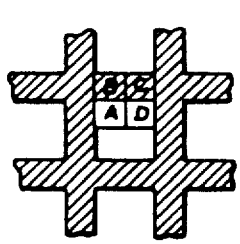 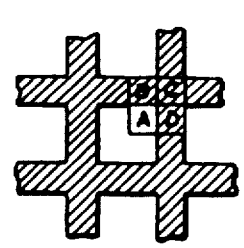
*FIG. 6a*   *FIG. 6b*   *FIG. 6c*   *FIG. 6d*
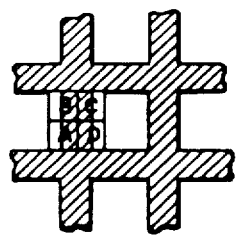 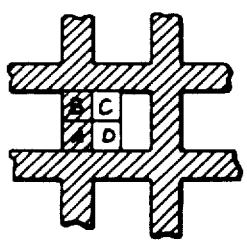 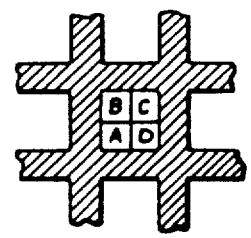 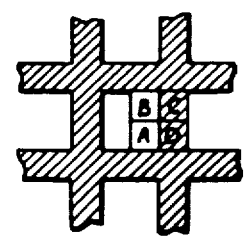
*FIG. 6e*   *FIG. 6f*   *FIG. 6g*   *FIG. 6h*
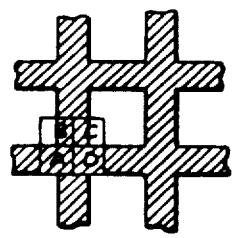 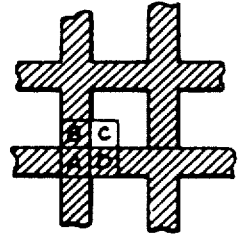 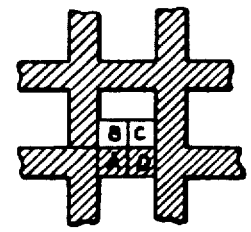 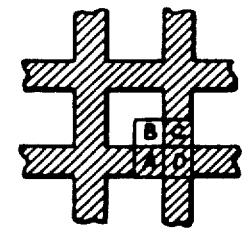
*FIG. 6i*   *FIG. 6j*   *FIG. 6k*   *FIG. 6l*
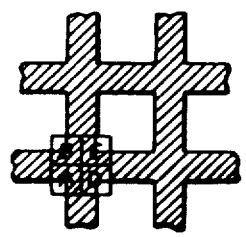 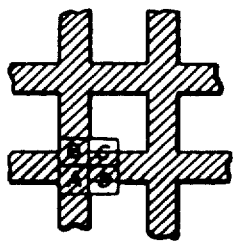 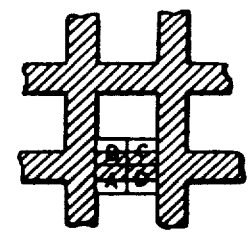 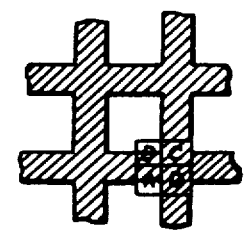
*FIG. 6m*   *FIG. 6n*   *FIG. 6p*   *FIG. 6q*

30 = UNUSEABLE
31 = AMBIGUOUS

METHOD FOR RETRIEVING COMPRESSED DATA FROM A MEMORY STORING A LOOK-UP TABLE

This is a division of application Ser. No. 860,231, filed May 6, 1986, now U.S. Pat. No. 4,857,903.

TECHNICAL FIELD

The present invention relates to the field of controlling the movement of a cursor on a cathode ray tube. In particular, it relates to such control through the use of an optical transducer having degraded optical components for converting translational movement of that transducer over a surface to corresponding X and Y axis signals.

BACKGROUND OF THE INVENTION

As less highly trained and technically competent persons use computers it has become more desirable to simplify their operation and make the computer "user friendly". One successful technique has been to provide the user choices on a cathode ray tube ("CRT") and to have the user manipulate a cursor to select one of the choices. Of the known techniques one of the most popular is cursor control through a "mouse". The cursor is a dot or line on the CRT which can be moved under the control of the user. A "mouse" is a small box or housing which the user can freely move over a horizontal surface, such as a desk. The cursor generally follows the movements of the mouse. That is, if the mouse is moved horizontally, the cursor moves horizontally.

Early mice were mechanical. Illustrative of this type of mouse is that shown in Hawley U.S. Pat. No. 3,892,963. The movable housing carries two position wheels which rotate about axes which are perpendicular.

One wheel has its axis aligned with the longitudinal axis of the housing and the other wheel has its axis aligned along the transverse axis of the housing. Each axis is connected to an optical encoder, which sends signals to the computer to control cursor movement on one axis of the CRT. The cursor translates on the CRT along a vector which forms an angle to the vertical-up direction on the CRT equal to the angle between the vector that is aligned with the motion of the mouse and the vector aligned with the longitudinal-forward axis of the mouse. Thus, the cursor follows the movement that the mouse makes with respect to itself and is independent of the orientation of the mouse with respect to the surface upon which it translates. Other mechanical mice are taught by Engelbart U.S. Pat. No. 3,541,541; Koster U.S. Pat. No. 3,541,521; and Page U.S. Pat. No. 4,303,914.

These mechanical mice are of course limited by various mechanical constraints. For example, satisfactory frictional contact has to exist between the horizontal surface and the position wheels. Furthermore, manufacturing processes are relatively expensive because of the required mechanical tolerances. Also mechanical mice are subject to mechanical wear and can be easily damaged by dropping.

Meyer U.S. Pat. No. 3,297,879, discloses one encoder that overcomes many of these disadvantages. In one embodiment of Meyer, a stationary grid, comprising mutually orthogonal sets of parallel nonreflective bands, is formed on a reflective surface. A light source and four photocells are incorporated into a movable reading head. The light source illuminates the grid and the photocells detect reflected light from the grid. A plate having four sets of transmissive slits, two of which are aligned with each set of parallel, non-reflective bands, is positioned in front of the photocells, each photocell being associated with one set of slits. The slits in each of the two sets of slits associated with each set of bands are aligned out of phase. During movement of the reading head the amount of light reflected by the reflective space between the nonreflective bands and received by each photocell via the intervening slits oscillates between dark and light, causing each photocell to output a pulsating signal. The number of pulsations depends upon the number of bands which have been crossed and thus is indicative of the distance traveled. Moreover, since the slits are out of phase, the movement of the reading head in one direction will cause the output of one of the two correspondingly aligned photocells to precede the other by a quarter cycle and movement in the opposite direction will cause the other photocell to precede the one by a quarter cycle. Thus, the encoder is direction sensitive. Meyer also produces two signals, each representing one orthogonal direction. However, because Meyer's housing must maintain a given angular relation with the surface, the housing in Meyer must be physically constrained. Accordingly, Meyer mounts his housing on a four-bar parallel linkage or on an X-Y set of orthogonal parallel guides. Furthermore, Meyer has the disadvantage of requiring both a surface and a screen having optically readable markings.

Grossimon U.S. Pat. No. 3,410,956, discloses a digital encoder for detecting motion in a single direction comprising a transducer head and grid plate configuration (see FIG. 7a). In this embodiment, a transducer head comprising three separate photocells 406, 408, 410 is mounted above the grid 400. The grid comprises alternate translucent sectors 401 and opaque sectors 402, sectors 402 being twice as wide as sectors 401. The "active" areas of the photocells are staggered as depicted in FIG. 7a. These active areas have a width equal to the width of the translucent sectors. This transducer provides the necessary information for the determination of the magnitude and direction of changes in position of the transducer head. The magnitude of the change in position is proportional to the number of times the illumination (i.e. photoactivation) is shifted from one photocell to another. As is the case in the mouse of the present application, the direction of motion in the FIG. 7a embodiment of the Grossimon et al. reference is determined by the order of illumination. However, in order to detect motion in both the X and Y directions, it is necessary according to Grossimon et al. to provide a second system for use in connection with the system of FIG. 7a. Thus, the Grossimon et al. reference requires two separate perpendicular grids of parallel lines.

Kirsch U.S. Pat. No. 4,390,873 ("Kirsch I") shows an attempt to emulate optically the prior art mechanical mice. Kirsch I comprises a mouse housing having a light source and a four-quadrant photodetector, a surface having an optically contrasting checkerboard pattern having various assigned position states over which the mouse housing translates, and a logic circuit having a read only memory. Each of the squares in the checkerboard pattern defines a position state in two directions at the same location. As the housing translates over the surface the logic interprets the output from all of the four detectors, refers to the read only memory to determine the position state at which the housing is located, and produces an output signal to represent the housing's position in relation to the surface.

Although the Kirsch I mouse is not physically restrained, it suffers from many of the same disadvantages which attend other prior art optical mouses. Because of its surface pattern and the assignment of position states to indicia thereon, the Kirsch I mouse is limited to determining movement in only two directions. The Kirsch I mouse cannot determine the direction of movement along the checkerboard square diagonals due to the ambiguous detector outputs at opposite corners of a square. Also, the Kirsch I mouse cannot operate when rotated 45° relative to the grid surface since the microprocessor is programmed to recognize only changes in position which result in two quadrants of the four-quad detector changing their output.

Thus, unlike the prior art mechanical mice, the Kirsch I mouse is sensitive to its orientation with respect to the surface pattern. A rotation of the mouse greater than 45° in either direction from the nominal pattern orientation affects the decoded signal.

Another optical mouse is shown in Kirsch U.S. Pat. No. 4,364,035 (Kirsch II). It discloses a read head employing a movable detector which slides over a surface having two parallel sets of perpendicular lines, each set being of a different color. The detector includes a light source which emits light of each color in an alternating sequence. Four light detectors are positioned for receiving light reflected from the surface. By clocking the emission of the respectively colored light and the detector output signal, electrical outputs are obtained representing reflection from the respective sets of colored lines. Such signals are used to establish line crossings, thereby deriving a position signal for the cursor.

The Kirsch II mouse also has the disadvantage that the output is indicative of mouse housing movement with respect to the surface pattern. Thus, it too is sensitive to surface orientation. Furthermore, the use of two colors results in a mouse system that is more complicated than is the case in a "single color" system. Differently colored marks must be applied to the surface, two light sources must be incorporated in the system, and clocking means must be provided for activating the respective light sources in alternating sequences in accordance with the decoding technique. Also, since an acceptable two-color grid requires the use of precisely controlled amounts of exotic inks, the manufacture of the grid becomes a difficult and expensive process.

Co-pending U.S. patent application Ser. No. 582,281 to Matthews and assigned to the assignee of the present invention discloses an optical mouse having a four-quad detector and a grid pattern of lines which form squares therebetween having a length of the side equal to twice the width of a line. As disclosed below, the present invention utilizes the same detector and grid pattern. The Matthews mouse has a shortcoming in that the detector outputs do not accurately reflect the geometry of the grid pattern when the optical lens of the mouse is non-ideal, i.e. degraded, the use of an ideal lens being commercially unacceptable. The Matthews mouse does not disclose the input of three different threshold voltages to the comparators for obtaining four-level resolution for compensation of optical distortion. Furthermore, the Matthews mouse does not disclose means for resolving the ambiguous straddle position of the mouse using a look-ahead technique with data compression.

Another pertinent prior art reference is Bilbrey et al. U.S. Pat. No. 4,543,571, which discloses an opto-mechanical mouse. A four-quad photodetector is optically coupled to a non-reflective grid of lines applied to a reflective surface for determining the distance of mouse travel by the counting of line crossings. The Bilbrey et al. mouse requires a separate mechanical system for determining direction.

Other electro-optical mouse systems of interest are disclosed in Kirsch U.S. Pat. No. 4,546,347 and Lyon U.S. Pat. No. 4,521,772.

SUMMARY OF THE INVENTION

Accordingly, it is an object of the present invention to provide an optical mouse.

It is a further object of the present invention to provide such a mouse that employs a single light source.

It is a further object of the present invention to provide such a mouse in which the mouse output is relative to mouse movement only and independent of the relative orientation of the surface upon which the mouse translates.

It is another object to provide such a mouse which can determine movement in all directions regardless of its orientation with respect to the surface pattern over which it translates.

It is another object to provide such a mouse having a reflective surface on which a pattern can be applied using ordinary inks or pigments.

It is a further object of the present invention to provide a mouse that does not utilize a quadrature decoding technique.

It is a further object of the present invention to provide such a mouse that can determine the direction of its movement with respect to itself and independent of its orientation to the pattern over which it translates.

It is a further object of the present invention to provide a mouse in which distortion due to the use of a degraded optical lens can be compensated.

It is a further object of the present invention to provide a mouse in which the detector outputs produced when the mouse occupies predetermined ambiguous straddle positions relative to the grid is resolved using a look-ahead technique and data compression.

It is a further object of the present invention to provide a mouse in which changes in the detector outputs due to jitter are not processed.

It is a further object of the present invention to provide a means for controlling the position of a cursor which is inexpensive to manufacture, easy to operate, and mechanically rugged.

Also, it is an object of the present invention to provide a means for controlling the position of a cursor which does not have a slit plate interposed between the photosensitive means and the grid.

In the present invention a light source emits light, which light is reflected from a reflective surface onto four photodetectors arranged in a square pattern. The light source and photodetectors are rigidly fixed inside the housing, which is movable over the reflective surface. The pattern on the reflective surface may be a grid of orthogonal or hexagonal lines or curvilinear segments (or a matrix of squares, hexagons, or circles, respectively). This pattern is optically imaged onto the four photodetectors such that the width of a line segment is optically magnified to substantially equal the distance between the centers of adjacent photodetectors. During movement of the housing, the magnified image of the illuminated pattern moves across the four detectors. As a result of this movement, the photodetectors sense the intensity of light reflected from the grid and generate voltage signals proportional to the changing intensity levels.

The voltage signals output by the photodetectors are input to four comparators. Each comparator also receives a threshold voltage from a digital-to-analog converter connected to the microprocessor. The threshold voltage is varied in accordance with a predetermined sequence of values during each sampling cycle. Each comparator outputs a predetermined binary digit if the voltage signal from the respective photodetector quadrant exceeds the threshold voltage. The preferred embodiment of the invention can determine whether the photodetector quadrant is receiving reflected light having an intensity level falling in one of four ranges. For each quadrant, the microprocessor receives a two-bit code indicating in which one of the four ranges the intensity level of the quadrant lies. The four two-bit codes form an eight-bit code which is hereinafter referred to as the intensity code. This eight-bit intensity code is then further processed to determine the position of the mouse relative to the gird pattern. In particular, the eight-bit intensity code is translated into a two-bit X code and a two-bit Y code representing the approximate location of the mouse relative to one indicium of the respective grid pattern. These X and Y codes are then processed to obtain signals representing unit changes in mouse position in the X and/or Y directions. Distance information is obtained by counting signals representing unit changes as a function of direction. The X-Y distance and direction information is output to drive a cursor, the position of which is changed in response to the output information.

DETAILED DESCRIPTION OF THE DRAWINGS

The optical mouse of the present invention will be described in detail with reference to the following drawings:

FIGS. 6a to 6q are diagrammatic views of a portion of the grid of FIG. 3a, showing 16 positions of the photodetectors relative to the grid pattern, these positions corresponding to the 16 pre-stored combinations of X and Y codes.

DETAILED DESCRIPTION OF THE PREFERRED EMBODIMENT

Figure 1:
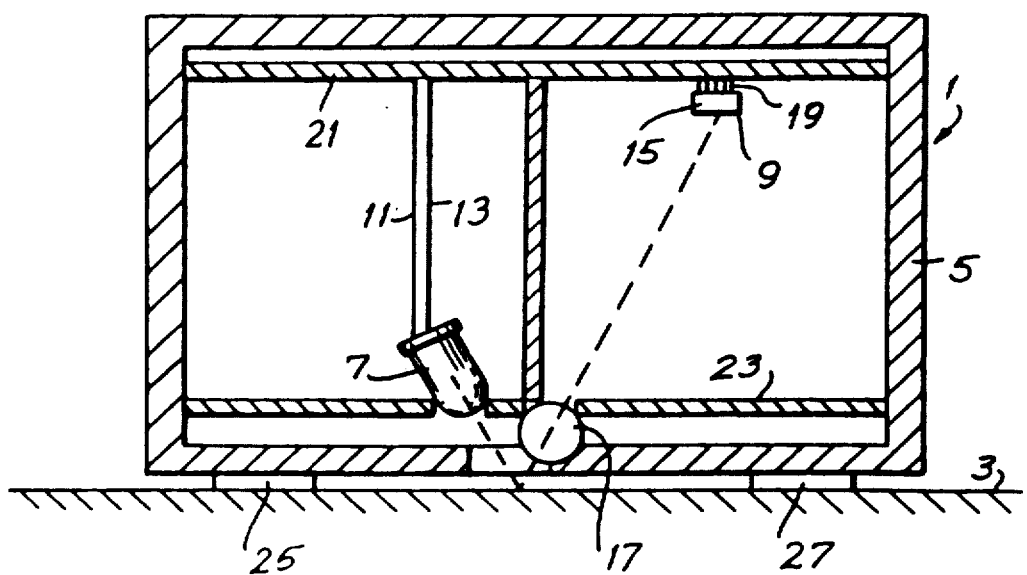
FIG. 1 is a side sectional view of one preferred embodiment of the electro-optical mouse of the invention.

FIG. 1 shows the preferred embodiment of the position control system 1, which is movable over surface 3. The system 1 comprises a housing 5, a light source 7 and a detecting means 9. The light source 7 is powered through conductors 11 and 13. Detecting means 9 includes photodetector array 15, which receives light reflected from surface and transmitted through imaging lens 17. Conductors 19 feed the signal from array 15. Light source 7 and detecting means 9 are each rigidly fixed relative to housing 5 by fastening means affixed to internal shelves 21 and 23.

Housing 5 is provided with low-friction spacers 25 and 27 which elevate the body of the housing, including lens 17 and detecting means 9, above surface 3 by the predetermined distance required to obtain proper focusing of reflected light on the photodetector array. Spacers 25 and 27 may be made of a material that will minimize wear of surface 3 and enable the housing 5 to slide easily over that surface.

In the illustrated embodiment source 7 is a light-emitting diode (LED). Light source 7 emits light that lies preferably in either the red or the infrared portions of the spectrum. Light shield 29 prevents light source 7 from illuminating detecting means 9 directly. Ideally, source 7 is mounted so that it is positioned close to surface 3. This will ensure that light emitted by source 7 will impinge on surface 3 at a relatively narrow spot with a higher light intensity than if positioned further away.

Figure 2:
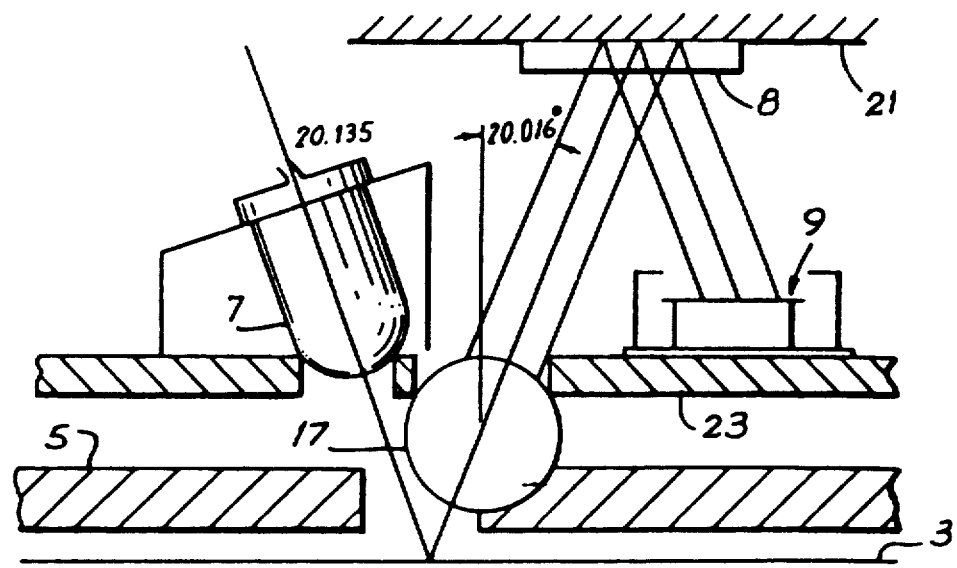
FIG. 2 is a side sectional view of another preferred embodiment of the invention, showing an alternative arrangement of the optical elements.

An alternative preferred embodiment of the optical arrangement can be seen in FIG. 2. Similar elements have the same reference numerals in FIGS. 1 and 2. The embodiment depicted in FIG. 2 differs from that of FIG. 1 in that after the light reflected from surface passes through lens 17, it is reflected toward the detecting means 9 by a mirror 8 attached to internal shelf 21.

The photodetector array 15 comprises four photodetectors, hereinafter referred to as detectors A through D inclusive. Photodetector array 15 may be a standard four-quadrant photodetector. As clearly shown in FIGS. 6, the detectors comprises the four quadrants of a square photodetector array. Each detector responds independently when radiant energy impinges on its surface area by outputting a voltage proportional to the intensity of the impinging radiant energy.

Figure 3A:
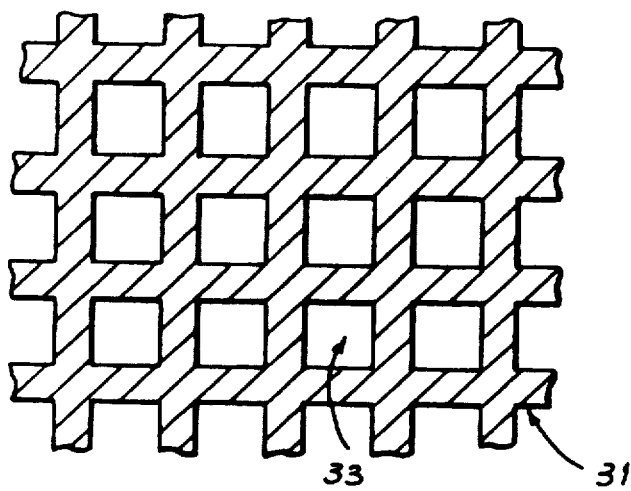
FIGS. 3a to 3c are views of portions of possible grid patterns for use in the present invention.
Figure 3B:
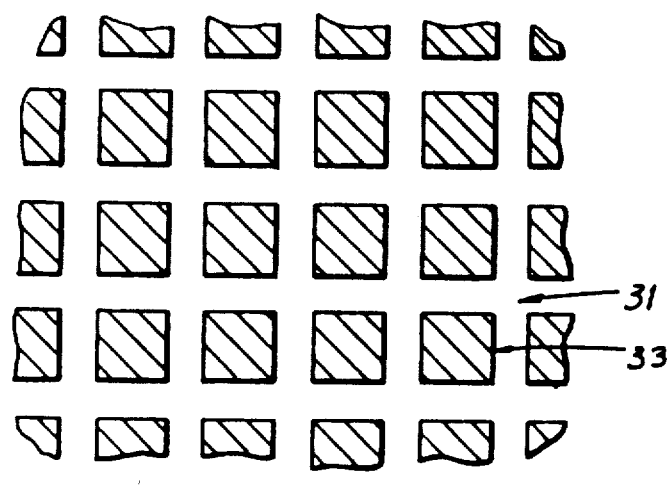
Figure 3C:
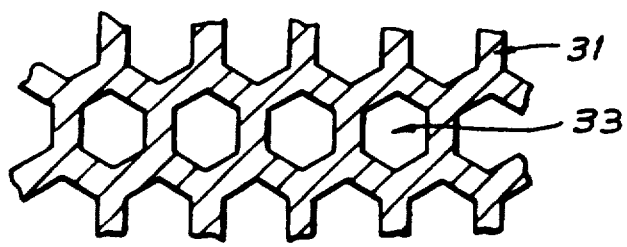

FIGS. 3a and 3b show two possible embodiments of the optically contrasting areas of surface 3. These optically contrasting areas can be applied through conventional printing techniques. Both line segments 31 and surface areas 33 can be made of ordinary materials but of contrasting colors. For example, white or light-colored paper having black line segments printed thereon is suitable. Also, white or light-colored paper having black surfaces printed thereon could be used (see FIG. 3c). Alternatively, a sheet of transparent photographic film with black line segments spaced thereon can be placed on a reflective surface. Obviously a sheet of transparent photographic film with black surface areas spaced therein could alternatively be placed on such a reflective surface. In all embodiments each line segment has a width equal to one arbitrary unit and each square area has sides with a length equal to two arbitrary units.

In the embodiment of FIG. 3b line segments 31 define hexagonal areas 33. As will be evident to one skilled in the art, many repetitive patterns are suitable and the two illustrated in FIGS. 3a and 3b are merely illustrative. Indeed, surface areas 33 may be circular.

When light is emitted by source 7 and reflected by surface 3, the optically contrasting pattern of segments 31 and surface areas 33 is optically imaged onto the detectors A through D of the photodetector array 15. The imaging lens 17 magnifies the image of the surface so that the width of a segment 31 is magnified to approximately equal the distance between centers of detector quadrants when the image impinges on the detector array 15. For example, if segments 31 have a width of 0.01 inch and the spacing between quadrant centers is 0.05 inch, then a magnification of 5× would be required.

In practice, when the photodetector 15 detects reflected radiant energy from the grid pattern 31, 33 of FIG. 3a, the photodetector "sees" the pattern shown in FIG. 3d due to the fact that the optical lens is non-ideal. In other words, the grid pattern of FIG. 3d represents the view as seen by the photodetector, whereas the grid pattern of FIG. 3a represents the view as seen by the human eye. In effect, the "view" of the grid pattern is distorted as the result of passage of the radiant energy through a non-ideal, i.e. degraded, lens. As will be discussed in detail below, the optical mouse of the present invention is provided with tables of data which serve to compensate for this distortion, enabling accurate position determination.

STRUCTURE OF THE PREFERRED EMBODIMENT

Figure 5:
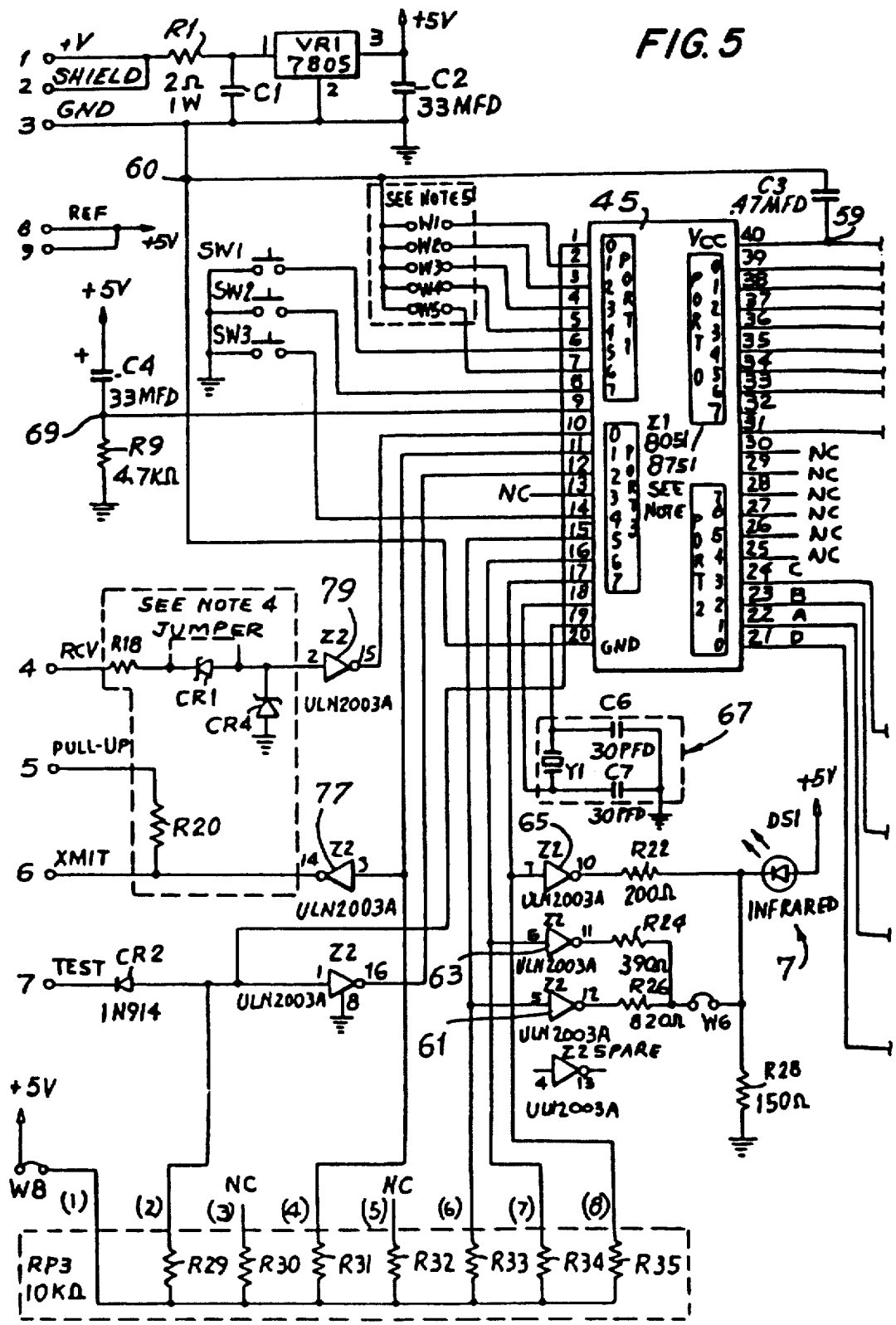
FIG. 5 is a diagram of the circuitry used in the mouse system of the present invention.
Figure 5:
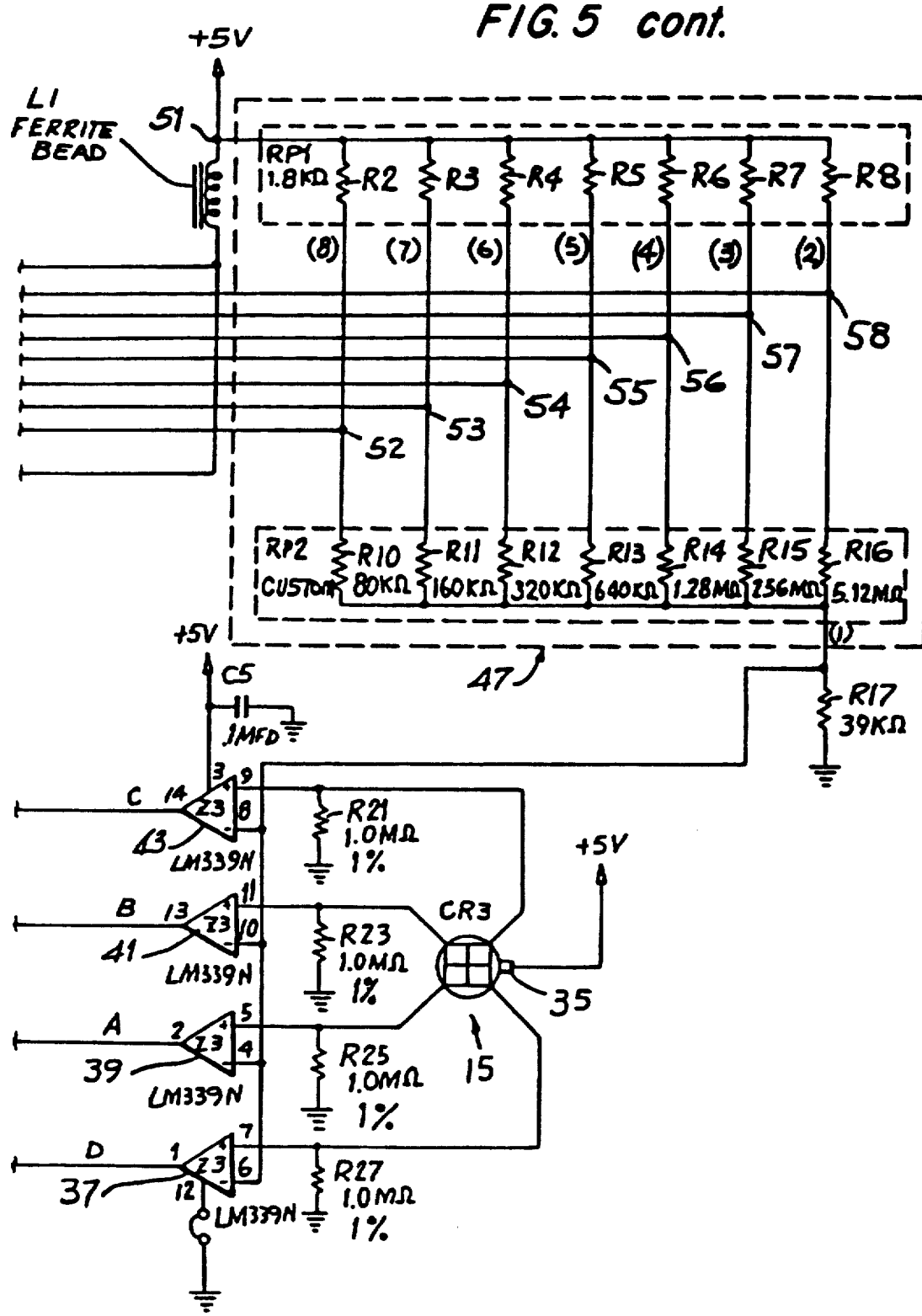

Before describing the operation of the invention, the circuitry of the preferred embodiment as shown in FIG. 5 will be described in detail.

The common cathode 35 of photodetector array 15 is connected to a +5-volt power supply (not shown). The anodes of detectors A through D are respectively electrically connected to the positive input ports of the corresponding comparators 37, 39, 41 and 43. These comparators could each be of the LM339N type. Each comparator has two input ports and an output port. The output ports of these comparators are respectively connected to pins 21 through 24 of microprocessor 45. The microprocessor is preferably of the 8051/8751 type. Resistors R21, R23, R25 and R27 are respectively connected to junctions lying between the positive input ports of the comparators and the anodes of the photodetector. These resistors are connected to ground and each have a resistance of 1.0M in the preferred embodiment. The negative input ports of comparators 37, 39, 41 and 43 are connected in common to the output of digital-to-analog converter 47.

The digital-to-analog converter comprises an array of resistors R2–R8 and R10–R16 connected across a pair of junctions 49 and 51. The array comprises pairs of resistors connected in series (R2/R10, . . . R8/R16), with the seven pairs of resistors in turn being connected in parallel across the junctions 49, 51. The junctions 52–58 respectively arranged between the pairs of series-connected resistors are in turn respectively electrically connected to pins 33–39 of microprocessor 45. Junction 49 is connected to ground by way of resistor R17 (39 k) as well as to the negative input ports of comparators 37, 39, 41 and 43, and junction 51 is connected to a +5-volt power supply. Pin 31 of the microprocessor is connected to junction 51 by way of ferrite bead L1, as is pin 40.

The microprocessor 45 is electrically connected to light source 7 by way of inverters 61, 63 and 65 and respective resistors R26, R24 and R22. The input ports of inverters 61, 63 and 65 are respectively connected to pins 15, 16 and 17 of the microprocessor. The light source 7 is preferably an infrared light-emitting diode (type DS1). Light source 7 and resistor R28 (150) are series-connected across a +5-volt power supply. Inverters 61, 63 and 65 are respectively biased by resistors R33, R34, and R35.

Light source 7 is controlled by microcomputer 45 through inverters 61, 63 and 65. As described in detail in the copending U.S. patent application Ser. No. 06/909,829, now U.S. Pat. No. 4,807,166, the light-emitting diode 7 can emit any one of eight possible light intensities depending on the three-bit command output by microprocessor 45 at ports 15–17.

The clock 67 is connected to pins 18 and 19 of microprocessor 45. The voltage regulator 62 is electrically connected to junction 60, which is in turn connected to pin 20 (GND) of microprocessor 45 and to junction 59 by way of capacitor C3. Junction 59 is electrically connected to pin 40 (VCC).

The receive (RCV) and transmit (XMIT) terminals, which are connected to the host, are operatively coupled to pins 10 and 11 respectively of microprocessor 45 by way of inverters 79 and 77 respectively.

The reset terminal (i.e. pin 9) of microprocessor 45 is connected to junction 69. A capacitor C4 and resistor R9 are series-connected across a +5-volt source, with junction 69 situated between the capacitor and resistor.

OPERATION OF THE PREFERRED EMBODIMENT

During operation, housing 5 is gripped by the operator's hand and moved in any direction by sliding over the surface 3. Source 7 is positioned so that the emitted light impinges on surface 3. The light is then reflected if it impinges on reflective areas 33 or is absorbed if it impinges on non-reflective line segments 31. Detecting means 9 is positioned so that light emitted by source 7 and reflected by areas 33 is then detected by photodetector array 15.

Each detector of array 15 detects light independently, outputting a voltage signal proportional to the amount of light impinging on its surface. Detector A outputs a signal to comparator 37, detector B to comparator 39, detector C to comparator 41, and detector D to comparator 43. Each comparator switches when the output voltage of the corresponding photodetector crosses the respective threshold voltage input from the digital-to-analog converter 47. The output ports of the comparators 37, 39, 41, 43 are connected to the microprocessor 45, which reads the output pattern at a regular rate. Each comparator output will either be a voltage signal representing that the respective detector output voltage is greater than or equal to the threshold voltage or a voltage signal representing that the respective detector output voltage is less than the threshold voltage. Thus, the output signal from each comparator has one of two voltage levels, which voltage levels the microprocessor treats as binary signals, e.g. "1" or "0". These binary signals are processed to obtain information regarding the movement of the mouse relative to the grid pattern as reflected in the varying outputs of the detectors. For each sampling cycle, the microprocessor receives two bits from each comparator, thereby forming the eight-bit intensity code. The details of the thresholding procedure will be discussed further below.

FIGS. 6b–6d, 6f–6h and 6j–6l depict the so-called "movement legal" positions of the optical mouse relative to the grid pattern. There are a total of nine possible "movement legal" positions for each indicium. FIGS. 6b, 6c and 6d show movement of the mouse from left to right. The movement of the mouse from the position in FIG. 6b to the position in FIG. 6c constitutes a boundary crossing, i.e. detector A crosses the boundary between a first non-reflective line segment 31, and a first reflective surface area 33'. The movement of the mouse from the position in FIG. 6c to the position in FIG. 6d constitutes another boundary crossing, i.e. detector D crosses the boundary between the first reflective surface area and a second non-reflective line segment. The movement of the mouse from the position in FIG. 6d to the position in FIG. 6b also constitutes a boundary crossing, i.e. detectors A and D both cross boundaries—detector A crossing from the first reflective surface area to the second non-reflective line segment and detector D crossing from the second non-reflective line segment to a second reflective surface area. Similarly, the movement of the mouse from the position in FIG. 6b to the position in FIG. 6f constitutes a boundary crossing, and so forth for each of the rows and columns depicted in FIGS. 6b–6d, 6f–6h and 6j–6l.

The movement between "movement legal" positions, i.e. the boundary crossings, are indicated by changes in the photodetector output voltages. These output voltages are processed by the circuitry of FIG. 5 to determine the direction of each boundary crossing and then count up or down by unity for each boundary crossing. The running count represents the absolute position of the mouse relative to a starting position.

Each of the positions depicted in FIGS. 6 is assigned a corresponding two-bit X code and a corresponding two-bit Y code. The X codes differ by only one bit for horizontally adjacent positions in FIGS. 6, while the Y codes differ by only one bit for vertically adjacent positions. FIGS. 6a, 6e, 6i and 6m show the sequence of positions during travel of the photodetector "view" along a vertical line. FIGS. 6m–6q shown the sequence of positions during travel along a horizontal line. Hereinafter, this travel of the photodetector "view", whereby at least two adjacent quadrant lie over a boundary, will hereinafter be referred to as "riding". The condition wherein the "view" of a quadrant overlies a boundary will hereinafter be referred to as "straddling."

One problem which the present invention overcomes is that the photodetector output voltages are ambiguous when the photodetector is sensing the square areas indicated by A-D in FIGS. 6e and 6p. The output voltages are ambiguous in the sense that they are identical for the two straddle positions respectively shown in FIGS. 6e and 6p. Therefore, it is not possible to determine which of the two positions is being occupied by the mouse without further processing of the photodetector output voltages. Based on the photodetector output voltages alone, the microprocessor 45 can only determine that the mouse is in one of the two positions. Hence the photodetector output voltages are ambiguous.

This problem is overcome in accordance with the invention by using a look-ahead technique whereby the current position is determined by comparing the future, i.e. new or next, position of the mouse with the past, i.e. old or previous, position. This look-ahead technique will be described in detail hereinafter.

Figure 4:
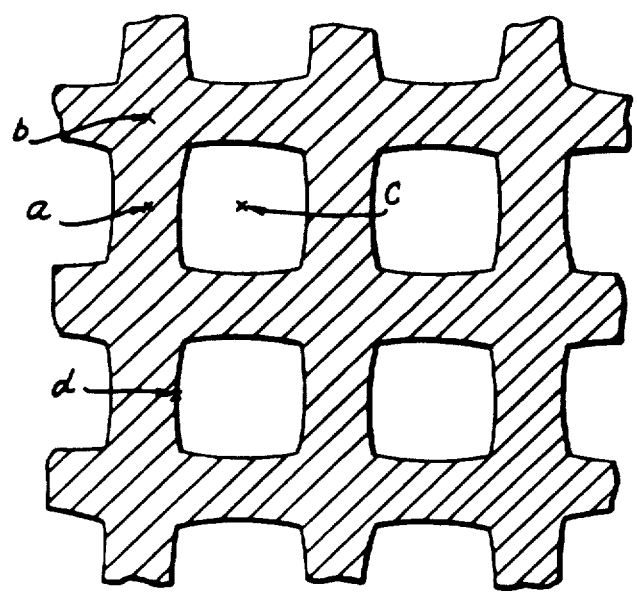
FIG. 4 is a view of the grid pattern of FIG. 3a as seen by the photodetectors of the optical mouse when degraded optical components are used.

Another problem which the optical mouse of the invention has been designed to overcome is that the photodetector output voltages produced using the grid pattern of FIGS. 3a and 3b do not conform identically to the geometric grid pattern as seen by the human eye. As mentioned previously, the use of non-ideal optical components in the mouse distorts the geometric pattern as viewed by the mouse. The geometric pattern when "seen" by the photodetector appears as shown in FIG. 4. This problem is solved by increasing the resolution of the mouse using a non-linear thresholding technique.

Figure 7:
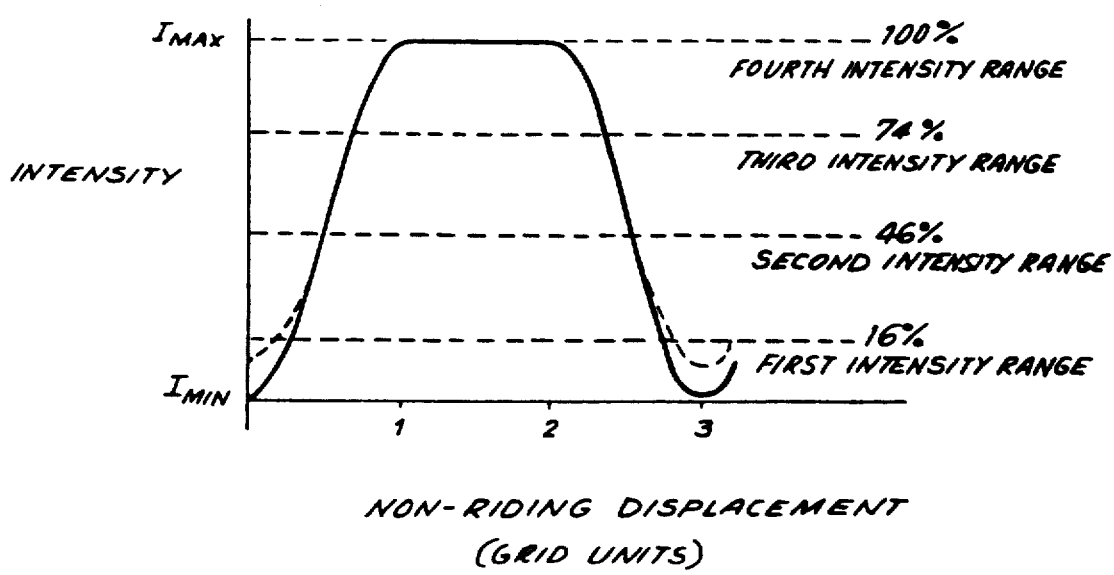
FIG. 7 is a graphical representation of the intensity values of a single quadrant of the four-quad photodetector during "non-riding" unidirectional movement.

Referring to FIG. 7, the novel thresholding technique of the invention will be described. As mentioned previously, prior art optical mice provided two-level resolution of the light detected, i.e. detector output voltage was compared to a single threshold voltage and binary data was obtained depending on whether the detector output voltage was greater than/equal to the threshold voltage or less than the threshold voltage. The disadvantage of such two-level resolution is that it filters out information which could otherwise be used to determine intermediate positions of the optical mouse, i.e. the positions between the so-called "movement legal" positions.

The mouse in accordance with the invention achieves a four-level resolution by utilizing a thresholding technique whereby the threshold voltage supplied to comparators 37, 39, 41 and 43 can take on three possible values for each quadrant. These values are unique for each quadrant and are determined in accordance with the calibration procedure described hereinafter. The variations in the exact threshold levels for respective quadrants reflect the fact that differences arise in the characteristics of each quadrant during the manufacturing process. In other words, no two quadrants are identical. Since each of the four quadrants will have three threshold levels associated therewith, there will be a total of 12 threshold levels stored in the internal random access memory of the microprocessor. These threshold levels are obtained as the result of the calibration. However, in order to determine in which of the four intensity ranges a quadrant voltage output lies, it is only necessary to sample the comparator outputs for two of the three threshold levels for that quadrant. Thus, the threshold voltages for each quadrant are output to the comparators in accordance with the following pattern (a) the microprocessor 45 outputs the digital value corresponding to the intermediate threshold level to the D/A converter 47; (b) if the corresponding comparator output indicates that the quadrant output voltage is less than the intermediate threshold voltage, then the microprocessor next outputs the digital value corresponding to the lowest threshold level; (c) if the corresponding comparator output indicates that the quadrant output voltage is equal to or greater than the intermediate threshold voltage, then the microprocessor next outputs the digital value corresponding to the highest threshold level. Thus, the intensity range of the quadrant output can be determined by a two-stage three-level thresholding technique, wherein the threshold voltage which is applied during the second thresholding step for each quadrant will depend on the results of the first thresholding step.

The threshold voltages output by digital-to-analog converter 47 correspond to the threshold intensity levels shown in the graph of FIG. 7. As previously described, each quadrant of the photodetector outputs a voltage substantially proportional to the amount, i.e. intensity, of reflected light impinging on the quadrant. The graph in FIG. 7 shows the magnitude of the impinging light intensity for a single quadrant of the photodetector as the mouse translates (without "riding" a line) across three consecutive grid units in either the X or Y direction (recall that a grid unit equals the width of a line segment 31). The solid curve represents the theoretical intensity under ideal conditions, whereas the dashed portions represent the actual intensity, which diverges from the theoretical. The intensity of impinging light is given as a percentage of an intensity $I_{cal}$, which is the range of intensity measured during the calibration procedure. The quantity $I_{cal}$ represents the difference between the maximum and minimum intensities detected during sampling in accordance with the calibration routine, i.e. $I_{cal} = I_{max} - I_{min}$.

As can be seen from FIG. 7, the light intensity detected by a photodetector quadrant theoretically varies from a value substantially equal to zero when the view of the quadrant entirely overlies a non-reflective line segment to a peak value when the view of the same quadrant entirely overlies a reflective surface area. As a practical matter, however, the light intensity when a single quadrant totally overlies a line (not a line intersection) will be about $I_{min} + 0.10 I_{cal}$ due to optical phenomena such as diffraction. (Point a in FIG. 4 indicates the position of the center of the quadrant "view" at which the intensity of impinging light is $I_{min}$ plus 10% of $I_{cal}$, point b indicates the position at which the intensity is substantially equal to $I_{min}$, point c indicates the position at which the intensity is substantially equal to $I_{min} + I_{cal}$, and point d indicates the position at which the intensity is $I_{min}$ plus 50% of $I_{cal}$.) After attaining the peak value, the intensity decreases until it again reaches a value substantially equal to $I_{min} + 0.10 I_{cal}$ corresponding to the position where the view of the same detector overlies the next non-reflective line segment. By varying the threshold voltage input to the comparator, the mouse of the invention is able to detect within which one of four intensity ranges the quadrant voltage output, proportional to light intensity, lies. In the preferred embodiment the respective threshold levels are as follows: $I_{min} + 0.16 I_{cal}$, $I_{min} + 0.46 I_{cal}$, and $I_{min} + 0.74 I_{cal}$. Recalling that $I_{cal} = I_{max} - I_{min}$, the result of this thresholding scheme is that the mouse is able to detect whether the intensity of the light impinging on a quadrant of the photodetector is $\geq I_{min}$ and $< I_{min} + 0.16(I_{max} - I_{min})$, $\geq I_{min} + 0.16(I_{max} - I_{min})$ and $< I_{min} + 0.46(I_{max} - I_{min})$, $\geq I_{min} + 0.46(I_{max} - I_{min})$ and $< I_{min} + 0.74(I_{max} - I_{min})$, or $\geq I_{min} + 0.74(I_{max} - I_{min})$, where $I_{max}$ and $I_{min}$ are respectively the maximum and minimum intensities detected during calibration.

The microprocessor performs the calibration procedure as part of an initialization routine. First, the microprocessor takes a predetermined number of samples for each quadrant while the mouse is moved randomly over the grid surface. The sample photodetector outputs are processed by the microprocessor to obtain $I_{min}$ and $I_{max}$. Then the microprocessor calculates the threshold values $I_{min} + 0.16(I_{max} - I_{min})$, $I_{min} + 0.46(I_{max} - I_{min})$ and $I_{min} + 0.74(I_{max} - I_{min})$ for each quadrant. Each of these threshold values is stored as a seven bit code in the internal random access memory of the microprocessor. The manner in which this calibration procedure is carried out is described in detail in copending U.S. patent application Ser. No. 06/909,829, now U.S. Pat. No. 4,807,166, the disclosure of which is specifically incorporated by reference herein.

Figure 8:
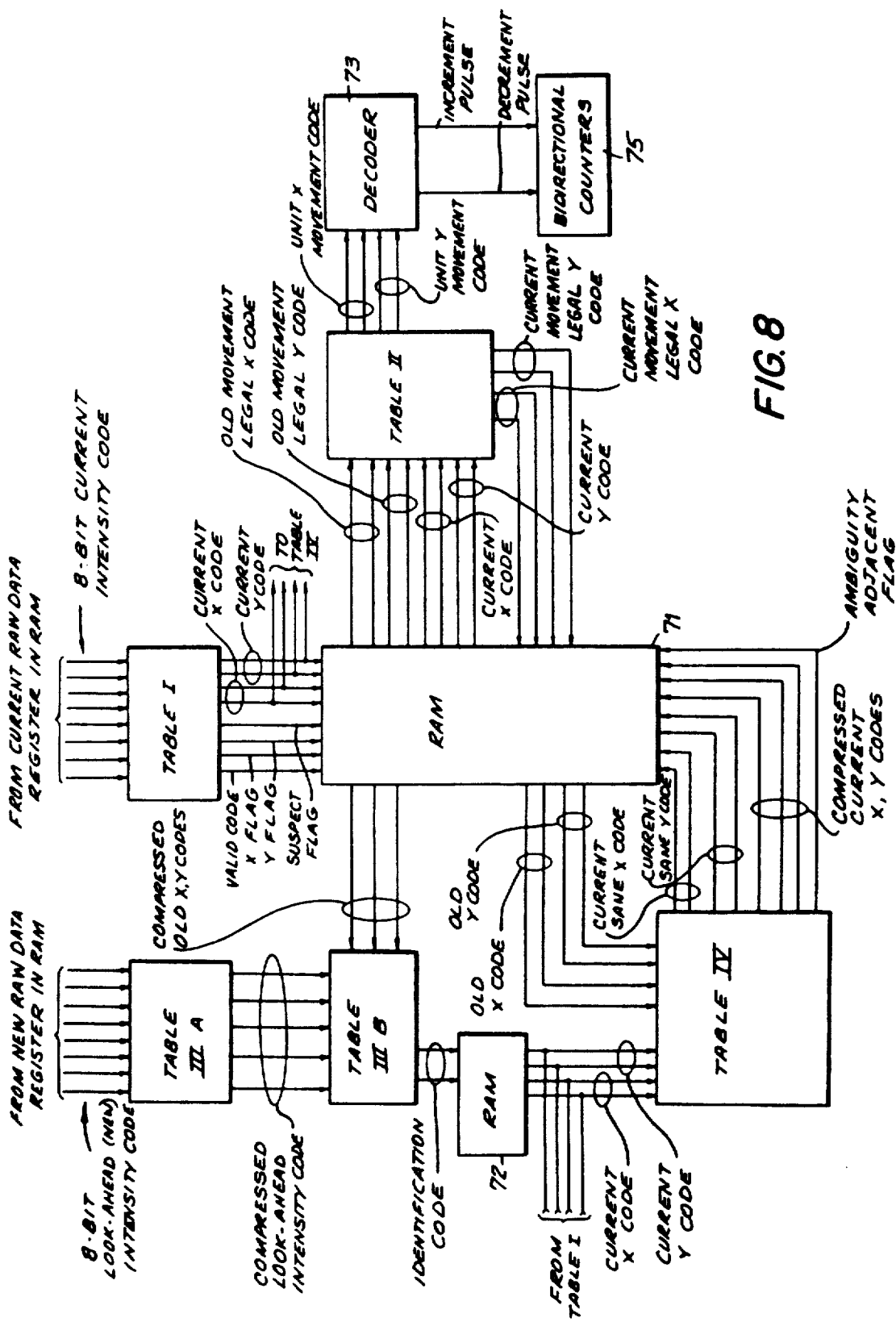
FIG. 8 is a diagram showing the internal flow of information within the microprocessor.
Figure 9:
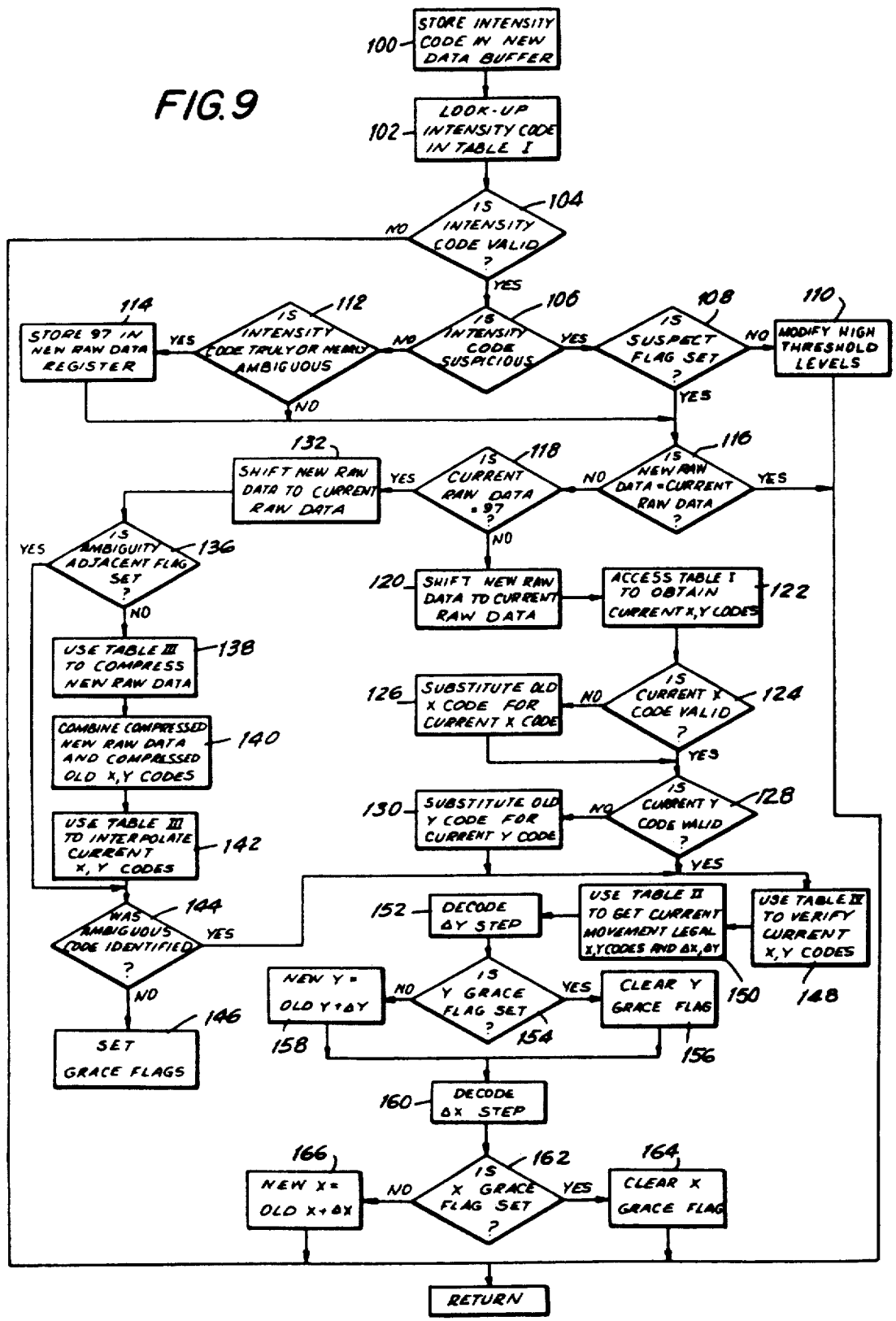
FIG. 9 is a flow diagram showing the algorithm for processing the eight-bit intensity codes.

When the initialization routine has been completed, the digitization routine is begun. In accordance with the digitization routine, the photodetector outputs are sampled to form an 8-bit intensity code representing the intensity values of the light being detected by the four quadrants of the detector at a particular position. It will be apparent that an 8-bit intensity code could correspond to one of 256 possible values. The microprocessor forms this 8-bit intensity code by processing the eight bits of information received from the comparators during one thresholding cycle. The eight bits correspond to the two separate outputs obtained from each of the four comparators when the respective intermediate and either highest or lowest threshold voltages are successively output by the digital-to-analog converter. These analog threshold voltages are output in response to the output of the respective digital threshold values by the microprocessor. The resulting eight-bit intensity code comprises four two-bit codes, each two-bit code (hereinafter referred to as "quadrant intensity code") representing the intensity range in which the light impinging on the corresponding photodetector quadrant falls. For example, if the intensity of light impinging on a quadrant lies in the first intensity range (see FIG. 7), then the corresponding comparator output will be low for both samples and the microprocessor will store the two-bit binary code 00 at the appropriate address in internal RAM. If the intensity is in the second intensity range, than the binary code 01 is stored. If the intensity is in the third intensity range, then the binary code 10 is stored. And lastly, if the intensity is in the fourth intensity range, then the binary code 11 is stored. In this manner, a two-bit intensity code is stored for each quadrant of the photodetector, thereby forming an eight-bit word (i.e. intensity code) representing the amounts of light impinging on the respective photodetector quadrants. This eight-bit intensity code then undergoes further processing by the microprocessor as shown in FIGS. 8-10.

At this juncture, it should be pointed out that although the eight-bit intensity code could represent any one of 256 values, only 16 of these 256 possible values exactly correspond to the 16 positions depicted in FIG. 6. Furthermore, a predetermined number (i.e. 120) of the 256 "numerically" possible values are physically impossible because of the geometric relationship of the four-quadrant detector and the grid pattern. For example, it would be physically impossible to obtain a binary intensity code of 11 for each of detectors A and C with a binary intensity code of 00 for each of detectors B and D, since if both detectors B and D overlie a non-reflective surface area 33, then detectors A and C cannot both overlie a line segment. Likewise, it is physically impossible to obtain a binary intensity code of 11 for one of the detectors with a binary code of 00 for each of the other detectors. These examples are not exhaustive of the physically impossible intensity codes.

In addition, it should be noted that the intensity code corresponding to the ambiguous straddle positions depicted in FIGS. 6e and 6p is 10101010, indicating that the intensity level for each of the four quadrants of the photodetector is in the third intensity range. In particular, the intensity level of each quadrant for these ambiguous straddle positions is substantially equal to $I_{min}+0.051_{cal}$.

The microprocessor 45 has a number of look up tables stored in internal read only memory which are used to process the eight-bit intensity codes. One of these look-up tables (Table I in FIG. 8) performs both a filtering function and an encoding function. Look-up table I (hereinafter "Table I") is accessed two times in order to perform these two functions.

Table I has entries stored at addresses corresponding to the 256 possible intensity codes. The eight-bit data value stored at a predetermined number of these addresses contains an encoded bit (i.e the most significant bit) indicating that the detector output corresponding to the intensity code is physically impossible. If the intensity code generated from the comparator outputs is physically impossible, then the microprocessor is programmed to take appropriate action. In this case the microprocessor will ignore these physically impossible codes and will proceed to the processing of the comparator outputs from the next sampling cycle.

In addition, some of the addresses in Table I have a code stored thereat which indicates that the intensity code is "suspect". "Suspect" intensity codes are those intensity codes which have one or two detector outputs that may be in the highest part of the third intensity range.

In response to the input of a "suspect" intensity code, the microprocessor is programmed to perform a resampling routine. This resampling routine is carried out by samplinq with a modified highest threshold value at the digital-to-analog converter output. In the preferred embodiment, the digital-to-analog converter output for the highest threshold value is changed from $I_{min}+0.74(I_{max}-I_{min})$ to $I_{min}+0.68(I_{max}-I_{min})$. Thus, during resampling comparator outputs are supplied to the microprocessor which indicate whether the intensity level of the light being received by each of the four quadrants is in the range $>0$ and $>I_{min}+0.16(I_{max}-I_{min})$, $\geq I_{min}+0.16(I_{max}-I_{min})$ and $<I_{min}+0.46(I_{max}-I_{min})$, and $<I_{min}+0.68(I_{max}-I_{min})$, and $\geq I_{min}+0.68(I_{max}-I_{min})$. In effect, in response to the recognition of a suspect eight-bit intensity code, the microprocessor resamples in order to confirm whether the suspect intensity was indeed suspect and therefore should be ignored, or whether the suspect intensity code was in fact accurate and therefore should be processed further. If upon resampling, any of the bit pairs of the eight-bit intensity code changes from the binary value 10 to the binary value 11 (i.e. from the third intensity range to the fourth intensity range), this indicates to the microprocessor that the first intensity code was indeed suspect. This means that the photodetector is actually somewhat removed from a straddle position and that the suspect intensity code is not merely the result of jitter as the photodetector straddles a line segment. On the other hand, if none of the bit pairs of the eight-bit intensity code change upon resampling, this indicates to the microprocessor that the first intensity was not suspect.

After the physically impossible values and suspect values have been filtered out, the microprocessor tests to determine whether the intensity code is truly or nearly ambiguous, i.e. represents an ambiguous straddle position or a position in the vicinity thereof. The information as to whether the input intensity code represents an ambiguous position can be obtained from the data stored at the addresses in Table I. In particular, an ambiguous intensity code is identified by a predetermined combination of values in the three most significant bits of the data word stored at the corresponding address, i.e. 011. This three-bit prefix identifies that the intensity code is either truly ambiguous (i.e. correspondes to one of the positions shown in FIGS. 6e and 6p) or is nearly ambiguous (i.e. corresponds to a position physically near to one of the positions shown in FIGS. 6e and 6p). In response to an intensity code having this predetermined prefix, the microprocessor enters the look-ahead routine, to be discussed in detail below.

If the microprocessor determines that the current intensity code is not physically impossible, is not suspect and is not ambiguous, then the microprocessor accesses look-up table 1 a second time, using the data word read during the first access as the address, and converts the eight-bit intensity code into a four-bit code comprising the two-bit X code and the two-bit Y code, these X and Y codes being included as the four least significant bits in the eight-bit data word stored at those addresses corresponding to intensity codes which are not "physically impossible", "suspect" or "ambiguous". The X and Y codes which are output at this step are one of 14 possible combinations of X and Y codes representing all of the photodetector positions shown in FIGS. 6 except for the positions of FIGS. 6e and 6p which have ambiguous intensity codes. Because the intensity codes are the same for these two positions, the X and Y codes must be determined by a method different from the straightforward conversion which is used to determine the X and Y codes for the other positions of FIGS. 6. As previously noted, the photodetector positions shown in FIGS. 6b–6d, 6f–6 h and 6j–6l are the "movement legal" positions and respectively have the following Y (first and second bits) and X (third and fourth bits) codes: FIG. 6b—1010; FIG. 6c—0010; FIG. 6d—0110; FIG. 6f—1000; FIG. 6g—0000; FIG. 6h—0100; FIG. 6j—1001; FIG. 6k—0001; FIG. 6l—0101. The photodetector positions shown in FIGS. 6a, 6i, 6m, 6n and 6q are straddle positions with no ambiguity and respectively have the following X and Y codes: FIG. 6a—1110; FIG. 6i1101; FIG. 6m—1111; FIG. 6n—1011; FIG. 6q—0111. Finally, the positions with corresponding ambiguous intensity codes, shown in FIG. 6e and 6p, respectively have the X and Y codes 1100 and 0011.

The X and Y codes are such that for adjacent positions (in FIG. 6) along any row the respective X codes differ in one bit only, while for adjacent positions along any column the respective Y codes also differ in one bit only. For horizontal movement, the sequence of X codes during travel in the leftward direction differs from the sequence of X codes during travel in the rightward direction. Likewise for vertical movement the sequence of Y codes during travel in the upward direction differs from the sequence of Y codes during travel in the downward direction. This characteristic of the X and Y codes is used by the microprocessor to determine the direction of mouse travel.

In those instances where the intensity code is ambiguous, the microprocessor is programmed to perform an interpolation technique to ascertain the corresponding X and Y codes. In order to understand how this takes place, it is first essential to understand that there is a deliberate time lag between the sampling of the comparator outputs and the processing of the intensity codes.

More precisely, the microprocessor receives the next (hereinafter "new") sample results before the "current" sample results are processed. Thus, the microprocessor is able to discriminate which position the ambiguous "current" intensity code corresponds to by interpolating between the "new" position and the "old" position (i.e. the position preceding the "current" position) of the photodetector. In effect, the microprocessor determines the X and Y codes corresponding to the ambiguous intensity code by "looking ahead" to the intensity code at the next following position and "looking behind" to the X and Y codes at the next preceding (already processed) position. The eight-bit so-called "look-ahead" intensity code is used as the address for the first access of look-up table III (hereinafter "Table IIIA" if the first access of look-up table III is being referred to), which performs a data compression function. In accordance with this data compression, the eight bits of the "look-ahead" intensity code are compressed into five bits. These five bits are used, along with three other bits of information relating to the next preceding position, to access look-up table III a second time (hereinafter "Table IIIB" if the second access of look-up table III is being referred to). Upon being accessed a second time, Table IIIB performs the interpolation function. It is to be understood that Table IIIA and Table IIIB, are one and the same, i.e. lookup table III. The accessing of look-up table III will be described in detail below in connection with the discussion of FIG. 9.

The aforementioned three bits relating to the next preceding position, which are input to Table IIIB, are generated by look-up table IV (hereinafter "Table IV"), which also performs two functions. The first function of Table IV is to perform a non-linear data compression on the four bits of the old X and Y codes stored in the microprocessor random access memory. As a result of this compression, the four bits of X and Y codes are converted into a compressed three-bit value representative of the old X and Y codes and a fourth bit which serves as the "ambiguity adjacent" flag. This aspect of Table IV will be described in greater detail below. The compressed three-bit value is stored in the microprocessor RAM and, as previously mentioned, is later combined with the five bits constituting the compressed "lookahead" intensity code from Table IIIA to form an eight-bit address which is used to access Table IIIB. A two-bit identification code is obtained from Table IIIB, indicating to which position the ambiguous intensity code corresponds or alternatively indicating that the position cannot be identified. If the position corresponding to the ambiguous intensity code has been identified, then the X and Y codes corresponding to that identification code are retrieved from the internal read only memory 72 of the microprocessor.

The second function performed by Table IV is to perform a so-called sanity check on the current X and Y codes (four bits) generated by either of the foregoing procedures (i.e. Table IIIB or Table I). As can be seen in FIG. 8, Table IV receives four bits representing the current X and Y codes from Table I or Table IIIB (i.e, the X and Y codes generated as a result of the "current" sampling) and four bits representing the old X and Y codes from random access memory 71 (i.e. the X and Y codes generated as a result of the "old" sampling). The current and old X and Y codes are compared and the legitimacy of the current X and Y codes is tested by the microprocessor in accordance with prestored criteria.

The current X and Y codes—whether generated by Table I or Table IIIB—are then input to look-up table II (hereinafter "Table II") for further processing. In addition to the four bits comprising the current X and Y codes, the four bits comprising the old "movement legal" X and Y codes are input to Table II from the random access memory 71.

The microprocessor thus determines the current "movement legal" X and Y codes in response to the input of the old "movement legal" X and Y codes and the current X and Y codes into Table II. The current .movement legal" X and Y codes are then stored in RAM 71. In effect, those X and Y codes which are not "movement legal" are filtered out.

Table II also performs a translation function. The "movement legal" X and Y codes comprise four bits—two bits which only change in response to X displacement and two bits which only change in response to Y displacement. Thus, if one of the two bits of the new "movement legal" X code differs from the corresponding bit of the old "movement legal" X code, this indicates that the mouse has traveled one grid unit along the X axis (recall that one grid unit equals the width of a line segment). If one of the two bits of the new "movement legal" Y code differs from the corresponding bit of the old movement legal" Y code, this indicates that the mouse has traveled one grid unit along the Y axis.

Using Table II, the microprocessor encodes the direction of unit movement along the X and Y axes. These encoded units of X and Y movements are output from Table II to a decoder 73, which outputs decoded units of X and Y movements to a bidirectional counter 75. The bidirectional counter maintains running X and Y counts of the number of unit movements, i.e. the number of boundary crossings made by the mouse in the respective directions (plus or minus) along the X and Y axes, respectively. The counts at any given instant represent the relative position (i.e the X and Y coordinates) of the mouse with respect to the last starting point. If the mouse crosses a boundary separating a line segment and a square area of the grid during rightward movement, the running X count is incremented by unity. For leftward movement, it is decremented by unity. The Y count is adjusted in a similar way to reflect Y displacement.

FIG. 9 is a flow diagram showing the algorithm for processing the eight-bit intensity codes to obtain encoded units of incremental X and Y movements. Before entering into a detailed discussion of this processing, it must be reiterated that a "current" intensity code received by the microprocessor is not processed until after a "new" intensity code has been received. If the "new" intensity code is not different than the "current" intensity code, the "new" intensity code will not be processed further. If the "new" intensity code is different than the "current" intensity code, then the "new" intensity code will take the place of the "current" intensity code after the latter has been fully processed. Two registers are provided in a stack in RAM 71 for storing the successive "current" and "new" intensity codes. These registers will hereinafter be referred to as the NEW RAW DATA register and the CURRENT RAW DATA register.

The flow diagram of FIG. 9 will now be described in detail. As shown in block 100, the intensity code produced as the result of a new sampling cycle is stored in the NEW RAW DATA register. The NEW RAW DATA register is located in the internal random access memory of microprocessor 45. As indicated in block 102 of FIG. 9, the contents of the NEW RAW DATA register are used to access Table I, i.e. the eight-bit intensity code stored in the NEW RAW DATA register serves as an eight-bit address. Table I is stored in the internal read only memory of microprocessor 45. As previously described, an eight-bit data value is stored at each of 256 addresses in Table I.

The 256 addresses of Table I are listed in decimal form in Appendix I alongside the corresponding data values stored thereat. As previously described, the eight-bit address is formed from the four two-bit quadrant intensity codes representing the intensity of light respectively impinging on quadrants A-D of the four-quad photodetector. The two-bit quadrant intensity code for each quadrant can take on one of four possible values depending on which intensity range the impinging light intensity lies in. If the intensity level of a quadrant lies in the lowest intensity range, then the microprocessor assigns a binary intensity code 00. The intensity code is 01, 10 and 11 respectively for the second, third and fourth intensity ranges, wherein the second range is higher than the first range, the third range is higher than the second range, and the fourth range is higher than the third range. The respective intensity ranges and threshold levels are graphically depicted in FIG. 7. Although Table I has 256 addresses and each address has an eight-bit data value stored thereat, there are only 26 different data values stored in the table. Each data value is represented by an eight-bit binary value, although Appendix I shows only the corresponding decimal values. These 26 different data values indicate into which of 26 possible categories each eight-bit intensity code falls.

Before proceeding with a discussion of the categorization scheme, an explanation will be presented with regard to the information incorporated in the eight-bit data values stored in Table I. With some exceptions to be discussed later, it can generally be stated that the two least significant bits of the data value represent the Y code of the mouse position and the adjacent two bits represent the X code. The fourth most significant bit is the "suspect" bit, i.e. this bit is 0 if the intensity code is not suspect and 1 if it is suspect. The third most significant bit is the Y flag, i.e. this bit is 0 if the Y code is determinable and 1 if it is not. The second bit most significant bit is the X flag, i.e. this bit is 0 if the X code is determinable and is 1 if it is not. Finally, the most significant bit of the eight-bit data value is the "valid" bit, i.e. this bit is 0 if the intensity code is valid (i.e. physically possible) and 1 if the intensity code is invalid (i.e. physically impossible). The aforementioned exception to this scheme is that the values stored in the two least significant bits or the two adjacent bits do not denote the Y code or the X code respectively if the Y flag or X flag are respectively set to 1.

Thus, the data value stored at the looked-up address can be read and by testing the most and fourth most significant bits of the eight-bit data value, the microprocessor can determine whether the intensity code is valid or suspect. Also, the microprocessor can determine whether the X and Y codes are determinable, and if they are determinable, the value for the X and Y codes can be read.

As previously discussed, the 26 different data values represent the 26 different categories of intensity code. The most numerous category comprises those intensity codes having a decimal value 224. The value 224 is assigned to all intensity codes which are physically impossible, i.e. invalid. In Table I there are 120 such invalid intensity codes. The "valid" bit of the data value is 0 for all invalid intensity codes.

A second category is made up of all intensity codes for which none of the quadrants receive light in the third or fourth intensity range. There are 16 different intensity codes in this category, including the intensity code corresponding to the photodetector position shown in FIG. 6m (i.e. the case where all quadrants receive light in the first or second intensity range). All of these intensity codes, i.e. addresses 0-15 in Table I, are assigned the data value 15. In essence, intensity codes having the data value 15 indicate that the light being reflected to the photodetector impinges on or very near to an intersection of lines. The X and Y codes for all intensity codes in this category are both 3 in decimal form and 11 in binary form.

A third category consists of those intensity codes representing the "truly ambiguous" straddle positions depicted in FIGS. 6e and 6p (i.e. the cases where all quadrants receive light in the third intensity range) and other intensity codes representing the straddle positions slightly displaced therefrom (i.e. so-called "nearly ambiguous" positions). These "other" intensity codes in the third category fall into two subcategories: (1) those intensity codes wherein two adjacent quadrants receive light in the third intensity range and the remaining two quadrants receive light in the first or second intensity ranges, except that the remaining two quadrants are not both in the first intensity range; and (2) those intensity codes wherein two diagonally opposing quadrants receive light in the second intensity range and the other two diagonally opposed quadrants receive light in the third intensity range. There are 15 different intensity codes included in this category. The intensity codes in these respective subcategories can be expressed as sets of decimal values representing the intensity levels of light received by the four quadrants (DCBA) as follows: the first subcategory includes 0122, 1022, 1122, 0221, 1220, 1221, 2012, 2102, 2112, 2201, 2210, 2211 and the second subcategory includes 1212, 2121 (see addresses 52, 56, 60, 90, 97, 104, 105, 146, 148, 150, 165, and 193-195 in Table I). The intensity code at the truly ambiguous positions is 2222 (address 240). The third category of intensity codes is represented by the data value 97 in Table I. For all intensity codes in this category, the X and Y codes are not determinable, as indicated by the setting of the X and Y flags. Further processing, i.e. the look-ahead routine to be described in detail below, must be carried out in order to determine the X and Y codes for intensity codes in this category.

The next nine categories of intensity code correspond to the nine movement legal positions depicted in FIGS. 6b-6d, 6f-6h, and 6j-6l. The quadrant intensity codes in decimal form for these positions are as follows: 0003, 0033, 0030, 3003, 3333, 0330, 3000, 3300, 0300. Thus, the intensity codes corresponding to the movement legal positions comprise 0's and 3's only, i.e. the light impinging on each quadrant of the photodetector is either in the first intensity range or the fourth intensity range.

However, each of the aforementioned nine categories does not consist of only the intensity code corresponding to a movement legal position. In addition, a certain number of intensity codes representing positions in the immediate vicinity of a particular movement legal position are included in the respective category. For example, the movement legal position shown in FIG. 6g (3333) has associated therewith four other intensity codes (2333, 3233, 3323, 3332) which are also assigned the data value 0.

The four movement legal positions shown in FIGS. 6c, 6f, 6h and 6k each have five additional intensity codes associated therewith, thereby forming the categories having the data values 1, 2, 4 and 8. The intensity codes of the four movement legal positions shown in FIGS. 6b, 6d, 6j and 6l each have four additional intensity codes associated therewith, thereby forming the categories having the data values 5, 6, 9 and 10. Thus, the total number of intensity codes included in the nine "movement legal" categories is 49.

Further, there are eight categories comprising those intensity codes which are "suspect". These intensity codes correspond to certain mouse positions located between the positions corresponding to ambiguous intensity codes and the positions overlying line intersections. These intensity codes are suspect because of the optical distortion inherent in using a non-ideal lens to focus the reflected light onto the photodetector. As will be discussed in detail below, these suspect intensity codes are confirmed or not confirmed depending on the results of a resampling with modified high threshold level. There are a total of 12 intensity codes in these eight categories. The four intensity codes respectively having the data values 23, 27, 29 and 30 correspond to the photodetector positions depicted FIGS. 6a, 6i, 6n and 6q. For each of these four categories, two quadrants receive light in the third intensity range and two receive light in the first intensity range. The other four categories of suspect intensity codes each include a pair of intensity codes, the intensity codes of each pair differing from the intensity code having the respective data values 23, 27, 29 and 30 in that one quadrant receives light in the second intensity range, instead of the third intensity range. These four categories are respectively assigned the data values 52, 56, 81 and 82. For these four categories, either the X or the Y code is not determinable.

Finally, the remaining six categories comprise the remaining intensity codes for which either the X or the Y code, but not both, is not determinable. The four categories with the respective data values 36, 40, 65 and 66 in Table I each comprise eight different intensity codes. Each of these 32 intensity codes represents a mouse position wherein only one photodetector quadrant receives light in the fourth intensity range. The two categories with data values 32 and 64 respectively comprise six intensity codes, each of which represents a mouse position wherein two quadrants receive light in the fourth intensity range. The intensity codes with data value 32 represent detector positions intermediate between the three positions depicted in FIGS. 6c, 6g and 6k. The intensity codes with data value 64 represent detector positions intermediate between the three positions depicted in FIGS. 6f, 6g and 6h.

Returning to the discussion of the flow diagram of FIG. 9, the microprocessor tests the binary data value read out from Table I to determine whether the current intensity code is valid (see block 104), i.e. physically possible. This is accomplished simply be determining whether the most significant bit in the data value is 1 (i.e. invalid) or 0 (i.e. valid). If the intensity code is invalid, the microprocessor returns to the main program. If the intensity code is valid, then the microprocessor proceeds to determine whether the intensity code is suspect (see block 106). This is accomplished by determining whether the fourth most significant bit of the data value is 1 (i.e. suspect) or 0 (i.e. not suspect). If the intensity code is suspect and if the "suspect" flag is not set (block 108), a routine for confirming the suspect code is entered whereby the highest threshold level is modified by the microprocessor (block 110), as described more fully below. If the intensity code is not suspect, the microprocessor proceeds to determine whether the intensity code represents a truly or nearly ambiguous straddle position (block 112).

As previously described, the highest threshold level for each quadrant was selected to be $0.74(I_{max}Q - I_{min}Q) + I_{min}Q = 0.74I_{max}Q + 0.26I_{min}Q$, where $Q = A, B, C$ or $D$. A voltage corresponding to the threshold level is output by the digital-to-analog converter 47 in response to receipt of a predetermined digital value from microprocessor 45. The predetermined digital values, as previously noted, are determined during calibration and stored in the internal RAM of the microprocessor. However, other digital values are calculated during calibration for use as alternative, i.e. modified, highest threshold levels during re-sampling. In the preferred embodiment, these alternative digital values equal $0.68(I_{max} - I_{min}) + I_{min} = 0.68I_{max} + 0.32I_{min}$. If the microprocessor determines that the current intensity code is suspect (block 106 in FIG. 9) and that the "suspect" flag is not set (indicating that the previous intensity code was not suspect), the highest threshold levels are modified (block 110) and the microprocessor returns to the main program. On the next sample in time it use the modified highest threshold levels.

Following this resampling, steps 100, 102, 104 and 106 are repeated. If the intensity code resulting from the resampling is also suspect, then the result of decision block 108 will be YES, since the "suspect" flag was set following recognition of the previous suspect intensity code. In response to this YES determination, the "suspect" flag is cleared and then the microprocessor tests the contents of the NEW RAW DATA and CURRENT RAW DATA registers to determine whether there is an identity (block 116). If the contents are identical, this indicates that the mouse has not changed position. Therefore, no further processing of the "new" intensity code is necessary and the microprocessor returns to the main program.

In summary, if the suspect intensity code is not repeated upon resampling, the suspect intensity code will be ignored by the microprocessor and the intensity code resulting from the resampling will be processed. If, on the other hand, the suspect intensity code is repeated upon resampling, then, of course, the suspect intensity code will be processed.

If, following a determination by the microprocessor that the intensity code is not suspect (block 106), the microprocessor further determines that the intensity code is not truly or nearly ambiguous (block 112), then the microprocessor proceeds to decision block 116. If, however, the microprocessor determines that the intensity code is truly or nearly ambiguous, then a data value of 97 is stored in the NEW RAW DATA register in place of the stored intensity code. The effect of this processing step is that the nearly ambiguous intensity codes will be treated as truly ambiguous intensity codes. For example, although the measured intensity code may have corresponded to address 52 in Table I, after the decimal value 97 has been substituted for 52 in the NEW RAW DATA register, the "new" intensity code will appear as a 97 during processing.

After the microprocessor has determined whether the intensity code is valid, suspect or ambiguous, the microprocessor proceeds to block 116, where a determination is made as to whether the contents of the NEW RAW DATA register equal the contents of the CURRENT RAW DATA register. If the respective binary values stored in these registers are equal, then the "new" intensity code is not processed further and the microprocessor returns to the main program. If the register contents are different, then the microprocessor determines whether the binary contents of the CURRENT RAW DATA register equal 97 (block 118). If the contents of the CURRENT RAW DATA register do not equal 97, then the contents of the NEW RAW DATA register are shifted into the CURRENT RAW DATA register (block 120), and the former contents of the CURRENT RAW DATA register are used to access Table I to obtain the data value stored at the corresponding address, which data value includes the corresponding X and Y codes (block 122). The look-up data value is stored in an eight-bit register (CURRENT PROCESSED DATA register) in the internal RAM of the microprocessor. In block 124, the validity of the current X code stored in CURRENT PROCESSED DATA register is checked. If the X flag (i.e. the second most significant bit) is set, indicating that the X code is not valid, then the microprocessor substitutes the two bits comprising the old X code from the OLD PROCESSED DATA register for the corresponding two bits of the current X code in the CURRENT PROCESSED DATA register (block 126). If the X flag in the CURRENT PROCESSED DATA register is not set, then the microprocessor proceeds to block 128, where the validity of the current Y code is checked. If the Y flag (i.e. the third most significant bit in the CURRENT PROCESSED DATA register) is set, indicating that the current Y code is invalid, then the microprocessor substitutes the old Y code from the OLD PROCESSED DATA register for the current Y code stored at the corresponding bits of the CURRENT PROCESSED DATA register (block 130). The current X and Y codes (i.e. the four least significant bits in the CURRENT PROCESSED DATA register) thereafter are processed further in Table IV.

Returning to decision box 118, we will now discuss the steps subsequent to a determination that the contents of the CURRENT RAW DATA register are indeed equal to 97. This equality indicates that the current intensity code corresponds to a position which is truly ambiguous or a position in the near vicinity.

If the microprocessor determines that the contents of the CURRENT RAW DATA register equal 97, the contents of the NEW RAW DATA register are shifted into the CURRENT RAW DATA register (block 132). Immediately thereafter, the microprocessor determines whether the last position of the mouse corresponding to the old X and Y codes was much nearer to on of the positions shown in FIGS. 6e and 6p than to the other position (block 136). This is accomplished by testing the "ambiguity adjacent" flag output by Table IV and will be discussed in greater detail in connection with the description of Table IV hereinafter. If the last (i.e. "old") position was adjacent to one of the positions of FIGS. 6e and 6p, then the microprocessor concludes that the current ambiguous intensity code corresponds to that one position. In this case the ambiguity has been resolved in a simple manner and the microprocessor need not perform the look-ahead routine. If, on the other hand, the last position was not adjacent to one of the positions in FIGS. 6e or 6p (i.e. the "ambiguity adjacent" flag is not set), then the microprocessor enters the look-ahead routine.

Before presenting a detailed description of the separate steps making up the look-ahead routine, the basic principle realized by this novel technique will be described. The basic principle involved is that data representing the current mouse position are obtained by interpolating between data representing a past mouse position and data representing a future mouse position. Consistent with the convention already adopted in this disclosure, the term "old" is used in the sense of preceding the "current" position of the mouse in time and the term "new" is used in the sense of being subsequent to the "current" position in time. The look-ahead routine represents a series of steps in the processing of the current intensity code. As already noted, the new intensity code has already been acquired by the time the current intensity code is being processed. In addition, the old intensity code has already been processed by this time, yielding the old X and Y codes. Therefore, the new intensity code stored in the NEW RAW DATA register and the old X and Y codes stored in the OLD PROCESSED DATA register in RAM 71 can be used to perform the interpolation.

The new intensity code is an eight-bit value and the old X and Y codes are both two-bit values. The obvious manner in which to set up a look-up table for providing the interpolated, i.e. current, data would be to store a four-bit data value, representing the interpolated X and Y codes at each of 4096 addresses in a look-up table. The eight-bit new intensity code, the two-bit old X code, and the two-bit old Y code would be input into the look-up table as a 12-bit address, yielding the four-bit interpolated X and Y codes stored at that address. In accordance with a further novel feature of the invention, however, the memory capacity required to carry out this interpolation is drastically reduced. Instead of a look-up table with a 12-bit addresses, a table with eight-bit addresses is used. This is accomplished by data compression and by accessing the look-up table twice. As a result of these novel techniques, the size of the look-up table can be reduced by a factor of 16.

In accordance with the invention, look-up table III performs two functions: data compression (Table IIIA) and interpolation (Table IIIB). Table IIIA compresses the eight bits of the new intensity code (i.e. the contents of the NEW RAW DATA register) into five bits (block 138 in FIG. 9). In response to being accessed for the first time in this way, look-up table III (i.e. Table IIIA) outputs the eight-bit data value stored at the address formed by the eight-bit new intensity code. At this juncture, the microprocessor is interested only in the five most significant bits which are destined to be used as part of the eight-bit address during the second access of look-up table III (i.e. Table IIIB). The other three bits of the Table IIIB address are obtained from the OLD PROCESSED DATA register and are combined with the five bits from Table IIIA, as indicated in block 140 of FIG. 9. These three bits represent the compressed old X and Y codes. However, it should be noted that although they represent the compressed old X and Y codes, they were generated by Table IV at a time when the old X and Y codes were the then current X and Y codes, i.e the data in the CURRENT PROCESSED DATA register had not yet been shifted into the OLD PROCESSED DATA register. This will be explained in greater detail in connection with the description of Table IV hereinafter.

In response to being accessed, Table IIIB outputs the eight-bit data value stored at the address formed by the five-bit compressed new (referred to as "look-ahead" in FIG. 9), intensity code and the three-bit compressed old X and Y codes. At this juncture, the microprocessor is interested only in the two least significant bits which constitute the so-called identification code.

The data values stored in look-up table III are listed in Appendix III along with the address at which the data is stored and the corresponding quadrant intensity levels. For the sake of convenience, all values are presented in decimal form, although it is to be understood that both the address and data values exist in memory in eight-bit binary form. As is true for all of the look-up tables, look-up table III has 256 addresses.

As already noted, look-up table III is accessed two times. In response to the first access the compressed data is obtained (block 138 in FIG. 9), whereas in response to the second access the identification code is obtained (block 142 in FIG. 9). This is achieved by storing the compressed data in the five most significant bits at each address and by storing the identification code at the two least significant bits. The third least significant bit contains no useful information in the particular embodiment being described here. However, as will be discussed in detail below, the novel principles being applied in look-up table III have wider applicability than this particular embodiment.

The five-bit compressed data output from Table IIIA ($P_4P_3P_2P_1P_0$ in FIG. 10a) obviously may have a value between 0 and 31. Thus, the data compression can be achieved by taking the 256 intensity codes and categorizing them into no more than 32 categories, as previously described. The 32 categories are shown in FIG. 11. The values 0–29 correspond to the 30 mouse positions shown in the large dotted square. The value 30 indicates that the intensity code is unuseable and the value 31 indicates that the intensity code is ambiguous. The intensity code which are not unuseable and are not ambiguous are categorized by assigning the number of that position which is closest to the position corresponding to the intensity code. The three X's included in the eight-bit output of Table IIIA in FIG. 10b merely indicate that the values stored at these bits are subsequently masked out. The unmasked bits $P_4P_3P_2P_1P_0$ are used, as shown, to form part of the address for the second access. The other part of the address is formed by bits $Q_2Q_1Q_0$ output from Table IV. As will be described in detail hereinafter, Table IV compresses the old X and Y codes into three bits $Q_2Q_1Q_0$ by assigning a value between 0 and 7. The bits $P_4P_3P_2P_1P_0Q_2Q_1Q_0$ are combined into an address (block 140 in FIG. 9) which is used in the second access of look-up table III (i.e. Table IIIB). In response to this access, two of the three bits of the stored data value which were previously masked after the first access will now yield the sought identification code, and the five most significant bits of the second-access output will be masked (which again is indicated by X's in FIG. 10a).

Figures 10A, 10B:
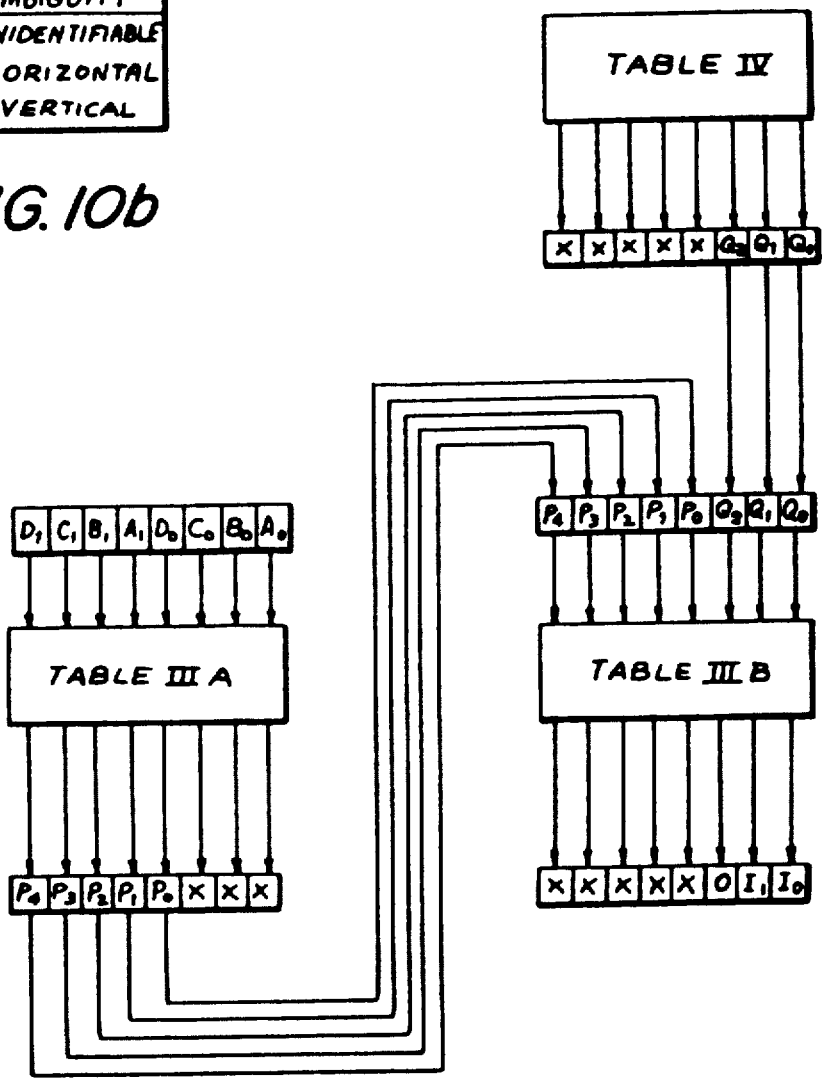
FIG. 10a is a block diagram showing the respective inputs and outputs for the first and second accesses of look-up table III.
FIG. 10b is a table showing the identification code.
Figure 11:
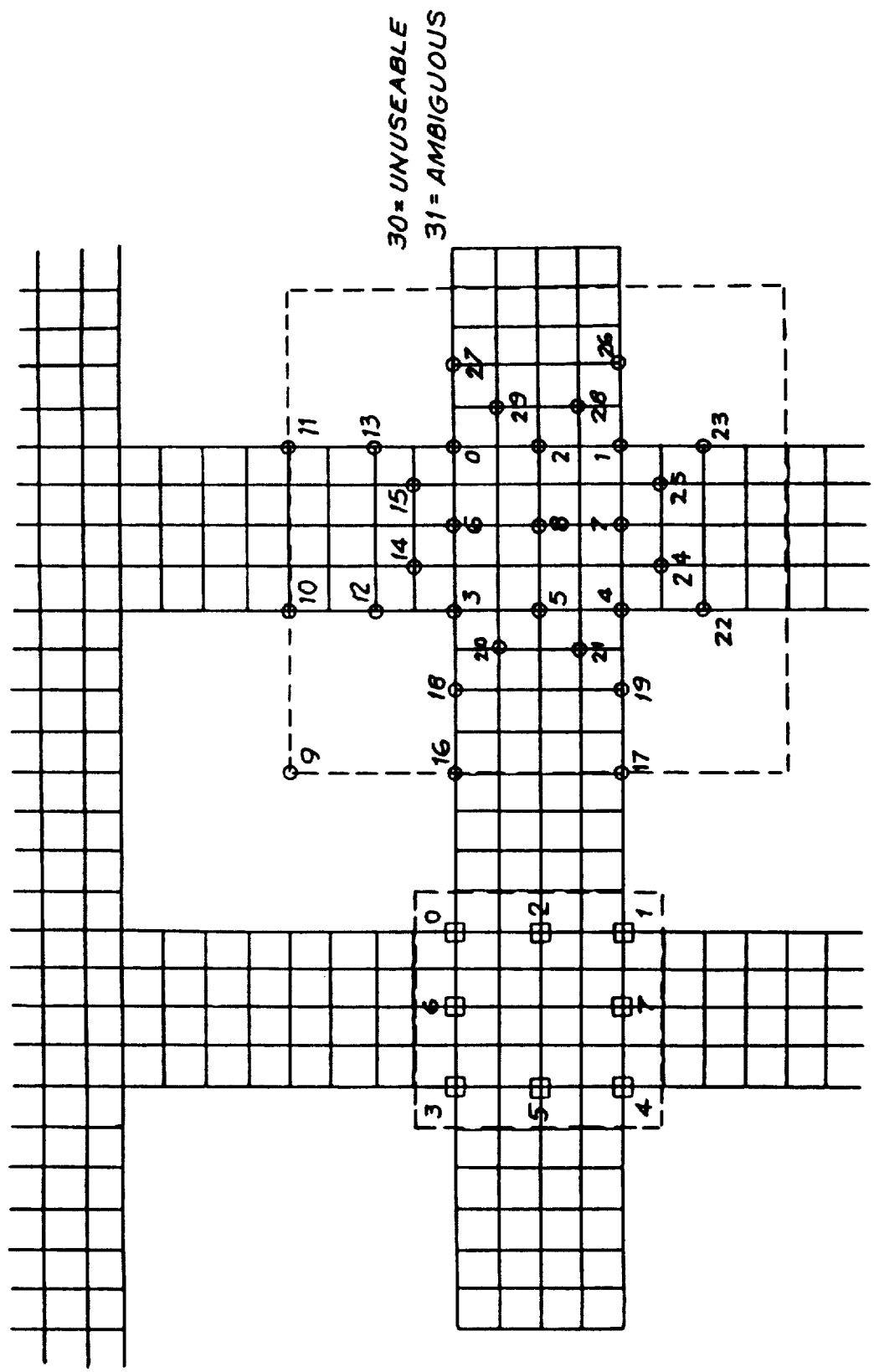
FIG. 11 illustrates the eight positions corresponding to the compressed old X, Y codes (left-hand dotted square) and the 30 positions corresponding to the compressed new intensity code (right-hand dotted square).

The identification code comprises two bits which may take on one of three values (as shown in FIG. 10b). A decimal value of 0 (00 in binary form) indicates that the position indicated by the ambiguous intensity code cannot be identified. A decimal value of 1 (01 in binary form) indicates that the position indicated by the ambiguous intensity code is that depicted in FIG. 6p, i.e. a so-called horizontal ambiguity, which is called this because the photodetector "view" straddles a horizontal line. A decimal value of 2 (10 in binary form) indicates that the position indicated by the ambiguous intensity code is that depicted in FIG. 6e, i.e. a so-called vertical ambiguity, since the photodetector "view" straddles a vertical line.

If the identification code has a decimal value of 1 or 2, the microprocessor retrieves the X and Y codes corresponding to the positions of FIGS. 6p and 6e respectively from read only memory 72. These current X and Y codes will then be input to Table IV, which will perform a so-called sanity check (block 148 in FIG. 9). If the current X and Y codes are "sane", they will be stored in the CURRENT PROCESSED DATA register in RAM 71. Later these current X and Y codes will be shifted to the OLD PROCESSED DATA register, indicating that they have become the old X and Y codes during the next step in the processing of the samples.

If the identification code has a decimal value of 0 (indicating that the position corresponding to the ambiguous intensity code cannot be identified), then the microprocessor sets the so-called "grace" flags in RAM 71 (block 146). Although the output of Table IIIB will continue to be processed by look-up tables IV and II until the encoded units of X and Y movements are obtained from Table II (to be discussed in detail below), the results will be ignored by the microprocessor if the "grace" flags are set in this manner. The results are ignored because of the unacceptable probability that they are erroneous.

Before describing Table IV in detail, various examples of look-up tables embodying the basic principles governing the accessing of information from Table III will be discussed. In accordance with the novel feature of the invention wherein part of the address for the second access of a look-up table is retrieved from the same look-up table as a result of the first access, the amount of memory space occupied by the look-up table can be advantageously reduced under particular circumstances. This advantage accrues only in the case where the number m of bits in the input value is greater than the number n of bits in the lookup table address, and where the number k of bits in the desired output value is less than or equal to m−n (i.e. $k \leq m-n$). If the n most significant bits of the m-bit input value can be compressed into 8−k bits, then the k-bit output values corresponding to the $2^m$ inputs could be stored in an 8-bit addressable read only memory. In look-up table III of the invention, m=11, n=8 and k=2.

Returning again to the flow diagram of FIG. 9, block 148 indicates that after the current X and Y codes have been acquired (i.e. stored in the CURRENT PROCESSED DATA register in RAM 71), the current X and Y codes are input into Table IV along with the old X and Y codes from the OLD PROCESSED DATA register Table IV verifies the current codes by performing a sanity check. Referring to FIGS. 6 and Appendix I, it is apparent that during rightward horizontal movement, the X code changes as follows: 3—2—0—1—3 etc. For leftward horizontal movement the X code changes as follows: 3—1—0—2—3 etc. The successive values for the Y code during vertical movement are analogous. It is apparent that as a theoretical matter, it would be impossible to have a change in X or Y code from 3 to 0, from 0 to 3, from 1 to 2, or from 2 to 1 since for each case the intervening X code would necessarily appear. As a practical matter, however, transitions from 1 to 2 and vice versa can occur. Therefore, Table IV performs the sanity check merely by detecting direct transitions of the X or Y code between 0 and 3 (i.e. 0—3 and 3—0). Whenever the current and old X and Y codes which are input to Table IV have a current X code equal to 3 and an old X code equal to 0 or a current X code equal to 0 and an old X code equal to 3, then Table IV substitutes the old X code for the current X code in the CURRENT PROCESSED DATA register (third and fourth least significant bits) in RAM 71. Likewise the old Y code is substituted for the current Y code in the CURRENT PROCESSED DATA register (least and second least significant bits) if an "insane" Y code transition is detected.

Appendix IV shows the input old X and Y codes (columns 2 and 3), the input current X and Y codes (columns 4 and 5) and the output updated (i.e. "sane") current X and Y codes (columns 6 and 7) in decimal form. The updated current X and Y codes occupy the four most significant bits of the eight-bit data value. The remaining four bits making up the eight-bit data value consist of a three-bit compression of the input old X and Y codes (the three least significant bits) and a one-bit flag (the fourth least significant bit) which, as previously described, indicates whether the old X and Y codes correspond to a position which is nearer to one of the two positions shown in FIGS. 6e and 6p than to the other of the two positions. The decimal value of the three-bit compression appears in column 9 of Appendix IV, while the decimal value for the "ambiguity adjacent" flag appears in column 8. If the fourth bit of the data value is 1, then the microprocessor will treat the three least significant bits as a code for identifying which of the positions in FIGS. 6e and 6p is the nearest or for indicating that the nearest of the two positions is not identifiable, not as a compression. As previously discussed in connection with FIG. 9 (block 136), the microprocessor will directly identify the position corresponding to the ambiguous current intensity code if the decimal value of the four least significant bits of the Table IV output equals 9 or 10 the value 9 indicating a position overlying a horizontal line and a 10 indicating a position overlying a vertical line. On the other hand, a decimal value of 8 indicates the position cannot be identified. The "grace" flags will be set in RAM 71, as shown in block 146 of FIG. 9, in response to a result NO in block 144.

It should be pointed out that the three-bit code appearing in the three least significant bits of those data values in Table IV for which the fourth least significant bit equals (i.e. for which the "ambiguity adjacent" flag is set) is the same three-bit identification code which appears in the three least significant bits of the data values in Table III. In both instances, the object is to identify which of the positions shown in FIGS. 6e and 6p the photodetector "view" is closest to. The difference lies in the fact that Table III is used to identify the position (i.e. FIG. 6e and 6p) corresponding to an ambiguous current intensity code whereas Table IV is used to identify the position (i.e. FIG. 6e or 6p) corresponding to the old X and Y codes.

If the "ambiguity adjacent" flag (the fourth least significant bit of the data value in Table IV) is not set (i.e. is equal to 0), then the three least significant bits will be treated as a compression of the old X and Y codes. These three bits take on a value between 0-7. Each one of these eight different values corresponds to one of the eight positions surrounding the position overlying a line intersection, i.e. the positions shown in FIG. 6a, 6b, 6d, 6i, 6j, 6l, 6n, and 6q, which surround the position shown in FIG. 6m. These positions are also shown in the small dotted square on the left-hand side of FIG. 11.

As previously described, the three-bit compressed value output from Table IV is input into Table IIIB along with the five-bit compressed value output from Table IIIA. FIG. 11a shows the scheme for compressing the eight-bit look-ahead "new" intensity code into a five-bit value between 0 and 31. FIG. 11b shows the scheme for compressing the four-bit old X and Y codes, for the eight predetermined positions surrounding the position directly overlying a line intersection, into a three-bit value between 0 and 7. As discussed above, Table IIIB has prestored codes for identifying which position corresponds to the ambiguous current intensity code, these pre-stored codes being determined by a process of interpolation. Each stored identification code represents an interpolation between one of the eight positions in FIG. 11b and one of the 32 positions in FIG. 11a. One algorithm for determining these identification codes is to draw a straight line connecting the points corresponding to the respective positions in FIGS. 11a and 11b, determine the location of the midpoint of the connecting line, and then assign a value to the identification code in dependence on whether the midpoint is closer to the point corresponding to the position in FIG. 6e, the point corresponding to the position in FIG. 6p, or substantially equidistant between these two points.

Returning to the flowchart of FIG. 9, block 148 indicates that the current X and Y codes are verified as being "sane" by Table IV. The "sane" current X and Y codes are output from Table IV and stored in RAM 71 in the CURRENT PROCESSED DATA register in place of the current X and Y codes already stored there. Thus, "insane" current codes will be replaced by their "sane" counter parts.

The next step is to retrieve the old "movement legal" X and Y codes and the current X and Y codes from RAM 71 and form an eight-bit address for accessing look-up table II ("TABLE II"). The decimal values for each of these codes are listed in columns 2-5 of Appendix II.

One possibly confusing aspect of Table II should be clarified before proceeding further. If one examines the entries under old "movement legal" code and current "movement legal" code, there seems to be a discrepancy in light of the appearance in these columns of the decimal value 3. It will be recalled that the term "movement legal" was defined to include the positions shown in FIGS. 6b-6d, 6f-6h and 6j-6l, none of which have the value 3 for either the X or Y code. In other words, the X and Y codes have been defined such that the decimal values are always 0, 1 or 2 for the nine "movement legal" positions. The reason that decimal values of 3 appear in the "movement legal" columns of Appendix II is simply that the table was generated by a computer and no attempt was made to prevent the inclusion of extraneous data. In other words, although the "movement legal" columns include 3's, these entries are extraneous. They are irrelevant in the sense that since the old "movement legal" X or Y code can never be equal to 3, all addresses having a 3 in the second and third columns of Appendix II will never be accessed Since these addresses are never accessed, it does not matter what data value is stored thereat. For the sake of continuity, the computer-generated values were stored at the unused addresses to preserve the sequence.

Focusing on only those addresses which are viable, the input of the old "movement legal" X and Y codes and the current X and Y codes results in the output of the current "movement legal" X and Y codes and the X and Y steps (i.e. X, Y). The X and Y steps are listed in columns 8 and 9 of Appendix II in decimal form. A unit move to the right or up is indicated by a 1 (11 in binary form) and a unit move to the left or down is indicated by a −1 (01 in binary form). A 0 (10 in binary form) indicates that there has been no unit move. The two least significant bits of the data values in Appendix II represent the Y value in binary form and the third and fourth least significant bits represent the X value in binary form.

As shown in block 152 in FIG. 9, the two Y bits are input to decoder 73. If the Y "grace" flag is set (block 154), indicating that the processing results should be ignored because of the likelihood of error (see blocks 144, 146), then the results are ignored and the Y "grace" flag is cleared (block 156). If the Y "grace" flag is not set, then the relative Y count in the Y bidirectional counter 75 is incremented or decremented in dependence on the output of decoder 73. If Y = +1, then the Y count is increased by one unit, whereas if Y = −1, then the Y count is decreased by one unit (block 158). If the X "grace" flag is set (block 162), then the X data is ignored and the X "grace" flag is cleared (block 164). If the X "grace" flag is not set, then the X count in the X bidirectional counter 77 is incremented or decremented (block 166) by one unit depending on the output of the decoder 73. Thus, the relative coordinate position of the mouse can be continuously determined in the foregoing manner by the microprocessor.

In accordance with the above-described embodiment, the position of a cursor can be controlled by the movement of a handheld mouse. It is to be understood that the above description of the preferred embodiment is presented for illustrative purposes only and is not intended to limit the scope of the present invention as claimed in the appended claims. Modifications and variations may be effected without departing from the scope of the inventive concept herein disclosed.

APPENDIX I

| Quandrants | | | | Ad- | | Flags | | Sus- | Codes | | |
|---|---|---|---|---|---|---|---|---|---|---|---|
| D | C | B | A | dress | Valid | X | Y | pect | X | Y | DATA |
| 0 | 0 | 0 | 0 | 0 | 0 | 0 | 0 | 0 | 3 | 3 | 15 |
| 0 | 0 | 0 | 1 | 1 | 0 | 0 | 0 | 0 | 3 | 3 | 15 |
| 0 | 0 | 1 | 0 | 2 | 0 | 0 | 0 | 0 | 3 | 3 | 15 |
| 0 | 0 | 1 | 1 | 3 | 0 | 0 | 0 | 0 | 3 | 3 | 15 |
| 0 | 1 | 0 | 0 | 4 | 0 | 0 | 0 | 0 | 3 | 3 | 15 |
| 0 | 1 | 0 | 1 | 5 | 0 | 0 | 0 | 0 | 3 | 3 | 15 |
| 0 | 1 | 1 | 0 | 6 | 0 | 0 | 0 | 0 | 3 | 3 | 15 |
| 0 | 1 | 1 | 1 | 7 | 0 | 0 | 0 | 0 | 3 | 3 | 15 |
| 1 | 0 | 0 | 0 | 8 | 0 | 0 | 0 | 0 | 3 | 3 | 15 |
| 1 | 0 | 0 | 1 | 9 | 0 | 0 | 0 | 0 | 3 | 3 | 15 |
| 1 | 0 | 1 | 0 | 10 | 0 | 0 | 0 | 0 | 3 | 3 | 15 |
| 1 | 0 | 1 | 1 | 11 | 0 | 0 | 0 | 0 | 3 | 3 | 15 |
| 1 | 1 | 0 | 0 | 12 | 0 | 0 | 0 | 0 | 3 | 3 | 15 |
| 1 | 1 | 0 | 1 | 13 | 0 | 0 | 0 | 0 | 3 | 3 | 15 |
| 1 | 1 | 1 | 0 | 14 | 0 | 0 | 0 | 0 | 3 | 3 | 15 |
| 1 | 1 | 1 | 1 | 15 | 0 | 0 | 0 | 0 | 3 | 3 | 15 |
| 0 | 0 | 0 | 2 | 16 | 0 | 0 | 0 | 0 | 2 | 2 | 10 |
| 0 | 0 | 0 | 3 | 17 | 0 | 0 | 0 | 0 | 2 | 2 | 10 |
| 0 | 0 | 1 | 2 | 18 | 0 | 0 | 1 | 1 | 2 | 0 | 56 |
| 0 | 0 | 1 | 3 | 19 | 0 | 0 | 0 | 0 | 2 | 2 | 10 |
| 0 | 1 | 0 | 2 | 20 | 1 | 1 | 1 | 0 | 0 | 0 | 224 |
| 0 | 1 | 0 | 3 | 21 | 1 | 1 | 1 | 0 | 0 | 0 | 224 |
| 0 | 1 | 1 | 2 | 22 | 1 | 1 | 1 | 0 | 0 | 0 | 224 |
| 0 | 1 | 1 | 3 | 23 | 0 | 0 | 1 | 0 | 2 | 0 | 40 |

APPENDIX I-continued

| Quandrants | | | | Ad- | | Flags | | Sus- | Codes | | |
|---|---|---|---|---|---|---|---|---|---|---|---|
| D | C | B | A | dress | Valid | X | Y | pect | X | Y | DATA |
| 1 | 0 | 0 | 2 | 24 | 0 | 1 | 0 | 1 | 0 | 2 | 82 |
| 1 | 0 | 0 | 3 | 25 | 0 | 0 | 0 | 0 | 2 | 2 | 10 |
| 1 | 0 | 1 | 2 | 26 | 1 | 1 | 1 | 0 | 0 | 0 | 224 |
| 1 | 0 | 1 | 3 | 27 | 0 | 0 | 0 | 0 | 2 | 2 | 10 |
| 1 | 1 | 0 | 2 | 28 | 1 | 1 | 1 | 0 | 0 | 0 | 224 |
| 1 | 1 | 0 | 3 | 29 | 0 | 1 | 0 | 0 | 0 | 2 | 66 |
| 1 | 1 | 1 | 2 | 30 | 1 | 1 | 1 | 0 | 0 | 0 | 224 |
| 1 | 1 | 1 | 3 | 31 | 1 | 1 | 1 | 0 | 0 | 0 | 224 |
| 0 | 0 | 2 | 0 | 32 | 0 | 0 | 0 | 0 | 2 | 1 | 9 |
| 0 | 0 | 2 | 1 | 33 | 0 | 0 | 1 | 1 | 2 | 0 | 56 |
| 0 | 0 | 3 | 0 | 34 | 0 | 0 | 0 | 0 | 2 | 1 | 9 |
| 0 | 0 | 3 | 1 | 35 | 0 | 0 | 0 | 0 | 2 | 1 | 9 |
| 0 | 1 | 2 | 0 | 36 | 0 | 1 | 0 | 1 | 0 | 1 | 81 |
| 0 | 1 | 2 | 1 | 37 | 1 | 1 | 1 | 0 | 0 | 0 | 224 |
| 0 | 1 | 3 | 0 | 38 | 0 | 0 | 0 | 0 | 2 | 1 | 9 |
| 0 | 1 | 3 | 1 | 39 | 0 | 0 | 0 | 0 | 2 | 1 | 9 |
| 1 | 0 | 2 | 0 | 40 | 1 | 1 | 1 | 0 | 0 | 0 | 224 |
| 1 | 0 | 2 | 1 | 41 | 1 | 1 | 1 | 0 | 0 | 0 | 224 |
| 1 | 0 | 3 | 0 | 42 | 1 | 1 | 1 | 0 | 0 | 0 | 224 |
| 1 | 0 | 3 | 1 | 43 | 0 | 0 | 1 | 0 | 2 | 0 | 40 |
| 1 | 1 | 2 | 0 | 44 | 1 | 1 | 1 | 0 | 0 | 0 | 224 |
| 1 | 1 | 2 | 1 | 45 | 1 | 1 | 1 | 0 | 0 | 0 | 224 |
| 1 | 1 | 3 | 0 | 46 | 0 | 1 | 0 | 0 | 0 | 1 | 65 |
| 1 | 1 | 3 | 1 | 47 | 1 | 1 | 1 | 0 | 0 | 0 | 224 |
| 0 | 0 | 2 | 2 | 48 | 0 | 0 | 0 | 1 | 2 | 3 | 27 |
| 0 | 0 | 2 | 3 | 49 | 0 | 0 | 1 | 0 | 2 | 0 | 40 |
| 0 | 0 | 3 | 2 | 50 | 0 | 0 | 1 | 0 | 2 | 0 | 40 |
| 0 | 0 | 3 | 3 | 51 | 0 | 0 | 0 | 0 | 2 | 0 | 8 |
| 0 | 1 | 2 | 2 | 52 | 0 | 1 | 1 | 0 | 0 | 1 | 97 |
| 0 | 1 | 2 | 3 | 53 | 0 | 0 | 0 | 0 | 2 | 0 | 8 |
| 0 | 1 | 3 | 2 | 54 | 0 | 0 | 1 | 0 | 2 | 0 | 40 |
| 0 | 1 | 3 | 3 | 55 | 0 | 0 | 0 | 0 | 2 | 0 | 8 |
| 1 | 0 | 2 | 2 | 56 | 0 | 1 | 1 | 0 | 0 | 1 | 97 |
| 1 | 0 | 2 | 3 | 57 | 0 | 0 | 1 | 0 | 2 | 0 | 40 |
| 1 | 0 | 3 | 2 | 58 | 0 | 0 | 0 | 0 | 2 | 0 | 8 |
| 1 | 0 | 3 | 3 | 59 | 0 | 0 | 0 | 0 | 2 | 0 | 8 |
| 1 | 1 | 2 | 2 | 60 | 0 | 1 | 1 | 0 | 0 | 1 | 97 |
| 1 | 1 | 2 | 3 | 61 | 0 | 0 | 1 | 0 | 2 | 0 | 40 |
| 1 | 1 | 3 | 2 | 62 | 0 | 0 | 1 | 0 | 2 | 0 | 40 |
| 1 | 1 | 3 | 3 | 63 | 0 | 0 | 0 | 0 | 2 | 0 | 8 |
| 0 | 2 | 0 | 0 | 64 | 0 | 0 | 0 | 0 | 1 | 1 | 5 |
| 0 | 2 | 0 | 1 | 65 | 1 | 1 | 1 | 0 | 0 | 0 | 224 |
| 0 | 2 | 1 | 0 | 66 | 0 | 1 | 0 | 1 | 0 | 1 | 81 |
| 0 | 2 | 1 | 1 | 67 | 1 | 1 | 1 | 0 | 0 | 0 | 224 |
| 0 | 3 | 0 | 0 | 68 | 0 | 0 | 0 | 0 | 1 | 1 | 5 |
| 0 | 3 | 0 | 1 | 69 | 1 | 1 | 1 | 0 | 0 | 0 | 224 |
| 0 | 3 | 1 | 0 | 70 | 0 | 0 | 0 | 0 | 1 | 1 | 5 |
| 0 | 3 | 1 | 1 | 71 | 0 | 1 | 0 | 0 | 0 | 1 | 65 |
| 1 | 2 | 0 | 0 | 72 | 0 | 0 | 1 | 1 | 1 | 0 | 52 |
| 1 | 2 | 0 | 1 | 73 | 1 | 1 | 1 | 0 | 0 | 0 | 224 |
| 1 | 2 | 1 | 0 | 74 | 1 | 1 | 1 | 0 | 0 | 0 | 224 |
| 1 | 2 | 1 | 1 | 75 | 1 | 1 | 1 | 0 | 0 | 0 | 224 |
| 1 | 3 | 0 | 0 | 76 | 0 | 0 | 0 | 0 | 1 | 1 | 5 |
| 1 | 3 | 0 | 1 | 77 | 0 | 0 | 1 | 0 | 1 | 0 | 36 |
| 1 | 3 | 1 | 0 | 78 | 0 | 0 | 0 | 0 | 1 | 1 | 5 |
| 1 | 3 | 1 | 1 | 79 | 1 | 1 | 1 | 0 | 0 | 0 | 224 |
| 0 | 2 | 0 | 2 | 80 | 1 | 1 | 1 | 0 | 0 | 0 | 224 |
| 0 | 2 | 0 | 3 | 81 | 1 | 1 | 1 | 0 | 0 | 0 | 224 |
| 0 | 2 | 1 | 2 | 82 | 1 | 1 | 1 | 0 | 0 | 0 | 224 |
| 0 | 2 | 1 | 3 | 83 | 1 | 1 | 1 | 0 | 0 | 0 | 224 |
| 0 | 3 | 0 | 2 | 84 | 1 | 1 | 1 | 0 | 0 | 0 | 224 |
| 0 | 3 | 0 | 3 | 85 | 1 | 1 | 1 | 0 | 0 | 0 | 224 |
| 0 | 3 | 1 | 2 | 86 | 1 | 1 | 1 | 0 | 0 | 0 | 224 |
| 0 | 3 | 1 | 3 | 87 | 1 | 1 | 1 | 0 | 0 | 0 | 224 |
| 1 | 2 | 0 | 2 | 88 | 1 | 1 | 1 | 0 | 0 | 0 | 224 |
| 1 | 2 | 0 | 3 | 89 | 1 | 1 | 1 | 0 | 0 | 0 | 224 |
| 1 | 2 | 1 | 2 | 90 | 0 | 1 | 1 | 0 | 0 | 1 | 97 |
| 1 | 2 | 1 | 3 | 91 | 1 | 1 | 1 | 0 | 0 | 0 | 224 |
| 1 | 3 | 0 | 2 | 92 | 1 | 1 | 1 | 0 | 0 | 0 | 224 |
| 1 | 3 | 0 | 3 | 93 | 1 | 1 | 1 | 0 | 0 | 0 | 224 |
| 1 | 3 | 1 | 2 | 94 | 1 | 1 | 1 | 0 | 0 | 0 | 224 |
| 1 | 3 | 1 | 3 | 95 | 1 | 1 | 1 | 0 | 0 | 0 | 224 |
| 0 | 2 | 2 | 0 | 96 | 0 | 0 | 0 | 1 | 3 | 1 | 29 |
| 0 | 2 | 2 | 1 | 97 | 0 | 1 | 1 | 0 | 0 | 1 | 97 |
| 0 | 2 | 3 | 0 | 98 | 0 | 1 | 0 | 0 | 0 | 1 | 65 |
| 0 | 2 | 3 | 1 | 99 | 0 | 1 | 0 | 0 | 0 | 1 | 65 |
| 0 | 3 | 2 | 0 | 100 | 0 | 1 | 0 | 0 | 0 | 1 | 65 |
| 0 | 3 | 2 | 1 | 101 | 0 | 0 | 0 | 0 | 0 | 1 | 1 |
| 0 | 3 | 3 | 0 | 102 | 0 | 0 | 0 | 0 | 0 | 1 | 1 |

APPENDIX I-continued

| Quandrants | | | | Ad- | | Flags | | Sus- | Codes | | |
|---|---|---|---|---|---|---|---|---|---|---|---|
| D | C | B | A | dress | Valid | X | Y | pect | X | Y | DATA |
| 0 | 3 | 3 | 1 | 103 | 0 | 0 | 0 | 0 | 0 | 1 | 1 |
| 1 | 2 | 2 | 0 | 104 | 0 | 1 | 1 | 0 | 0 | 1 | 97 |
| 1 | 2 | 2 | 1 | 105 | 0 | 1 | 1 | 0 | 0 | 1 | 97 |
| 1 | 2 | 3 | 0 | 106 | 0 | 0 | 0 | 0 | 0 | 1 | 1 |
| 1 | 2 | 3 | 1 | 107 | 0 | 1 | 0 | 0 | 0 | 1 | 65 |
| 1 | 3 | 2 | 0 | 108 | 0 | 1 | 0 | 0 | 0 | 1 | 65 |
| 1 | 3 | 2 | 1 | 109 | 0 | 1 | 0 | 0 | 0 | 1 | 65 |
| 1 | 3 | 3 | 0 | 110 | 0 | 0 | 0 | 0 | 0 | 1 | 1 |
| 1 | 3 | 3 | 1 | 111 | 0 | 0 | 0 | 0 | 0 | 1 | 1 |
| 0 | 2 | 2 | 2 | 112 | 1 | 1 | 1 | 0 | 0 | 0 | 224 |
| 0 | 2 | 2 | 3 | 113 | 1 | 1 | 1 | 0 | 0 | 0 | 224 |
| 0 | 2 | 3 | 2 | 114 | 1 | 1 | 1 | 0 | 0 | 0 | 224 |
| 0 | 2 | 3 | 3 | 115 | 1 | 1 | 1 | 0 | 0 | 0 | 224 |
| 0 | 3 | 2 | 2 | 116 | 1 | 1 | 1 | 0 | 0 | 0 | 224 |
| 0 | 3 | 2 | 3 | 117 | 1 | 1 | 1 | 0 | 0 | 0 | 224 |
| 0 | 3 | 3 | 2 | 118 | 1 | 1 | 1 | 0 | 0 | 0 | 224 |
| 0 | 3 | 3 | 3 | 119 | 1 | 1 | 1 | 0 | 0 | 0 | 224 |
| 1 | 2 | 2 | 2 | 120 | 1 | 1 | 1 | 0 | 0 | 0 | 224 |
| 1 | 2 | 2 | 3 | 121 | 1 | 1 | 1 | 0 | 0 | 0 | 224 |
| 1 | 2 | 3 | 2 | 122 | 1 | 1 | 1 | 0 | 0 | 0 | 224 |
| 1 | 2 | 3 | 3 | 123 | 0 | 1 | 0 | 0 | 0 | 0 | 64 |
| 1 | 3 | 2 | 2 | 124 | 1 | 1 | 1 | 0 | 0 | 0 | 224 |
| 1 | 3 | 2 | 3 | 125 | 1 | 1 | 1 | 0 | 0 | 0 | 224 |
| 1 | 3 | 3 | 2 | 126 | 0 | 0 | 1 | 0 | 0 | 0 | 32 |
| 1 | 3 | 3 | 3 | 127 | 1 | 1 | 1 | 0 | 0 | 0 | 224 |
| 2 | 0 | 0 | 0 | 128 | 0 | 0 | 0 | 0 | 1 | 2 | 6 |
| 2 | 0 | 0 | 1 | 129 | 0 | 1 | 0 | 1 | 0 | 2 | 82 |
| 2 | 0 | 1 | 0 | 130 | 1 | 1 | 1 | 0 | 0 | 0 | 224 |
| 2 | 0 | 1 | 1 | 131 | 1 | 1 | 1 | 0 | 0 | 0 | 224 |
| 2 | 1 | 0 | 0 | 132 | 0 | 0 | 1 | 1 | 1 | 0 | 52 |
| 2 | 1 | 0 | 1 | 133 | 1 | 1 | 1 | 0 | 0 | 0 | 224 |
| 2 | 1 | 1 | 0 | 134 | 1 | 1 | 1 | 0 | 0 | 0 | 224 |
| 2 | 1 | 1 | 1 | 135 | 1 | 1 | 1 | 0 | 0 | 0 | 224 |
| 3 | 0 | 0 | 0 | 136 | 0 | 0 | 0 | 0 | 1 | 2 | 6 |
| 3 | 0 | 0 | 1 | 137 | 0 | 0 | 0 | 0 | 1 | 2 | 6 |
| 3 | 0 | 1 | 0 | 138 | 1 | 1 | 1 | 0 | 0 | 0 | 224 |
| 3 | 0 | 1 | 1 | 139 | 0 | 1 | 0 | 0 | 0 | 2 | 66 |
| 3 | 1 | 0 | 0 | 140 | 0 | 0 | 0 | 0 | 1 | 2 | 6 |
| 3 | 1 | 0 | 1 | 141 | 0 | 0 | 0 | 0 | 1 | 2 | 6 |
| 3 | 1 | 1 | 0 | 142 | 0 | 0 | 1 | 0 | 1 | 0 | 36 |
| 3 | 1 | 1 | 1 | 143 | 1 | 1 | 1 | 0 | 0 | 0 | 224 |
| 2 | 0 | 0 | 2 | 144 | 0 | 0 | 0 | 1 | 3 | 2 | 30 |
| 2 | 0 | 0 | 3 | 145 | 0 | 1 | 0 | 0 | 0 | 2 | 66 |
| 2 | 0 | 1 | 2 | 146 | 0 | 1 | 1 | 0 | 0 | 1 | 97 |
| 2 | 0 | 1 | 3 | 147 | 0 | 1 | 0 | 0 | 0 | 2 | 66 |
| 2 | 1 | 0 | 2 | 148 | 0 | 1 | 1 | 0 | 0 | 1 | 97 |
| 2 | 1 | 0 | 3 | 149 | 0 | 0 | 0 | 0 | 0 | 2 | 2 |
| 2 | 1 | 1 | 2 | 150 | 0 | 1 | 1 | 0 | 0 | 1 | 97 |
| 2 | 1 | 1 | 3 | 151 | 0 | 1 | 0 | 0 | 0 | 2 | 66 |
| 3 | 0 | 0 | 2 | 152 | 0 | 1 | 0 | 0 | 0 | 2 | 66 |
| 3 | 0 | 0 | 3 | 153 | 0 | 0 | 0 | 0 | 0 | 2 | 2 |
| 3 | 0 | 1 | 2 | 154 | 0 | 0 | 0 | 0 | 0 | 2 | 2 |
| 3 | 0 | 1 | 3 | 155 | 0 | 0 | 0 | 0 | 0 | 2 | 2 |
| 3 | 1 | 0 | 2 | 156 | 0 | 1 | 0 | 0 | 0 | 2 | 66 |
| 3 | 1 | 0 | 3 | 157 | 0 | 0 | 0 | 0 | 0 | 2 | 2 |
| 3 | 1 | 1 | 2 | 158 | 0 | 1 | 0 | 0 | 0 | 2 | 66 |
| 3 | 1 | 1 | 3 | 159 | 0 | 0 | 0 | 0 | 0 | 2 | 2 |
| 2 | 0 | 2 | 0 | 160 | 1 | 1 | 1 | 0 | 0 | 0 | 224 |
| 2 | 0 | 2 | 1 | 161 | 1 | 1 | 1 | 0 | 0 | 0 | 224 |
| 2 | 0 | 3 | 0 | 162 | 1 | 1 | 1 | 0 | 0 | 0 | 224 |
| 2 | 0 | 3 | 1 | 163 | 1 | 1 | 1 | 0 | 0 | 0 | 224 |
| 2 | 1 | 2 | 0 | 164 | 1 | 1 | 1 | 0 | 0 | 0 | 224 |
| 2 | 1 | 2 | 1 | 165 | 0 | 1 | 1 | 0 | 0 | 1 | 97 |
| 2 | 1 | 3 | 0 | 166 | 1 | 1 | 1 | 0 | 0 | 0 | 224 |
| 2 | 1 | 3 | 1 | 167 | 1 | 1 | 1 | 0 | 0 | 0 | 224 |
| 3 | 0 | 2 | 0 | 168 | 1 | 1 | 1 | 0 | 0 | 0 | 224 |
| 3 | 0 | 2 | 1 | 169 | 1 | 1 | 1 | 0 | 0 | 0 | 224 |
| 3 | 0 | 3 | 0 | 170 | 1 | 1 | 1 | 0 | 0 | 0 | 224 |
| 3 | 0 | 3 | 1 | 171 | 1 | 1 | 1 | 0 | 0 | 0 | 224 |
| 3 | 1 | 2 | 0 | 172 | 1 | 1 | 1 | 0 | 0 | 0 | 224 |
| 3 | 1 | 2 | 1 | 173 | 1 | 1 | 1 | 0 | 0 | 0 | 224 |
| 3 | 1 | 3 | 0 | 174 | 1 | 1 | 1 | 0 | 0 | 0 | 224 |
| 3 | 1 | 3 | 1 | 175 | 1 | 1 | 1 | 0 | 0 | 0 | 224 |
| 2 | 0 | 2 | 2 | 176 | 1 | 1 | 1 | 0 | 0 | 0 | 224 |
| 2 | 0 | 2 | 3 | 177 | 1 | 1 | 1 | 0 | 0 | 0 | 224 |
| 2 | 0 | 3 | 2 | 178 | 1 | 1 | 1 | 0 | 0 | 0 | 224 |
| 2 | 0 | 3 | 3 | 179 | 1 | 1 | 1 | 0 | 0 | 0 | 224 |
| 2 | 1 | 2 | 2 | 180 | 1 | 1 | 1 | 0 | 0 | 0 | 224 |
| 2 | 1 | 2 | 3 | 181 | 1 | 1 | 1 | 0 | 0 | 0 | 224 |
| 2 | 1 | 3 | 2 | 182 | 1 | 1 | 1 | 0 | 0 | 0 | 224 |
| 2 | 1 | 3 | 3 | 183 | 0 | 1 | 0 | 0 | 0 | 0 | 64 |
| 3 | 0 | 2 | 2 | 184 | 1 | 1 | 1 | 0 | 0 | 0 | 224 |
| 3 | 0 | 2 | 3 | 185 | 1 | 1 | 1 | 0 | 0 | 0 | 224 |
| 3 | 0 | 3 | 2 | 186 | 1 | 1 | 1 | 0 | 0 | 0 | 224 |
| 3 | 0 | 3 | 3 | 187 | 1 | 1 | 1 | 0 | 0 | 0 | 224 |
| 3 | 1 | 2 | 2 | 188 | 1 | 1 | 1 | 0 | 0 | 0 | 224 |
| 3 | 1 | 2 | 3 | 189 | 0 | 0 | 1 | 0 | 0 | 0 | 32 |
| 3 | 1 | 3 | 2 | 190 | 1 | 1 | 1 | 0 | 0 | 0 | 224 |
| 3 | 1 | 3 | 3 | 191 | 1 | 1 | 1 | 0 | 0 | 0 | 224 |
| 2 | 2 | 0 | 0 | 192 | 0 | 0 | 0 | 1 | 1 | 3 | 23 |
| 2 | 2 | 0 | 1 | 193 | 0 | 1 | 1 | 0 | 0 | 1 | 97 |
| 2 | 2 | 1 | 0 | 194 | 0 | 1 | 1 | 0 | 0 | 1 | 97 |
| 2 | 2 | 1 | 1 | 195 | 0 | 1 | 1 | 0 | 0 | 1 | 97 |
| 2 | 3 | 0 | 0 | 196 | 0 | 0 | 1 | 0 | 1 | 0 | 36 |
| 2 | 3 | 0 | 1 | 197 | 0 | 0 | 0 | 0 | 1 | 0 | 4 |
| 2 | 3 | 1 | 0 | 198 | 0 | 0 | 1 | 0 | 1 | 0 | 36 |
| 2 | 3 | 1 | 1 | 199 | 0 | 0 | 1 | 0 | 1 | 0 | 36 |
| 3 | 2 | 0 | 0 | 200 | 0 | 0 | 1 | 0 | 1 | 0 | 36 |
| 3 | 2 | 0 | 1 | 201 | 0 | 0 | 1 | 0 | 1 | 0 | 36 |
| 3 | 2 | 1 | 0 | 202 | 0 | 0 | 0 | 0 | 1 | 0 | 4 |
| 3 | 2 | 1 | 1 | 203 | 0 | 0 | 1 | 0 | 1 | 0 | 36 |
| 3 | 3 | 0 | 0 | 204 | 0 | 0 | 0 | 0 | 1 | 0 | 4 |
| 3 | 3 | 0 | 1 | 205 | 0 | 0 | 0 | 0 | 1 | 0 | 4 |
| 3 | 3 | 1 | 0 | 206 | 0 | 0 | 0 | 0 | 1 | 0 | 4 |
| 3 | 3 | 1 | 1 | 207 | 0 | 0 | 0 | 0 | 1 | 0 | 4 |
| 2 | 2 | 0 | 2 | 208 | 1 | 1 | 1 | 0 | 0 | 0 | 224 |
| 2 | 2 | 0 | 3 | 209 | 1 | 1 | 1 | 0 | 0 | 0 | 224 |
| 2 | 2 | 1 | 2 | 210 | 1 | 1 | 1 | 0 | 0 | 0 | 224 |
| 2 | 2 | 1 | 3 | 211 | 1 | 1 | 1 | 0 | 0 | 0 | 224 |
| 2 | 3 | 0 | 2 | 212 | 1 | 1 | 1 | 0 | 0 | 0 | 224 |
| 2 | 3 | 0 | 3 | 213 | 1 | 1 | 1 | 0 | 0 | 0 | 224 |
| 2 | 3 | 1 | 2 | 214 | 1 | 1 | 1 | 0 | 0 | 0 | 224 |
| 2 | 3 | 1 | 3 | 215 | 1 | 1 | 1 | 0 | 0 | 0 | 224 |
| 3 | 2 | 0 | 2 | 216 | 1 | 1 | 1 | 0 | 0 | 0 | 224 |
| 3 | 2 | 0 | 3 | 217 | 1 | 1 | 1 | 0 | 0 | 0 | 224 |
| 3 | 2 | 1 | 2 | 218 | 1 | 1 | 1 | 0 | 0 | 0 | 224 |
| 3 | 2 | 1 | 3 | 219 | 0 | 0 | 1 | 0 | 0 | 0 | 32 |
| 3 | 3 | 0 | 2 | 220 | 1 | 1 | 1 | 0 | 0 | 0 | 224 |
| 3 | 3 | 0 | 3 | 221 | 1 | 1 | 1 | 0 | 0 | 0 | 224 |
| 3 | 3 | 1 | 2 | 222 | 0 | 1 | 0 | 0 | 0 | 0 | 64 |
| 3 | 3 | 1 | 3 | 223 | 1 | 1 | 1 | 0 | 0 | 0 | 224 |
| 2 | 2 | 2 | 0 | 224 | 1 | 1 | 1 | 0 | 0 | 0 | 224 |
| 2 | 2 | 2 | 1 | 225 | 1 | 1 | 1 | 0 | 0 | 0 | 224 |
| 2 | 2 | 3 | 0 | 226 | 1 | 1 | 1 | 0 | 0 | 0 | 224 |
| 2 | 2 | 3 | 1 | 227 | 1 | 1 | 1 | 0 | 0 | 0 | 224 |
| 2 | 3 | 2 | 0 | 228 | 1 | 1 | 1 | 0 | 0 | 0 | 224 |
| 2 | 3 | 2 | 1 | 229 | 1 | 1 | 1 | 0 | 0 | 0 | 224 |
| 2 | 3 | 3 | 0 | 230 | 1 | 1 | 1 | 0 | 0 | 0 | 224 |
| 2 | 3 | 3 | 1 | 231 | 0 | 0 | 1 | 0 | 0 | 0 | 32 |
| 3 | 2 | 2 | 0 | 232 | 1 | 1 | 1 | 0 | 0 | 0 | 224 |
| 3 | 2 | 2 | 1 | 233 | 1 | 1 | 1 | 0 | 0 | 0 | 224 |
| 3 | 2 | 3 | 0 | 234 | 1 | 1 | 1 | 0 | 0 | 0 | 224 |
| 3 | 2 | 3 | 1 | 235 | 1 | 1 | 1 | 0 | 0 | 0 | 224 |
| 3 | 3 | 2 | 0 | 236 | 1 | 1 | 1 | 0 | 0 | 0 | 224 |
| 3 | 3 | 2 | 1 | 237 | 0 | 1 | 0 | 0 | 0 | 0 | 64 |
| 3 | 3 | 3 | 0 | 238 | 1 | 1 | 1 | 0 | 0 | 0 | 224 |
| 3 | 3 | 3 | 1 | 239 | 1 | 1 | 1 | 0 | 0 | 0 | 224 |
| 2 | 2 | 2 | 2 | 240 | 0 | 1 | 1 | 0 | 0 | 1 | 97 |
| 2 | 2 | 2 | 3 | 241 | 1 | 1 | 1 | 0 | 0 | 0 | 224 |
| 2 | 2 | 3 | 2 | 242 | 1 | 1 | 1 | 0 | 0 | 0 | 224 |
| 2 | 2 | 3 | 3 | 243 | 0 | 1 | 0 | 0 | 0 | 0 | 64 |
| 2 | 3 | 2 | 2 | 244 | 1 | 1 | 1 | 0 | 0 | 0 | 224 |
| 2 | 3 | 2 | 3 | 245 | 1 | 1 | 1 | 0 | 0 | 0 | 224 |
| 2 | 3 | 3 | 2 | 246 | 0 | 0 | 1 | 0 | 0 | 0 | 32 |
| 2 | 3 | 3 | 3 | 247 | 0 | 0 | 0 | 0 | 0 | 0 | 0 |
| 3 | 2 | 2 | 2 | 248 | 1 | 1 | 1 | 0 | 0 | 0 | 224 |
| 3 | 2 | 2 | 3 | 249 | 0 | 0 | 1 | 0 | 0 | 0 | 32 |
| 3 | 2 | 3 | 2 | 250 | 1 | 1 | 1 | 0 | 0 | 0 | 224 |
| 3 | 2 | 3 | 3 | 251 | 0 | 0 | 0 | 0 | 0 | 0 | 0 |
| 3 | 3 | 2 | 2 | 252 | 0 | 1 | 0 | 0 | 0 | 0 | 64 |
| 3 | 3 | 2 | 3 | 253 | 0 | 0 | 0 | 0 | 0 | 0 | 0 |
| 3 | 3 | 3 | 2 | 254 | 0 | 0 | 0 | 0 | 0 | 0 | 0 |
| 3 | 3 | 3 | 3 | 255 | 0 | 0 | 0 | 0 | 0 | 0 | 0 |

APPENDIX II

| Address | Old Movement Legal Code X | Old Movement Legal Code Y | Current Code X | Current Code Y | Current Movement Legal Code X | Current Movement Legal Code Y | Step X | Step Y | DATA |
|---|---|---|---|---|---|---|---|---|---|
| 0 | 0 | 0 | 0 | 0 | 0 | 0 | 0 | 0 | 10 |
| 1 | 0 | 0 | 0 | 1 | 0 | 1 | 0 | 1 | 27 |
| 2 | 0 | 0 | 0 | 2 | 0 | 2 | 0 | -1 | 41 |
| 3 | 0 | 0 | 0 | 3 | 0 | 0 | 0 | 0 | 10 |
| 4 | 0 | 0 | 1 | 0 | 1 | 0 | 1 | 0 | 78 |
| 5 | 0 | 0 | 1 | 1 | 1 | 1 | 1 | 1 | 95 |
| 6 | 0 | 0 | 1 | 2 | 1 | 2 | 1 | -1 | 109 |
| 7 | 0 | 0 | 1 | 3 | 1 | 0 | 1 | 0 | 78 |
| 8 | 0 | 0 | 2 | 0 | 2 | 0 | -1 | 0 | 134 |
| 9 | 0 | 0 | 2 | 1 | 2 | 1 | -1 | 1 | 151 |
| 10 | 0 | 0 | 2 | 2 | 2 | 2 | -1 | -1 | 165 |
| 11 | 0 | 0 | 2 | 3 | 2 | 0 | -1 | 0 | 134 |
| 12 | 0 | 0 | 3 | 0 | 0 | 0 | 0 | 0 | 10 |
| 13 | 0 | 0 | 3 | 1 | 0 | 1 | 0 | 1 | 27 |
| 14 | 0 | 0 | 3 | 2 | 0 | 2 | 0 | -1 | 41 |
| 15 | 0 | 0 | 3 | 3 | 0 | 0 | 0 | 0 | 10 |
| 16 | 0 | 1 | 0 | 0 | 0 | 0 | 0 | -1 | 9 |
| 17 | 0 | 1 | 0 | 1 | 0 | 1 | 0 | 0 | 26 |
| 18 | 0 | 1 | 0 | 2 | 0 | 2 | 0 | 1 | 43 |
| 19 | 0 | 1 | 0 | 3 | 0 | 1 | 0 | 0 | 26 |
| 20 | 0 | 1 | 1 | 0 | 1 | 0 | 1 | -1 | 77 |
| 21 | 0 | 1 | 1 | 1 | 1 | 1 | 1 | 0 | 94 |
| 22 | 0 | 1 | 1 | 2 | 1 | 2 | 1 | 1 | 111 |
| 23 | 0 | 1 | 1 | 3 | 1 | 1 | 1 | 0 | 94 |
| 24 | 0 | 1 | 2 | 0 | 2 | 0 | -1 | -1 | 133 |
| 25 | 0 | 1 | 2 | 1 | 2 | 1 | -1 | 0 | 150 |
| 26 | 0 | 1 | 2 | 2 | 2 | 2 | -1 | 1 | 167 |
| 27 | 0 | 1 | 2 | 3 | 2 | 1 | -1 | 0 | 150 |
| 28 | 0 | 1 | 3 | 0 | 0 | 0 | 0 | -1 | 9 |
| 29 | 0 | 1 | 3 | 1 | 0 | 1 | 0 | 0 | 26 |
| 30 | 0 | 1 | 3 | 2 | 0 | 2 | 0 | 1 | 43 |
| 31 | 0 | 1 | 3 | 3 | 0 | 1 | 0 | 0 | 26 |
| 32 | 0 | 2 | 0 | 0 | 0 | 0 | 0 | 1 | 11 |
| 33 | 0 | 2 | 0 | 1 | 0 | 1 | 0 | -1 | 25 |
| 34 | 0 | 2 | 0 | 2 | 0 | 2 | 0 | 0 | 42 |
| 35 | 0 | 2 | 0 | 3 | 0 | 2 | 0 | 0 | 42 |
| 36 | 0 | 2 | 1 | 0 | 1 | 0 | 1 | 1 | 79 |
| 37 | 0 | 2 | 1 | 1 | 1 | 1 | 1 | -1 | 93 |
| 38 | 0 | 2 | 1 | 2 | 1 | 2 | 1 | 0 | 110 |
| 39 | 0 | 2 | 1 | 3 | 1 | 2 | 1 | 0 | 110 |
| 40 | 0 | 2 | 2 | 0 | 2 | 0 | -1 | 1 | 135 |
| 41 | 0 | 2 | 2 | 1 | 2 | 1 | -1 | -1 | 149 |
| 42 | 0 | 2 | 2 | 2 | 2 | 2 | -1 | 0 | 166 |
| 43 | 0 | 2 | 2 | 3 | 2 | 2 | -1 | 0 | 166 |
| 44 | 0 | 2 | 3 | 0 | 0 | 0 | 0 | 1 | 11 |
| 45 | 0 | 2 | 3 | 1 | 0 | 1 | 0 | -1 | 25 |
| 46 | 0 | 2 | 3 | 2 | 0 | 2 | 0 | 0 | 42 |
| 47 | 0 | 2 | 3 | 3 | 0 | 2 | 0 | 0 | 42 |
| 48 | 0 | 3 | 0 | 0 | 0 | 3 | 0 | 0 | 58 |
| 49 | 0 | 3 | 0 | 1 | 0 | 3 | 0 | 0 | 58 |
| 50 | 0 | 3 | 0 | 2 | 0 | 3 | 0 | 0 | 58 |
| 51 | 0 | 3 | 0 | 3 | 0 | 3 | 0 | 0 | 58 |
| 52 | 0 | 3 | 1 | 0 | 1 | 3 | 1 | 0 | 126 |
| 53 | 0 | 3 | 1 | 1 | 1 | 3 | 1 | 0 | 126 |
| 54 | 0 | 3 | 1 | 2 | 1 | 3 | 1 | 0 | 126 |
| 55 | 0 | 3 | 1 | 3 | 1 | 3 | 1 | 0 | 126 |
| 56 | 0 | 3 | 2 | 0 | 2 | 3 | -1 | 0 | 182 |
| 57 | 0 | 3 | 2 | 1 | 2 | 3 | -1 | 0 | 182 |
| 58 | 0 | 3 | 2 | 2 | 2 | 3 | -1 | 0 | 182 |
| 59 | 0 | 3 | 2 | 3 | 2 | 3 | -1 | 0 | 182 |
| 60 | 0 | 3 | 3 | 0 | 0 | 3 | 0 | 0 | 58 |
| 61 | 0 | 3 | 3 | 1 | 0 | 3 | 0 | 0 | 58 |
| 62 | 0 | 3 | 3 | 2 | 0 | 3 | 0 | 0 | 58 |
| 63 | 0 | 3 | 3 | 3 | 0 | 3 | 0 | 0 | 58 |
| 64 | 1 | 0 | 0 | 0 | 0 | 0 | -1 | 0 | 6 |
| 65 | 1 | 0 | 0 | 1 | 0 | 1 | -1 | 1 | 23 |
| 66 | 1 | 0 | 0 | 2 | 0 | 2 | -1 | -1 | 37 |
| 67 | 1 | 0 | 0 | 3 | 0 | 0 | -1 | 0 | 6 |
| 68 | 1 | 0 | 1 | 0 | 1 | 0 | 0 | 0 | 74 |
| 69 | 1 | 0 | 1 | 1 | 1 | 1 | 0 | 1 | 91 |
| 70 | 1 | 0 | 1 | 2 | 1 | 2 | 0 | -1 | 105 |
| 71 | 1 | 0 | 1 | 3 | 1 | 0 | 0 | 0 | 74 |
| 72 | 1 | 0 | 2 | 0 | 2 | 0 | 1 | 0 | 142 |
| 73 | 1 | 0 | 2 | 1 | 2 | 1 | 1 | 1 | 159 |
| 74 | 1 | 0 | 2 | 2 | 2 | 2 | 1 | -1 | 173 |
| 75 | 1 | 0 | 2 | 3 | 2 | 0 | 1 | 0 | 142 |
| 76 | 1 | 0 | 3 | 0 | 1 | 0 | 0 | 0 | 74 |
| 77 | 1 | 0 | 3 | 1 | 1 | 1 | 0 | 1 | 91 |
| 78 | 1 | 0 | 3 | 2 | 1 | 2 | 0 | -1 | 105 |
| 79 | 1 | 0 | 3 | 3 | 1 | 0 | 0 | 0 | 74 |
| 80 | 1 | 1 | 0 | 0 | 0 | 0 | -1 | -1 | 5 |
| 81 | 1 | 1 | 0 | 1 | 0 | 1 | -1 | 0 | 22 |
| 82 | 1 | 1 | 0 | 2 | 0 | 2 | -1 | 1 | 39 |
| 83 | 1 | 1 | 0 | 3 | 0 | 1 | -1 | 0 | 22 |
| 84 | 1 | 1 | 1 | 0 | 1 | 0 | 0 | -1 | 73 |
| 85 | 1 | 1 | 1 | 1 | 1 | 1 | 0 | 0 | 90 |
| 86 | 1 | 1 | 1 | 2 | 1 | 2 | 0 | 1 | 107 |
| 87 | 1 | 1 | 1 | 3 | 1 | 1 | 0 | 0 | 90 |
| 88 | 1 | 1 | 2 | 0 | 2 | 0 | 1 | -1 | 141 |
| 89 | 1 | 1 | 2 | 1 | 2 | 1 | 1 | 0 | 158 |
| 90 | 1 | 1 | 2 | 2 | 2 | 2 | 1 | 1 | 175 |
| 91 | 1 | 1 | 2 | 3 | 2 | 1 | 1 | 0 | 158 |
| 92 | 1 | 1 | 3 | 0 | 1 | 0 | 0 | -1 | 73 |
| 93 | 1 | 1 | 3 | 1 | 1 | 1 | 0 | 0 | 90 |
| 94 | 1 | 1 | 3 | 2 | 1 | 2 | 0 | 1 | 107 |
| 95 | 1 | 1 | 3 | 3 | 1 | 1 | 0 | 0 | 90 |
| 96 | 1 | 2 | 0 | 0 | 0 | 0 | -1 | 1 | 7 |
| 97 | 1 | 2 | 0 | 1 | 0 | 1 | -1 | -1 | 21 |
| 98 | 1 | 2 | 0 | 2 | 0 | 2 | -1 | 0 | 38 |
| 99 | 1 | 2 | 0 | 3 | 0 | 2 | -1 | 0 | 38 |
| 100 | 1 | 2 | 1 | 0 | 1 | 0 | 0 | 1 | 75 |
| 101 | 1 | 2 | 1 | 1 | 1 | 1 | 0 | -1 | 89 |
| 102 | 1 | 2 | 1 | 2 | 1 | 2 | 0 | 0 | 106 |
| 103 | 1 | 2 | 1 | 3 | 1 | 2 | 0 | 0 | 106 |
| 104 | 1 | 2 | 2 | 0 | 2 | 0 | 1 | 1 | 143 |
| 105 | 1 | 2 | 2 | 1 | 2 | 1 | 1 | -1 | 157 |
| 106 | 1 | 2 | 2 | 2 | 2 | 2 | 1 | 0 | 174 |
| 107 | 1 | 2 | 2 | 3 | 2 | 2 | 1 | 0 | 174 |
| 108 | 1 | 2 | 3 | 0 | 1 | 0 | 0 | 1 | 75 |
| 109 | 1 | 2 | 3 | 1 | 1 | 1 | 0 | -1 | 89 |
| 110 | 1 | 2 | 3 | 2 | 1 | 2 | 0 | 0 | 106 |
| 111 | 1 | 2 | 3 | 3 | 1 | 2 | 0 | 0 | 106 |
| 112 | 1 | 3 | 0 | 0 | 0 | 3 | -1 | 0 | 54 |
| 113 | 1 | 3 | 0 | 1 | 0 | 3 | -1 | 0 | 54 |
| 114 | 1 | 3 | 0 | 2 | 0 | 3 | -1 | 0 | 54 |
| 115 | 1 | 3 | 0 | 3 | 0 | 3 | -1 | 0 | 54 |
| 116 | 1 | 3 | 1 | 0 | 1 | 3 | 0 | 0 | 122 |
| 117 | 1 | 3 | 1 | 1 | 1 | 3 | 0 | 0 | 122 |
| 118 | 1 | 3 | 1 | 2 | 1 | 3 | 0 | 0 | 122 |
| 119 | 1 | 3 | 1 | 3 | 1 | 3 | 0 | 0 | 122 |
| 120 | 1 | 3 | 2 | 0 | 2 | 3 | 1 | 0 | 190 |
| 121 | 1 | 3 | 2 | 1 | 2 | 3 | 1 | 0 | 190 |
| 122 | 1 | 3 | 2 | 2 | 2 | 3 | 1 | 0 | 190 |
| 123 | 1 | 3 | 2 | 3 | 2 | 3 | 1 | 0 | 190 |
| 124 | 1 | 3 | 3 | 0 | 1 | 3 | 0 | 0 | 122 |
| 125 | 1 | 3 | 3 | 1 | 1 | 3 | 0 | 0 | 122 |
| 126 | 1 | 3 | 3 | 2 | 1 | 3 | 0 | 0 | 122 |
| 127 | 1 | 3 | 3 | 3 | 1 | 3 | 0 | 0 | 122 |
| 128 | 2 | 0 | 0 | 0 | 0 | 0 | 1 | 0 | 14 |
| 129 | 2 | 0 | 0 | 1 | 0 | 1 | 1 | 1 | 31 |
| 130 | 2 | 0 | 0 | 2 | 0 | 2 | 1 | -1 | 45 |
| 131 | 2 | 0 | 0 | 3 | 0 | 0 | 1 | 0 | 14 |
| 132 | 2 | 0 | 1 | 0 | 1 | 0 | -1 | 0 | 70 |
| 133 | 2 | 0 | 1 | 1 | 1 | 1 | -1 | 1 | 87 |
| 134 | 2 | 0 | 1 | 2 | 1 | 2 | -1 | -1 | 101 |
| 135 | 2 | 0 | 1 | 3 | 1 | 0 | -1 | 0 | 70 |
| 136 | 2 | 0 | 2 | 0 | 2 | 0 | 0 | 0 | 138 |
| 137 | 2 | 0 | 2 | 1 | 2 | 1 | 0 | 1 | 155 |
| 138 | 2 | 0 | 2 | 2 | 2 | 2 | 0 | -1 | 169 |
| 139 | 2 | 0 | 2 | 3 | 2 | 0 | 0 | 0 | 138 |
| 140 | 2 | 0 | 3 | 0 | 2 | 0 | 0 | 0 | 138 |
| 141 | 2 | 0 | 3 | 1 | 2 | 1 | 0 | 1 | 155 |
| 142 | 2 | 0 | 3 | 2 | 2 | 2 | 0 | -1 | 169 |
| 143 | 2 | 0 | 3 | 3 | 2 | 0 | 0 | 0 | 138 |
| 144 | 2 | 1 | 0 | 0 | 0 | 0 | 1 | -1 | 13 |
| 145 | 2 | 1 | 0 | 1 | 0 | 1 | 1 | 0 | 30 |
| 146 | 2 | 1 | 0 | 2 | 0 | 2 | 1 | 1 | 47 |
| 147 | 2 | 1 | 0 | 3 | 0 | 1 | 1 | 0 | 30 |
| 148 | 2 | 1 | 1 | 0 | 1 | 0 | -1 | -1 | 69 |
| 149 | 2 | 1 | 1 | 1 | 1 | 1 | -1 | 0 | 86 |
| 150 | 2 | 1 | 1 | 2 | 1 | 2 | -1 | 1 | 103 |
| 151 | 2 | 1 | 1 | 3 | 1 | 1 | -1 | 0 | 86 |
| 152 | 2 | 1 | 2 | 0 | 2 | 0 | 0 | -1 | 137 |
| 153 | 2 | 1 | 2 | 1 | 2 | 1 | 0 | 0 | 154 |

APPENDIX II-continued

| Address | Old Movement Legal Code X | Old Movement Legal Code Y | Current Code X | Current Code Y | Current Movement Legal Code X | Current Movement Legal Code Y | Step X | Step Y | DATA |
|---|---|---|---|---|---|---|---|---|---|
| 154 | 2 | 1 | 2 | 2 | 2 | 2 | 0 | 1 | 171 |
| 155 | 2 | 1 | 2 | 3 | 2 | 1 | 0 | 0 | 154 |
| 156 | 2 | 1 | 3 | 0 | 2 | 0 | 0 | -1 | 137 |
| 157 | 2 | 1 | 3 | 1 | 2 | 1 | 0 | 0 | 154 |
| 158 | 2 | 1 | 3 | 2 | 2 | 2 | 0 | 1 | 171 |
| 159 | 2 | 1 | 3 | 3 | 2 | 1 | 0 | 0 | 154 |
| 160 | 2 | 2 | 0 | 0 | 0 | 0 | 1 | 1 | 15 |
| 161 | 2 | 2 | 0 | 1 | 0 | 1 | 1 | -1 | 29 |
| 162 | 2 | 2 | 0 | 2 | 0 | 2 | 1 | 0 | 46 |
| 163 | 2 | 2 | 0 | 3 | 0 | 2 | 1 | 0 | 46 |
| 164 | 2 | 2 | 1 | 0 | 1 | 0 | -1 | 1 | 71 |
| 165 | 2 | 2 | 1 | 1 | 1 | 1 | -1 | -1 | 85 |
| 166 | 2 | 2 | 1 | 2 | 1 | 2 | -1 | 0 | 102 |
| 167 | 2 | 2 | 1 | 3 | 1 | 2 | -1 | 0 | 102 |
| 168 | 2 | 2 | 2 | 0 | 2 | 0 | 0 | 1 | 139 |
| 169 | 2 | 2 | 2 | 1 | 2 | 1 | 0 | -1 | 153 |
| 170 | 2 | 2 | 2 | 2 | 2 | 2 | 0 | 0 | 170 |
| 171 | 2 | 2 | 2 | 3 | 2 | 2 | 0 | 0 | 170 |
| 172 | 2 | 2 | 3 | 0 | 2 | 0 | 0 | 1 | 139 |
| 173 | 2 | 2 | 3 | 1 | 2 | 1 | 0 | -1 | 153 |
| 174 | 2 | 2 | 3 | 2 | 2 | 2 | 0 | 0 | 170 |
| 175 | 2 | 2 | 3 | 3 | 2 | 2 | 0 | 0 | 170 |
| 176 | 2 | 3 | 0 | 0 | 0 | 3 | 1 | 0 | 62 |
| 177 | 2 | 3 | 0 | 1 | 0 | 3 | 1 | 0 | 62 |
| 178 | 2 | 3 | 0 | 2 | 0 | 3 | 1 | 0 | 62 |
| 179 | 2 | 3 | 0 | 3 | 0 | 3 | 1 | 0 | 62 |
| 180 | 2 | 3 | 1 | 0 | 1 | 3 | -1 | 0 | 118 |
| 181 | 2 | 3 | 1 | 1 | 1 | 3 | -1 | 0 | 118 |
| 182 | 2 | 3 | 1 | 2 | 1 | 3 | -1 | 0 | 118 |
| 183 | 2 | 3 | 1 | 3 | 1 | 3 | -1 | 0 | 118 |
| 184 | 2 | 3 | 2 | 0 | 2 | 3 | 0 | 0 | 186 |
| 185 | 2 | 3 | 2 | 1 | 2 | 3 | 0 | 0 | 186 |
| 186 | 2 | 3 | 2 | 2 | 2 | 3 | 0 | 0 | 186 |
| 187 | 2 | 3 | 2 | 3 | 2 | 3 | 0 | 0 | 186 |
| 188 | 2 | 3 | 3 | 0 | 2 | 3 | 0 | 0 | 186 |
| 189 | 2 | 3 | 3 | 1 | 2 | 3 | 0 | 0 | 186 |
| 190 | 2 | 3 | 3 | 2 | 2 | 3 | 0 | 0 | 186 |
| 191 | 2 | 3 | 3 | 3 | 2 | 3 | 0 | 0 | 186 |
| 192 | 3 | 0 | 0 | 0 | 3 | 0 | 0 | 0 | 202 |
| 193 | 3 | 0 | 0 | 1 | 3 | 1 | 0 | 1 | 219 |
| 194 | 3 | 0 | 0 | 2 | 3 | 2 | 0 | -1 | 233 |
| 195 | 3 | 0 | 0 | 3 | 3 | 0 | 0 | 0 | 202 |
| 196 | 3 | 0 | 1 | 0 | 3 | 0 | 0 | 0 | 202 |
| 197 | 3 | 0 | 1 | 1 | 3 | 1 | 0 | 1 | 219 |
| 198 | 3 | 0 | 1 | 2 | 3 | 2 | 0 | -1 | 233 |
| 199 | 3 | 0 | 1 | 3 | 3 | 0 | 0 | 0 | 202 |
| 200 | 3 | 0 | 2 | 0 | 3 | 0 | 0 | 0 | 202 |
| 201 | 3 | 0 | 2 | 1 | 3 | 1 | 0 | 1 | 219 |
| 202 | 3 | 0 | 2 | 2 | 3 | 2 | 0 | -1 | 233 |
| 203 | 3 | 0 | 2 | 3 | 3 | 0 | 0 | 0 | 202 |
| 204 | 3 | 0 | 3 | 0 | 3 | 0 | 0 | 0 | 202 |
| 205 | 3 | 0 | 3 | 1 | 3 | 1 | 0 | 1 | 219 |
| 206 | 3 | 0 | 3 | 2 | 3 | 2 | 0 | -1 | 233 |
| 207 | 3 | 0 | 3 | 3 | 3 | 0 | 0 | 0 | 202 |
| 208 | 3 | 1 | 0 | 0 | 3 | 0 | 0 | -1 | 201 |
| 209 | 3 | 1 | 0 | 1 | 3 | 1 | 0 | 0 | 218 |
| 210 | 3 | 1 | 0 | 2 | 3 | 2 | 0 | 1 | 235 |
| 211 | 3 | 1 | 0 | 3 | 3 | 1 | 0 | 0 | 218 |
| 212 | 3 | 1 | 1 | 0 | 3 | 0 | 0 | -1 | 201 |
| 213 | 3 | 1 | 1 | 1 | 3 | 1 | 0 | 0 | 218 |
| 214 | 3 | 1 | 1 | 2 | 3 | 2 | 0 | 1 | 235 |
| 215 | 3 | 1 | 1 | 3 | 3 | 1 | 0 | 0 | 218 |
| 216 | 3 | 1 | 2 | 0 | 3 | 0 | 0 | -1 | 201 |
| 217 | 3 | 1 | 2 | 1 | 3 | 1 | 0 | 0 | 218 |
| 218 | 3 | 1 | 2 | 2 | 3 | 2 | 0 | 1 | 235 |
| 219 | 3 | 1 | 2 | 3 | 3 | 1 | 0 | 0 | 218 |
| 220 | 3 | 1 | 3 | 0 | 3 | 0 | 0 | -1 | 201 |
| 221 | 3 | 1 | 3 | 1 | 3 | 1 | 0 | 0 | 218 |
| 222 | 3 | 1 | 3 | 2 | 3 | 2 | 0 | 1 | 235 |
| 223 | 3 | 1 | 3 | 3 | 3 | 1 | 0 | 0 | 218 |
| 224 | 3 | 2 | 0 | 0 | 3 | 0 | 0 | 1 | 203 |
| 225 | 3 | 2 | 0 | 1 | 3 | 1 | 0 | -1 | 217 |
| 226 | 3 | 2 | 0 | 2 | 3 | 2 | 0 | 0 | 234 |
| 227 | 3 | 2 | 0 | 3 | 3 | 2 | 0 | 0 | 234 |
| 228 | 3 | 2 | 1 | 0 | 3 | 0 | 0 | 1 | 203 |
| 229 | 3 | 2 | 1 | 1 | 3 | 1 | 0 | -1 | 217 |
| 230 | 3 | 2 | 1 | 2 | 3 | 2 | 0 | 0 | 234 |
| 231 | 3 | 2 | 1 | 3 | 3 | 2 | 0 | 0 | 234 |
| 232 | 3 | 2 | 2 | 0 | 3 | 0 | 0 | 1 | 203 |
| 233 | 3 | 2 | 2 | 1 | 3 | 1 | 0 | -1 | 217 |
| 234 | 3 | 2 | 2 | 2 | 3 | 2 | 0 | 0 | 234 |
| 235 | 3 | 2 | 2 | 3 | 3 | 2 | 0 | 0 | 234 |
| 236 | 3 | 2 | 3 | 0 | 3 | 0 | 0 | 1 | 203 |
| 237 | 3 | 2 | 3 | 1 | 3 | 1 | 0 | -1 | 217 |
| 238 | 3 | 2 | 3 | 2 | 3 | 2 | 0 | 0 | 234 |
| 239 | 3 | 2 | 3 | 3 | 3 | 2 | 0 | 0 | 234 |
| 240 | 3 | 3 | 0 | 0 | 3 | 3 | 0 | 0 | 250 |
| 241 | 3 | 3 | 0 | 1 | 3 | 3 | 0 | 0 | 250 |
| 242 | 3 | 3 | 0 | 2 | 3 | 3 | 0 | 0 | 250 |
| 243 | 3 | 3 | 0 | 3 | 3 | 3 | 0 | 0 | 250 |
| 244 | 3 | 3 | 1 | 0 | 3 | 3 | 0 | 0 | 250 |
| 245 | 3 | 3 | 1 | 1 | 3 | 3 | 0 | 0 | 250 |
| 246 | 3 | 3 | 1 | 2 | 3 | 3 | 0 | 0 | 250 |
| 247 | 3 | 3 | 1 | 3 | 3 | 3 | 0 | 0 | 250 |
| 248 | 3 | 3 | 2 | 0 | 3 | 3 | 0 | 0 | 250 |
| 249 | 3 | 3 | 2 | 1 | 3 | 3 | 0 | 0 | 250 |
| 250 | 3 | 3 | 2 | 2 | 3 | 3 | 0 | 0 | 250 |
| 251 | 3 | 3 | 2 | 3 | 3 | 3 | 0 | 0 | 250 |
| 252 | 3 | 3 | 3 | 0 | 3 | 3 | 0 | 0 | 250 |
| 253 | 3 | 3 | 3 | 1 | 3 | 3 | 0 | 0 | 250 |
| 254 | 3 | 3 | 3 | 2 | 3 | 3 | 0 | 0 | 250 |
| 255 | 3 | 3 | 3 | 3 | 3 | 3 | 0 | 0 | 250 |

APPENDIX III

| Quadrants D | Quadrants C | Quadrants B | Quadrants A | Address | Partial Address for Second Access (Bits 4 → 8) | Identification Data (Bits 1,2,3) | DATA |
|---|---|---|---|---|---|---|---|
| 0 | 0 | 0 | 0 | 0 | 30 | 0 | 240 |
| 0 | 0 | 0 | 1 | 1 | 30 | 1 | 241 |
| 0 | 0 | 1 | 0 | 2 | 30 | 1 | 241 |
| 0 | 0 | 1 | 1 | 3 | 30 | 2 | 242 |
| 0 | 1 | 0 | 0 | 4 | 30 | 0 | 240 |
| 0 | 1 | 0 | 1 | 5 | 30 | 0 | 240 |
| 0 | 1 | 1 | 0 | 6 | 30 | 2 | 242 |
| 0 | 1 | 1 | 1 | 7 | 8 | 2 | 66 |
| 1 | 0 | 0 | 0 | 8 | 30 | 1 | 241 |
| 1 | 0 | 0 | 1 | 9 | 30 | 0 | 240 |
| 1 | 0 | 1 | 0 | 10 | 30 | 1 | 241 |
| 1 | 0 | 1 | 1 | 11 | 8 | 0 | 64 |
| 1 | 1 | 0 | 0 | 12 | 30 | 2 | 242 |
| 1 | 1 | 0 | 1 | 13 | 8 | 1 | 65 |
| 1 | 1 | 1 | 0 | 14 | 8 | 2 | 66 |
| 1 | 1 | 1 | 1 | 15 | 8 | 2 | 66 |
| 0 | 0 | 0 | 2 | 16 | 4 | 1 | 33 |
| 0 | 0 | 0 | 3 | 17 | 4 | 1 | 33 |
| 0 | 0 | 1 | 2 | 18 | 5 | 1 | 41 |
| 0 | 0 | 1 | 3 | 19 | 22 | 1 | 177 |
| 0 | 1 | 0 | 2 | 20 | 30 | 1 | 241 |
| 0 | 1 | 0 | 3 | 21 | 30 | 1 | 241 |
| 0 | 1 | 1 | 2 | 22 | 30 | 0 | 240 |
| 0 | 1 | 1 | 3 | 23 | 30 | 0 | 240 |
| 1 | 0 | 0 | 2 | 24 | 7 | 2 | 58 |
| 1 | 0 | 0 | 3 | 25 | 19 | 0 | 152 |
| 1 | 0 | 1 | 2 | 26 | 30 | 1 | 241 |
| 1 | 0 | 1 | 3 | 27 | 4 | 0 | 32 |
| 1 | 1 | 0 | 2 | 28 | 30 | 1 | 241 |
| 1 | 1 | 0 | 3 | 29 | 30 | 1 | 241 |
| 1 | 1 | 1 | 2 | 30 | 30 | 2 | 242 |
| 1 | 1 | 1 | 3 | 31 | 30 | 2 | 242 |
| 0 | 0 | 2 | 0 | 32 | 3 | 0 | 24 |
| 0 | 0 | 2 | 1 | 33 | 5 | 2 | 42 |
| 0 | 0 | 3 | 0 | 34 | 3 | 1 | 25 |
| 0 | 0 | 3 | 1 | 35 | 12 | 1 | 97 |
| 0 | 1 | 2 | 0 | 36 | 6 | 0 | 48 |
| 0 | 1 | 2 | 1 | 37 | 30 | 1 | 241 |
| 0 | 1 | 3 | 0 | 38 | 18 | 2 | 146 |
| 0 | 1 | 3 | 1 | 39 | 3 | 2 | 26 |
| 1 | 0 | 2 | 0 | 40 | 30 | 1 | 241 |
| 1 | 0 | 2 | 1 | 41 | 30 | 1 | 241 |
| 1 | 0 | 3 | 0 | 42 | 30 | 1 | 241 |

APPENDIX III-continued

| Quadrants | | | | Address | Partial Address for Second Access (Bits 4 → 8) | Identification Data (Bits 1,2,3) | DATA |
|---|---|---|---|---|---|---|---|
| D | C | B | A | | | | |
| 1 | 0 | 3 | 1 | 43 | 30 | 1 | 241 |
| 1 | 1 | 2 | 0 | 44 | 30 | 1 | 241 |
| 1 | 1 | 2 | 1 | 45 | 30 | 1 | 241 |
| 1 | 1 | 3 | 0 | 46 | 30 | 0 | 240 |
| 1 | 1 | 3 | 1 | 47 | 30 | 0 | 240 |
| 0 | 0 | 2 | 2 | 48 | 5 | 2 | 42 |
| 0 | 0 | 2 | 3 | 49 | 22 | 2 | 178 |
| 0 | 0 | 3 | 2 | 50 | 12 | 0 | 96 |
| 0 | 0 | 3 | 3 | 51 | 10 | 2 | 82 |
| 0 | 1 | 2 | 2 | 52 | 31 | 2 | 250 |
| 0 | 1 | 2 | 3 | 53 | 10 | 0 | 80 |
| 0 | 1 | 3 | 2 | 54 | 12 | 2 | 98 |
| 0 | 1 | 3 | 3 | 55 | 10 | 2 | 82 |
| 1 | 0 | 2 | 2 | 56 | 31 | 2 | 250 |
| 1 | 0 | 2 | 3 | 57 | 22 | 2 | 178 |
| 1 | 0 | 3 | 2 | 58 | 10 | 0 | 80 |
| 1 | 0 | 3 | 3 | 59 | 10 | 2 | 82 |
| 1 | 1 | 2 | 2 | 60 | 31 | 2 | 250 |
| 1 | 1 | 2 | 3 | 61 | 22 | 0 | 176 |
| 1 | 1 | 3 | 2 | 62 | 12 | 2 | 98 |
| 1 | 1 | 3 | 3 | 63 | 10 | 2 | 82 |
| 0 | 2 | 0 | 0 | 64 | 30 | 0 | 240 |
| 0 | 2 | 0 | 1 | 65 | 0 | 0 | 0 |
| 0 | 2 | 1 | 0 | 66 | 0 | 0 | 0 |
| 0 | 2 | 1 | 1 | 67 | 30 | 0 | 240 |
| 0 | 3 | 0 | 0 | 68 | 6 | 0 | 48 |
| 0 | 3 | 0 | 1 | 69 | 30 | 0 | 240 |
| 0 | 3 | 1 | 0 | 70 | 0 | 0 | 0 |
| 0 | 3 | 1 | 1 | 71 | 30 | 0 | 240 |
| 1 | 2 | 0 | 0 | 72 | 27 | 0 | 216 |
| 1 | 2 | 0 | 1 | 73 | 30 | 0 | 240 |
| 1 | 2 | 1 | 0 | 74 | 2 | 0 | 16 |
| 1 | 2 | 1 | 1 | 75 | 30 | 0 | 240 |
| 1 | 3 | 0 | 0 | 76 | 30 | 0 | 240 |
| 1 | 3 | 0 | 1 | 77 | 30 | 0 | 240 |
| 1 | 3 | 1 | 0 | 78 | 13 | 0 | 104 |
| 1 | 3 | 1 | 1 | 79 | 30 | 0 | 240 |
| 0 | 2 | 0 | 2 | 80 | 0 | 0 | 0 |
| 0 | 2 | 0 | 3 | 81 | 30 | 0 | 240 |
| 0 | 2 | 1 | 2 | 82 | 30 | 2 | 242 |
| 0 | 2 | 1 | 3 | 83 | 30 | 2 | 242 |
| 0 | 3 | 0 | 2 | 84 | 30 | 0 | 240 |
| 0 | 3 | 0 | 3 | 85 | 30 | 2 | 242 |
| 0 | 3 | 1 | 2 | 86 | 30 | 2 | 242 |
| 0 | 3 | 1 | 3 | 87 | 30 | 0 | 240 |
| 1 | 2 | 0 | 2 | 88 | 30 | 2 | 242 |
| 1 | 2 | 0 | 3 | 89 | 30 | 2 | 242 |
| 1 | 2 | 1 | 2 | 90 | 30 | 2 | 242 |
| 1 | 2 | 1 | 3 | 91 | 30 | 2 | 242 |
| 1 | 3 | 0 | 2 | 92 | 31 | 0 | 248 |
| 1 | 3 | 0 | 3 | 93 | 30 | 2 | 242 |
| 1 | 3 | 1 | 2 | 94 | 30 | 2 | 242 |
| 1 | 3 | 1 | 3 | 95 | 30 | 0 | 240 |
| 0 | 2 | 2 | 0 | 96 | 30 | 2 | 242 |
| 0 | 2 | 2 | 1 | 97 | 30 | 2 | 242 |
| 0 | 2 | 3 | 0 | 98 | 6 | 2 | 50 |
| 0 | 2 | 3 | 1 | 99 | 31 | 2 | 250 |
| 0 | 3 | 2 | 0 | 100 | 18 | 2 | 146 |
| 0 | 3 | 2 | 1 | 101 | 18 | 2 | 146 |
| 0 | 3 | 3 | 0 | 102 | 27 | 2 | 218 |
| 0 | 3 | 3 | 1 | 103 | 16 | 2 | 130 |
| 1 | 2 | 2 | 0 | 104 | 16 | 2 | 130 |
| 1 | 2 | 2 | 1 | 105 | 16 | 2 | 130 |
| 1 | 2 | 3 | 0 | 106 | 31 | 2 | 250 |
| 1 | 2 | 3 | 1 | 107 | 31 | 2 | 250 |
| 1 | 3 | 2 | 0 | 108 | 16 | 2 | 130 |
| 1 | 3 | 2 | 1 | 109 | 18 | 2 | 146 |
| 1 | 3 | 3 | 0 | 110 | 27 | 2 | 218 |
| 1 | 3 | 3 | 1 | 111 | 27 | 2 | 218 |
| 0 | 2 | 2 | 2 | 112 | 16 | 2 | 130 |
| 0 | 2 | 2 | 3 | 113 | 16 | 2 | 130 |
| 0 | 2 | 3 | 2 | 114 | 30 | 2 | 242 |
| 0 | 2 | 3 | 3 | 115 | 30 | 2 | 242 |
| 0 | 3 | 2 | 2 | 116 | 30 | 2 | 242 |
| 0 | 3 | 2 | 3 | 117 | 30 | 2 | 242 |
| 0 | 3 | 3 | 2 | 118 | 30 | 2 | 242 |
| 0 | 3 | 3 | 3 | 119 | 30 | 2 | 242 |
| 1 | 2 | 2 | 2 | 120 | 30 | 2 | 242 |
| 1 | 2 | 2 | 3 | 121 | 30 | 2 | 242 |
| 1 | 2 | 3 | 2 | 122 | 30 | 2 | 242 |
| 1 | 2 | 3 | 3 | 123 | 30 | 2 | 242 |
| 1 | 3 | 2 | 2 | 124 | 30 | 2 | 242 |
| 1 | 3 | 2 | 3 | 125 | 10 | 2 | 82 |
| 1 | 3 | 3 | 2 | 126 | 30 | 2 | 242 |
| 1 | 3 | 3 | 3 | 127 | 30 | 2 | 242 |
| 2 | 0 | 0 | 0 | 128 | 16 | 2 | 130 |
| 2 | 0 | 0 | 1 | 129 | 30 | 2 | 242 |
| 2 | 0 | 1 | 0 | 130 | 1 | 1 | 9 |
| 2 | 0 | 1 | 1 | 131 | 7 | 1 | 57 |
| 2 | 1 | 0 | 0 | 132 | 30 | 1 | 241 |
| 2 | 1 | 0 | 1 | 133 | 30 | 1 | 241 |
| 2 | 1 | 1 | 0 | 134 | 2 | 1 | 17 |
| 2 | 1 | 1 | 1 | 135 | 30 | 1 | 241 |
| 3 | 0 | 0 | 0 | 136 | 30 | 1 | 241 |
| 3 | 0 | 0 | 1 | 137 | 30 | 1 | 241 |
| 3 | 0 | 1 | 0 | 138 | 1 | 1 | 9 |
| 3 | 0 | 1 | 1 | 139 | 26 | 1 | 209 |
| 3 | 1 | 0 | 0 | 140 | 30 | 1 | 241 |
| 3 | 1 | 0 | 1 | 141 | 30 | 1 | 241 |
| 3 | 1 | 1 | 0 | 142 | 23 | 1 | 185 |
| 3 | 1 | 1 | 1 | 143 | 1 | 1 | 9 |
| 2 | 0 | 0 | 2 | 144 | 30 | 1 | 241 |
| 2 | 0 | 0 | 3 | 145 | 30 | 1 | 241 |
| 2 | 0 | 1 | 2 | 146 | 7 | 1 | 57 |
| 2 | 0 | 1 | 3 | 147 | 19 | 1 | 153 |
| 2 | 1 | 0 | 2 | 148 | 31 | 1 | 249 |
| 2 | 1 | 0 | 3 | 149 | 19 | 1 | 153 |
| 2 | 1 | 1 | 2 | 150 | 31 | 1 | 249 |
| 2 | 1 | 1 | 3 | 151 | 17 | 1 | 137 |
| 3 | 0 | 0 | 2 | 152 | 31 | 1 | 249 |
| 3 | 0 | 0 | 3 | 153 | 19 | 1 | 153 |
| 3 | 0 | 1 | 2 | 154 | 26 | 1 | 209 |
| 3 | 0 | 1 | 3 | 155 | 17 | 1 | 137 |
| 3 | 1 | 0 | 2 | 156 | 17 | 1 | 137 |
| 3 | 1 | 0 | 3 | 157 | 17 | 1 | 137 |
| 3 | 1 | 1 | 2 | 158 | 26 | 1 | 209 |
| 3 | 1 | 1 | 3 | 159 | 17 | 1 | 137 |
| 2 | 0 | 2 | 0 | 160 | 26 | 1 | 209 |
| 2 | 0 | 2 | 1 | 161 | 17 | 1 | 137 |
| 2 | 0 | 3 | 0 | 162 | 30 | 1 | 241 |
| 2 | 0 | 3 | 1 | 163 | 30 | 1 | 241 |
| 2 | 1 | 2 | 0 | 164 | 30 | 1 | 241 |
| 2 | 1 | 2 | 1 | 165 | 30 | 1 | 241 |
| 2 | 1 | 3 | 0 | 166 | 30 | 1 | 241 |
| 2 | 1 | 3 | 1 | 167 | 31 | 1 | 249 |
| 3 | 0 | 2 | 0 | 168 | 30 | 1 | 241 |
| 3 | 0 | 2 | 1 | 169 | 3 | 0 | 24 |
| 3 | 0 | 3 | 0 | 170 | 30 | 1 | 241 |
| 3 | 0 | 3 | 1 | 171 | 30 | 1 | 241 |
| 3 | 1 | 2 | 0 | 172 | 30 | 1 | 241 |
| 3 | 1 | 2 | 1 | 173 | 30 | 1 | 241 |
| 3 | 1 | 3 | 0 | 174 | 30 | 1 | 241 |
| 3 | 1 | 3 | 1 | 175 | 30 | 1 | 241 |
| 2 | 0 | 2 | 2 | 176 | 30 | 1 | 241 |
| 2 | 0 | 2 | 3 | 177 | 30 | 1 | 241 |
| 2 | 0 | 3 | 2 | 178 | 30 | 2 | 242 |
| 2 | 0 | 3 | 3 | 179 | 30 | 2 | 242 |
| 2 | 1 | 2 | 2 | 180 | 30 | 2 | 242 |
| 2 | 1 | 2 | 3 | 181 | 30 | 2 | 242 |
| 2 | 1 | 3 | 2 | 182 | 30 | 2 | 242 |
| 2 | 1 | 3 | 3 | 183 | 30 | 2 | 242 |
| 3 | 0 | 2 | 2 | 184 | 30 | 2 | 242 |
| 3 | 0 | 2 | 3 | 185 | 10 | 2 | 82 |
| 3 | 0 | 3 | 2 | 186 | 30 | 2 | 242 |
| 3 | 0 | 3 | 3 | 187 | 30 | 2 | 242 |
| 3 | 1 | 2 | 2 | 188 | 30 | 2 | 242 |
| 3 | 1 | 2 | 3 | 189 | 30 | 2 | 242 |
| 3 | 1 | 3 | 2 | 190 | 30 | 2 | 242 |
| 3 | 1 | 3 | 3 | 191 | 17 | 2 | 138 |
| 2 | 2 | 0 | 0 | 192 | 30 | 2 | 242 |
| 2 | 2 | 0 | 1 | 193 | 30 | 2 | 242 |
| 2 | 2 | 1 | 0 | 194 | 2 | 2 | 18 |

APPENDIX III-continued

| Quadrants | | | | Address | Partial Address for Second Access (Bits 4 → 8) | Identification Data (Bits 1,2,3) | DATA |
|---|---|---|---|---|---|---|---|
| D | C | B | A | | | | |
| 2 | 2 | 1 | 1 | 195 | 31 | 2 | 250 |
| 2 | 3 | 0 | 0 | 196 | 31 | 2 | 250 |
| 2 | 3 | 0 | 1 | 197 | 31 | 2 | 250 |
| 2 | 3 | 1 | 0 | 198 | 13 | 2 | 106 |
| 2 | 3 | 1 | 1 | 199 | 11 | 2 | 90 |
| 3 | 2 | 0 | 0 | 200 | 13 | 2 | 106 |
| 3 | 2 | 0 | 1 | 201 | 13 | 2 | 106 |
| 3 | 2 | 1 | 0 | 202 | 23 | 2 | 186 |
| 3 | 2 | 1 | 1 | 203 | 23 | 2 | 186 |
| 3 | 3 | 0 | 0 | 204 | 11 | 2 | 90 |
| 3 | 3 | 0 | 1 | 205 | 23 | 2 | 186 |
| 3 | 3 | 1 | 0 | 206 | 11 | 2 | 90 |
| 3 | 3 | 1 | 1 | 207 | 11 | 2 | 90 |
| 2 | 2 | 0 | 2 | 208 | 11 | 2 | 90 |
| 2 | 2 | 0 | 3 | 209 | 11 | 2 | 90 |
| 2 | 2 | 1 | 2 | 210 | 30 | 1 | 241 |
| 2 | 2 | 1 | 3 | 211 | 30 | 1 | 241 |
| 2 | 3 | 0 | 2 | 212 | 30 | 1 | 241 |
| 2 | 3 | 0 | 3 | 213 | 30 | 1 | 241 |
| 2 | 3 | 1 | 2 | 214 | 30 | 1 | 241 |
| 2 | 3 | 1 | 3 | 215 | 30 | 1 | 241 |
| 3 | 2 | 0 | 2 | 216 | 30 | 1 | 241 |
| 3 | 2 | 0 | 3 | 217 | 30 | 1 | 241 |
| 3 | 2 | 1 | 2 | 218 | 30 | 1 | 241 |
| 3 | 2 | 1 | 3 | 219 | 30 | 1 | 241 |
| 3 | 3 | 0 | 2 | 220 | 30 | 1 | 241 |
| 3 | 3 | 0 | 3 | 221 | 17 | 1 | 137 |
| 3 | 3 | 1 | 2 | 222 | 30 | 1 | 241 |
| 3 | 3 | 1 | 3 | 223 | 30 | 1 | 241 |
| 2 | 2 | 2 | 0 | 224 | 11 | 1 | 89 |
| 2 | 2 | 2 | 1 | 225 | 30 | 1 | 241 |
| 2 | 2 | 3 | 0 | 226 | 30 | 1 | 241 |
| 2 | 2 | 3 | 1 | 227 | 30 | 1 | 241 |
| 2 | 3 | 2 | 0 | 228 | 30 | 1 | 241 |
| 2 | 3 | 2 | 1 | 229 | 30 | 1 | 241 |
| 2 | 3 | 3 | 0 | 230 | 30 | 1 | 241 |
| 2 | 3 | 3 | 1 | 231 | 30 | 1 | 241 |
| 3 | 2 | 2 | 0 | 232 | 30 | 1 | 241 |
| 3 | 2 | 2 | 1 | 233 | 16 | 1 | 129 |
| 3 | 2 | 3 | 0 | 234 | 30 | 1 | 241 |
| 3 | 2 | 3 | 1 | 235 | 30 | 1 | 241 |
| 3 | 3 | 2 | 0 | 236 | 30 | 1 | 241 |
| 3 | 3 | 2 | 1 | 237 | 30 | 1 | 241 |
| 3 | 3 | 3 | 0 | 238 | 30 | 1 | 241 |
| 3 | 3 | 3 | 1 | 239 | 11 | 1 | 89 |
| 2 | 2 | 2 | 2 | 240 | 30 | 1 | 241 |
| 2 | 2 | 2 | 3 | 241 | 30 | 1 | 241 |
| 2 | 2 | 3 | 2 | 242 | 31 | 0 | 248 |
| 2 | 2 | 3 | 3 | 243 | 30 | 0 | 240 |
| 2 | 3 | 2 | 2 | 244 | 30 | 0 | 240 |
| 2 | 3 | 2 | 3 | 245 | 10 | 0 | 80 |
| 2 | 3 | 3 | 2 | 246 | 30 | 0 | 240 |
| 2 | 3 | 3 | 3 | 247 | 30 | 0 | 240 |
| 3 | 2 | 2 | 2 | 248 | 16 | 0 | 128 |
| 3 | 2 | 2 | 3 | 249 | 9 | 0 | 72 |
| 3 | 2 | 3 | 2 | 250 | 30 | 0 | 240 |
| 3 | 2 | 3 | 3 | 251 | 17 | 0 | 136 |
| 3 | 3 | 2 | 2 | 252 | 30 | 1 | 241 |
| 3 | 3 | 2 | 3 | 253 | 9 | 0 | 72 |
| 3 | 3 | 3 | 2 | 254 | 11 | 0 | 88 |
| 3 | 3 | 3 | 3 | 255 | 9 | 1 | 73 |

APPENIX IV

| ADDRESS | OLD CODE | | CURRENT CODE | | UPDATED CODE | | AMBIGUITY ADJACENT | COMPRESSED CODE | DATA |
|---|---|---|---|---|---|---|---|---|---|
| | X | Y | X | Y | X | Y | | | |
| 0 | 0 | 0 | 0 | 0 | 0 | 0 | 1 | 0 | 8 |
| 1 | 0 | 0 | 0 | 1 | 0 | 1 | 1 | 1 | 25 |
| 2 | 0 | 0 | 0 | 2 | 0 | 2 | 1 | 1 | 41 |
| 3 | 0 | 0 | 0 | 3 | 0 | 0 | 1 | 0 | 8 |
| 4 | 0 | 0 | 1 | 0 | 1 | 0 | 1 | 2 | 74 |
| 5 | 0 | 0 | 1 | 1 | 1 | 1 | 0 | 0 | 80 |
| 6 | 0 | 0 | 1 | 2 | 1 | 2 | 0 | 1 | 97 |
| 7 | 0 | 0 | 1 | 3 | 1 | 0 | 1 | 2 | 74 |
| 8 | 0 | 0 | 2 | 0 | 2 | 0 | 1 | 2 | 138 |
| 9 | 0 | 0 | 2 | 1 | 2 | 1 | 0 | 3 | 147 |
| 10 | 0 | 0 | 2 | 2 | 2 | 2 | 0 | 4 | 164 |
| 11 | 0 | 0 | 2 | 3 | 2 | 0 | 1 | 2 | 138 |
| 12 | 0 | 0 | 3 | 0 | 0 | 0 | 1 | 0 | 8 |
| 13 | 0 | 0 | 3 | 1 | 0 | 1 | 1 | 1 | 25 |
| 14 | 0 | 0 | 3 | 2 | 0 | 2 | 1 | 1 | 41 |
| 15 | 0 | 0 | 3 | 3 | 0 | 0 | 1 | 0 | 8 |
| 16 | 0 | 1 | 0 | 0 | 0 | 0 | 1 | 0 | 8 |
| 17 | 0 | 1 | 0 | 1 | 0 | 1 | 1 | 1 | 25 |
| 18 | 0 | 1 | 0 | 2 | 0 | 2 | 1 | 1 | 41 |
| 19 | 0 | 1 | 0 | 3 | 0 | 3 | 1 | 1 | 57 |
| 20 | 0 | 1 | 1 | 0 | 1 | 0 | 1 | 2 | 74 |
| 21 | 0 | 1 | 1 | 1 | 1 | 1 | 0 | 0 | 80 |
| 22 | 0 | 1 | 1 | 2 | 1 | 2 | 0 | 1 | 97 |
| 23 | 0 | 1 | 1 | 3 | 1 | 3 | 0 | 2 | 114 |
| 24 | 0 | 1 | 2 | 0 | 2 | 0 | 1 | 2 | 138 |
| 25 | 0 | 1 | 2 | 1 | 2 | 1 | 0 | 3 | 147 |
| 26 | 0 | 1 | 2 | 2 | 2 | 2 | 0 | 4 | 164 |
| 27 | 0 | 1 | 2 | 3 | 2 | 3 | 0 | 5 | 181 |
| 28 | 0 | 1 | 3 | 0 | 0 | 0 | 1 | 0 | 8 |
| 29 | 0 | 1 | 3 | 1 | 0 | 1 | 1 | 1 | 25 |
| 30 | 0 | 1 | 3 | 2 | 0 | 2 | 1 | 1 | 41 |
| 31 | 0 | 1 | 3 | 3 | 0 | 3 | 1 | 1 | 57 |
| 32 | 0 | 2 | 0 | 0 | 0 | 0 | 1 | 0 | 8 |
| 33 | 0 | 2 | 0 | 1 | 0 | 1 | 1 | 1 | 25 |
| 34 | 0 | 2 | 0 | 2 | 0 | 2 | 1 | 1 | 41 |
| 35 | 0 | 2 | 0 | 3 | 0 | 3 | 1 | 1 | 57 |
| 36 | 0 | 2 | 1 | 0 | 1 | 0 | 1 | 2 | 74 |
| 37 | 0 | 2 | 1 | 1 | 1 | 1 | 0 | 0 | 80 |
| 38 | 0 | 2 | 1 | 2 | 1 | 2 | 0 | 1 | 97 |

APPENIX IV-continued

| ADDRESS | OLD CODE X | OLD CODE Y | CURRENT CODE X | CURRENT CODE Y | UPDATED CODE X | UPDATED CODE Y | AMBIGUITY ADJACENT | COMPRESSED CODE | DATA |
|---|---|---|---|---|---|---|---|---|---|
| 39 | 0 | 2 | 1 | 3 | 1 | 3 | 0 | 2 | 114 |
| 40 | 0 | 2 | 2 | 0 | 2 | 0 | 1 | 2 | 138 |
| 41 | 0 | 2 | 2 | 1 | 2 | 1 | 0 | 3 | 147 |
| 42 | 0 | 2 | 2 | 2 | 2 | 2 | 0 | 4 | 164 |
| 43 | 0 | 2 | 2 | 3 | 2 | 3 | 0 | 5 | 181 |
| 44 | 0 | 2 | 3 | 0 | 0 | 0 | 1 | 0 | 8 |
| 45 | 0 | 2 | 3 | 1 | 0 | 1 | 1 | 1 | 25 |
| 46 | 0 | 2 | 3 | 2 | 0 | 2 | 1 | 1 | 41 |
| 47 | 0 | 2 | 3 | 3 | 0 | 3 | 1 | 1 | 57 |
| 48 | 0 | 3 | 0 | 0 | 0 | 3 | 1 | 1 | 57 |
| 49 | 0 | 3 | 0 | 1 | 0 | 1 | 1 | 1 | 25 |
| 50 | 0 | 3 | 0 | 2 | 0 | 2 | 1 | 1 | 41 |
| 51 | 0 | 3 | 0 | 3 | 0 | 3 | 1 | 1 | 57 |
| 52 | 0 | 3 | 1 | 0 | 1 | 3 | 0 | 2 | 114 |
| 53 | 0 | 3 | 1 | 1 | 1 | 1 | 0 | 0 | 80 |
| 54 | 0 | 3 | 1 | 2 | 1 | 2 | 0 | 1 | 97 |
| 55 | 0 | 3 | 1 | 3 | 1 | 3 | 0 | 2 | 114 |
| 56 | 0 | 3 | 2 | 0 | 2 | 3 | 0 | 5 | 181 |
| 57 | 0 | 3 | 2 | 1 | 2 | 1 | 0 | 3 | 147 |
| 58 | 0 | 3 | 2 | 2 | 2 | 2 | 0 | 4 | 164 |
| 59 | 0 | 3 | 2 | 3 | 2 | 3 | 0 | 5 | 181 |
| 60 | 0 | 3 | 3 | 0 | 0 | 3 | 1 | 1 | 57 |
| 61 | 0 | 3 | 3 | 1 | 0 | 1 | 1 | 1 | 25 |
| 62 | 0 | 3 | 3 | 2 | 0 | 2 | 1 | 1 | 41 |
| 63 | 0 | 3 | 3 | 3 | 0 | 3 | 1 | 1 | 57 |
| 64 | 1 | 0 | 0 | 0 | 0 | 0 | 1 | 0 | 8 |
| 65 | 1 | 0 | 0 | 1 | 0 | 1 | 1 | 1 | 25 |
| 66 | 1 | 0 | 0 | 2 | 0 | 2 | 1 | 1 | 41 |
| 67 | 1 | 0 | 0 | 3 | 0 | 0 | 1 | 0 | 8 |
| 68 | 1 | 0 | 1 | 0 | 1 | 0 | 1 | 2 | 74 |
| 69 | 1 | 0 | 1 | 1 | 1 | 1 | 0 | 0 | 80 |
| 70 | 1 | 0 | 1 | 2 | 1 | 2 | 0 | 1 | 97 |
| 71 | 1 | 0 | 1 | 3 | 1 | 0 | 1 | 2 | 74 |
| 72 | 1 | 0 | 2 | 0 | 2 | 0 | 1 | 2 | 138 |
| 73 | 1 | 0 | 2 | 1 | 2 | 1 | 0 | 3 | 147 |
| 74 | 1 | 0 | 2 | 2 | 2 | 2 | 0 | 4 | 164 |
| 75 | 1 | 0 | 2 | 3 | 2 | 0 | 1 | 2 | 138 |
| 76 | 1 | 0 | 3 | 0 | 3 | 0 | 1 | 2 | 202 |
| 77 | 1 | 0 | 3 | 1 | 3 | 1 | 0 | 6 | 214 |
| 78 | 1 | 0 | 3 | 2 | 3 | 2 | 0 | 7 | 231 |
| 79 | 1 | 0 | 3 | 3 | 3 | 0 | 1 | 2 | 202 |
| 80 | 1 | 1 | 0 | 0 | 0 | 0 | 1 | 0 | 8 |
| 81 | 1 | 1 | 0 | 1 | 0 | 1 | 1 | 1 | 25 |
| 82 | 1 | 1 | 0 | 2 | 0 | 2 | 1 | 1 | 41 |
| 83 | 1 | 1 | 0 | 3 | 0 | 3 | 1 | 1 | 57 |
| 84 | 1 | 1 | 1 | 0 | 1 | 0 | 1 | 2 | 74 |
| 85 | 1 | 1 | 1 | 1 | 1 | 1 | 0 | 0 | 80 |
| 86 | 1 | 1 | 1 | 2 | 1 | 2 | 0 | 1 | 97 |
| 87 | 1 | 1 | 1 | 3 | 1 | 3 | 0 | 2 | 114 |
| 88 | 1 | 1 | 2 | 0 | 2 | 0 | 1 | 2 | 138 |
| 89 | 1 | 1 | 2 | 1 | 2 | 1 | 0 | 3 | 147 |
| 90 | 1 | 1 | 2 | 2 | 2 | 2 | 0 | 4 | 164 |
| 91 | 1 | 1 | 2 | 3 | 2 | 3 | 0 | 5 | 181 |
| 92 | 1 | 1 | 3 | 0 | 3 | 0 | 1 | 2 | 202 |
| 93 | 1 | 1 | 3 | 1 | 3 | 1 | 0 | 6 | 214 |
| 94 | 1 | 1 | 3 | 2 | 3 | 2 | 0 | 7 | 231 |
| 95 | 1 | 1 | 3 | 3 | 3 | 3 | 1 | 0 | 248 |
| 96 | 1 | 2 | 0 | 0 | 0 | 0 | 1 | 0 | 8 |
| 97 | 1 | 2 | 0 | 1 | 0 | 1 | 1 | 1 | 25 |
| 98 | 1 | 2 | 0 | 2 | 0 | 2 | 1 | 1 | 41 |
| 99 | 1 | 2 | 0 | 3 | 0 | 3 | 1 | 1 | 57 |
| 100 | 1 | 2 | 1 | 0 | 1 | 0 | 1 | 2 | 74 |
| 101 | 1 | 2 | 1 | 1 | 1 | 1 | 0 | 0 | 80 |
| 102 | 1 | 2 | 1 | 2 | 1 | 2 | 0 | 1 | 97 |
| 103 | 1 | 2 | 1 | 3 | 1 | 3 | 0 | 2 | 114 |
| 104 | 1 | 2 | 2 | 0 | 2 | 0 | 1 | 2 | 138 |
| 105 | 1 | 2 | 2 | 1 | 2 | 1 | 0 | 3 | 147 |
| 106 | 1 | 2 | 2 | 2 | 2 | 2 | 0 | 4 | 164 |
| 107 | 1 | 2 | 2 | 3 | 2 | 3 | 0 | 5 | 181 |
| 108 | 1 | 2 | 3 | 0 | 3 | 0 | 1 | 2 | 202 |
| 109 | 1 | 2 | 3 | 1 | 3 | 1 | 0 | 6 | 214 |
| 110 | 1 | 2 | 3 | 2 | 3 | 2 | 0 | 7 | 231 |
| 111 | 1 | 2 | 3 | 3 | 3 | 3 | 1 | 0 | 248 |
| 112 | 1 | 3 | 0 | 0 | 0 | 3 | 1 | 1 | 57 |
| 113 | 1 | 3 | 0 | 1 | 0 | 1 | 1 | 1 | 25 |
| 114 | 1 | 3 | 0 | 2 | 0 | 2 | 1 | 1 | 41 |
| 115 | 1 | 3 | 0 | 3 | 0 | 3 | 1 | 1 | 57 |
| 116 | 1 | 3 | 1 | 0 | 1 | 3 | 0 | 2 | 114 |
| 117 | 1 | 3 | 1 | 1 | 1 | 1 | 0 | 0 | 80 |

APPENIX IV-continued

| ADDRESS | OLD CODE | | CURRENT CODE | | UPDATED CODE | | AMBIGUITY ADJACENT | COMPRESSED CODE | DATA |
|---|---|---|---|---|---|---|---|---|---|
| | X | Y | X | Y | X | Y | | | |
| 118 | 1 | 3 | 1 | 2 | 1 | 2 | 0 | 1 | 97 |
| 119 | 1 | 3 | 1 | 3 | 1 | 3 | 0 | 2 | 114 |
| 120 | 1 | 3 | 2 | 0 | 2 | 3 | 0 | 5 | 181 |
| 121 | 1 | 3 | 2 | 1 | 2 | 1 | 0 | 3 | 147 |
| 122 | 1 | 3 | 2 | 2 | 2 | 2 | 0 | 4 | 164 |
| 123 | 1 | 3 | 2 | 3 | 2 | 3 | 0 | 5 | 181 |
| 124 | 1 | 3 | 3 | 0 | 3 | 3 | 1 | 0 | 248 |
| 125 | 1 | 3 | 3 | 1 | 3 | 1 | 0 | 6 | 214 |
| 126 | 1 | 3 | 3 | 2 | 3 | 2 | 0 | 7 | 231 |
| 127 | 1 | 3 | 3 | 3 | 3 | 3 | 1 | 0 | 248 |
| 128 | 2 | 0 | 0 | 0 | 0 | 0 | 1 | 0 | 8 |
| 129 | 2 | 0 | 0 | 1 | 0 | 1 | 1 | 1 | 25 |
| 130 | 2 | 0 | 0 | 2 | 0 | 2 | 1 | 1 | 41 |
| 131 | 2 | 0 | 0 | 3 | 0 | 0 | 1 | 0 | 8 |
| 132 | 2 | 0 | 1 | 0 | 1 | 0 | 1 | 2 | 74 |
| 133 | 2 | 0 | 1 | 1 | 1 | 1 | 0 | 0 | 80 |
| 134 | 2 | 0 | 1 | 2 | 1 | 2 | 0 | 1 | 97 |
| 135 | 2 | 0 | 1 | 3 | 1 | 0 | 1 | 2 | 74 |
| 136 | 2 | 0 | 2 | 0 | 2 | 0 | 1 | 2 | 138 |
| 137 | 2 | 0 | 2 | 1 | 2 | 1 | 0 | 3 | 147 |
| 138 | 2 | 0 | 2 | 2 | 2 | 2 | 0 | 4 | 164 |
| 139 | 2 | 0 | 2 | 3 | 2 | 0 | 1 | 2 | 138 |
| 140 | 2 | 0 | 3 | 0 | 3 | 0 | 1 | 2 | 202 |
| 141 | 2 | 0 | 3 | 1 | 3 | 1 | 0 | 6 | 214 |
| 142 | 2 | 0 | 3 | 2 | 3 | 2 | 0 | 7 | 231 |
| 143 | 2 | 0 | 3 | 3 | 3 | 0 | 1 | 2 | 202 |
| 144 | 2 | 1 | 0 | 0 | 0 | 0 | 1 | 0 | 8 |
| 145 | 2 | 1 | 0 | 1 | 0 | 1 | 1 | 1 | 25 |
| 146 | 2 | 1 | 0 | 2 | 0 | 2 | 1 | 1 | 41 |
| 147 | 2 | 1 | 0 | 3 | 0 | 3 | 1 | 1 | 57 |
| 148 | 2 | 1 | 1 | 0 | 1 | 0 | 1 | 2 | 74 |
| 149 | 2 | 1 | 1 | 1 | 1 | 1 | 0 | 0 | 80 |
| 150 | 2 | 1 | 1 | 2 | 1 | 2 | 0 | 1 | 97 |
| 151 | 2 | 1 | 1 | 3 | 1 | 3 | 0 | 2 | 114 |
| 152 | 2 | 1 | 2 | 0 | 2 | 0 | 1 | 2 | 138 |
| 153 | 2 | 1 | 2 | 1 | 2 | 1 | 0 | 3 | 147 |
| 154 | 2 | 1 | 2 | 2 | 2 | 2 | 0 | 4 | 164 |
| 155 | 2 | 1 | 2 | 3 | 2 | 3 | 0 | 5 | 181 |
| 156 | 2 | 1 | 3 | 0 | 3 | 0 | 1 | 2 | 202 |
| 157 | 2 | 1 | 3 | 1 | 3 | 1 | 0 | 6 | 214 |
| 158 | 2 | 1 | 3 | 2 | 3 | 2 | 0 | 7 | 231 |
| 159 | 2 | 1 | 3 | 3 | 3 | 3 | 1 | 0 | 248 |
| 160 | 2 | 2 | 0 | 0 | 0 | 0 | 1 | 0 | 8 |
| 161 | 2 | 2 | 0 | 1 | 0 | 1 | 1 | 1 | 25 |
| 162 | 2 | 2 | 0 | 2 | 0 | 2 | 1 | 1 | 41 |
| 163 | 2 | 2 | 0 | 3 | 0 | 3 | 1 | 1 | 57 |
| 164 | 2 | 2 | 1 | 0 | 1 | 0 | 1 | 2 | 74 |
| 165 | 2 | 2 | 1 | 1 | 1 | 1 | 0 | 0 | 80 |
| 166 | 2 | 2 | 1 | 2 | 1 | 2 | 0 | 1 | 97 |
| 167 | 2 | 2 | 1 | 3 | 1 | 3 | 0 | 2 | 114 |
| 168 | 2 | 2 | 2 | 0 | 2 | 0 | 1 | 2 | 138 |
| 169 | 2 | 2 | 2 | 1 | 2 | 1 | 0 | 3 | 147 |
| 170 | 2 | 2 | 2 | 2 | 2 | 2 | 0 | 4 | 164 |
| 171 | 2 | 2 | 2 | 3 | 2 | 3 | 0 | 5 | 181 |
| 172 | 2 | 2 | 3 | 0 | 3 | 0 | 1 | 2 | 202 |
| 173 | 2 | 2 | 3 | 1 | 3 | 1 | 0 | 6 | 214 |
| 174 | 2 | 2 | 3 | 2 | 3 | 2 | 0 | 7 | 231 |
| 175 | 2 | 2 | 3 | 3 | 3 | 3 | 1 | 0 | 248 |
| 176 | 2 | 3 | 0 | 0 | 0 | 3 | 1 | 1 | 57 |
| 177 | 2 | 3 | 0 | 1 | 0 | 1 | 1 | 1 | 25 |
| 178 | 2 | 3 | 0 | 2 | 0 | 2 | 1 | 1 | 41 |
| 179 | 2 | 3 | 0 | 3 | 0 | 3 | 1 | 1 | 57 |
| 180 | 2 | 3 | 1 | 0 | 1 | 3 | 0 | 2 | 114 |
| 181 | 2 | 3 | 1 | 1 | 1 | 1 | 0 | 0 | 80 |
| 182 | 2 | 3 | 1 | 2 | 1 | 2 | 0 | 1 | 97 |
| 183 | 2 | 3 | 1 | 3 | 1 | 3 | 0 | 2 | 114 |
| 184 | 2 | 3 | 2 | 0 | 2 | 3 | 0 | 5 | 181 |
| 185 | 2 | 3 | 2 | 1 | 2 | 1 | 0 | 3 | 147 |
| 186 | 2 | 3 | 2 | 2 | 2 | 2 | 0 | 4 | 164 |
| 187 | 2 | 3 | 2 | 3 | 2 | 3 | 0 | 5 | 181 |
| 188 | 2 | 3 | 3 | 0 | 3 | 3 | 1 | 0 | 248 |
| 189 | 2 | 3 | 3 | 1 | 3 | 1 | 0 | 6 | 214 |
| 190 | 2 | 3 | 3 | 2 | 3 | 2 | 0 | 7 | 231 |
| 191 | 2 | 3 | 3 | 3 | 3 | 3 | 1 | 0 | 248 |
| 192 | 3 | 0 | 0 | 0 | 3 | 0 | 1 | 2 | 202 |
| 193 | 3 | 0 | 0 | 1 | 3 | 1 | 0 | 6 | 214 |
| 194 | 3 | 0 | 0 | 2 | 3 | 2 | 0 | 7 | 231 |
| 195 | 3 | 0 | 0 | 3 | 3 | 0 | 1 | 2 | 202 |
| 196 | 3 | 0 | 1 | 0 | 1 | 0 | 1 | 2 | 74 |

APPENDIX IV-continued

| ADDRESS | OLD CODE X | OLD CODE Y | CURRENT CODE X | CURRENT CODE Y | UPDATED CODE X | UPDATED CODE Y | AMBIGUITY ADJACENT | COMPRESSED CODE | DATA |
|---|---|---|---|---|---|---|---|---|---|
| 197 | 3 | 0 | 1 | 1 | 1 | 1 | 0 | 0 | 80 |
| 198 | 3 | 0 | 1 | 2 | 1 | 2 | 0 | 1 | 97 |
| 199 | 3 | 0 | 1 | 3 | 1 | 0 | 1 | 2 | 74 |
| 200 | 3 | 0 | 2 | 0 | 2 | 0 | 1 | 2 | 138 |
| 201 | 3 | 0 | 2 | 1 | 2 | 1 | 0 | 3 | 147 |
| 202 | 3 | 0 | 2 | 2 | 2 | 2 | 0 | 4 | 164 |
| 203 | 3 | 0 | 2 | 3 | 2 | 0 | 1 | 2 | 138 |
| 204 | 3 | 0 | 3 | 0 | 3 | 0 | 1 | 2 | 202 |
| 205 | 3 | 0 | 3 | 1 | 3 | 1 | 0 | 6 | 214 |
| 206 | 3 | 0 | 3 | 2 | 3 | 2 | 0 | 7 | 231 |
| 207 | 3 | 0 | 3 | 3 | 3 | 0 | 1 | 2 | 202 |
| 208 | 3 | 1 | 0 | 0 | 3 | 0 | 1 | 2 | 202 |
| 209 | 3 | 1 | 0 | 1 | 3 | 1 | 0 | 6 | 214 |
| 210 | 3 | 1 | 0 | 2 | 3 | 2 | 0 | 7 | 231 |
| 211 | 3 | 1 | 0 | 3 | 3 | 3 | 1 | 0 | 248 |
| 212 | 3 | 1 | 1 | 0 | 1 | 0 | 1 | 2 | 74 |
| 213 | 3 | 1 | 1 | 1 | 1 | 1 | 0 | 0 | 80 |
| 214 | 3 | 1 | 1 | 2 | 1 | 2 | 0 | 1 | 97 |
| 215 | 3 | 1 | 1 | 3 | 1 | 3 | 0 | 2 | 114 |
| 216 | 3 | 1 | 2 | 0 | 2 | 0 | 1 | 2 | 138 |
| 217 | 3 | 1 | 2 | 1 | 2 | 1 | 0 | 3 | 147 |
| 218 | 3 | 1 | 2 | 2 | 2 | 2 | 0 | 4 | 164 |
| 219 | 3 | 1 | 2 | 3 | 2 | 3 | 0 | 5 | 181 |
| 220 | 3 | 1 | 3 | 0 | 3 | 0 | 1 | 2 | 202 |
| 221 | 3 | 1 | 3 | 1 | 3 | 1 | 0 | 6 | 214 |
| 222 | 3 | 1 | 3 | 2 | 3 | 2 | 0 | 7 | 231 |
| 223 | 3 | 1 | 3 | 3 | 3 | 3 | 1 | 0 | 248 |
| 224 | 3 | 2 | 0 | 0 | 3 | 0 | 1 | 2 | 202 |
| 225 | 3 | 2 | 0 | 1 | 3 | 1 | 0 | 6 | 214 |
| 226 | 3 | 2 | 0 | 2 | 3 | 2 | 0 | 7 | 231 |
| 227 | 3 | 2 | 0 | 3 | 3 | 3 | 1 | 0 | 248 |
| 228 | 3 | 2 | 1 | 0 | 1 | 0 | 1 | 2 | 74 |
| 229 | 3 | 2 | 1 | 1 | 1 | 1 | 0 | 0 | 80 |
| 230 | 3 | 2 | 1 | 2 | 1 | 2 | 0 | 1 | 97 |
| 231 | 3 | 2 | 1 | 3 | 1 | 3 | 0 | 2 | 114 |
| 232 | 3 | 2 | 2 | 0 | 2 | 0 | 1 | 2 | 138 |
| 233 | 3 | 2 | 2 | 1 | 2 | 1 | 0 | 3 | 147 |
| 234 | 3 | 2 | 2 | 2 | 2 | 2 | 0 | 4 | 164 |
| 235 | 3 | 2 | 2 | 3 | 2 | 3 | 0 | 5 | 181 |
| 236 | 3 | 2 | 3 | 0 | 3 | 0 | 1 | 2 | 202 |
| 237 | 3 | 2 | 3 | 1 | 3 | 1 | 0 | 6 | 214 |
| 238 | 3 | 2 | 3 | 2 | 3 | 2 | 0 | 7 | 231 |
| 239 | 3 | 2 | 3 | 3 | 3 | 3 | 1 | 0 | 248 |
| 240 | 3 | 3 | 0 | 0 | 3 | 3 | 1 | 0 | 248 |
| 241 | 3 | 3 | 0 | 1 | 3 | 1 | 0 | 6 | 214 |
| 242 | 3 | 3 | 0 | 2 | 3 | 2 | 0 | 7 | 231 |
| 243 | 3 | 3 | 0 | 3 | 3 | 3 | 1 | 0 | 248 |
| 244 | 3 | 3 | 1 | 0 | 1 | 3 | 0 | 2 | 114 |
| 245 | 3 | 3 | 1 | 1 | 1 | 1 | 0 | 0 | 80 |
| 246 | 3 | 3 | 1 | 2 | 1 | 2 | 0 | 1 | 97 |
| 247 | 3 | 3 | 1 | 3 | 1 | 3 | 0 | 2 | 114 |
| 248 | 3 | 3 | 2 | 0 | 2 | 3 | 0 | 5 | 181 |
| 249 | 3 | 3 | 2 | 1 | 2 | 1 | 0 | 3 | 147 |
| 250 | 3 | 3 | 2 | 2 | 2 | 2 | 0 | 4 | 164 |
| 251 | 3 | 3 | 2 | 3 | 2 | 3 | 0 | 5 | 181 |
| 252 | 3 | 3 | 3 | 0 | 3 | 3 | 1 | 0 | 248 |
| 253 | 3 | 3 | 3 | 1 | 3 | 1 | 0 | 6 | 214 |
| 254 | 3 | 3 | 3 | 2 | 3 | 2 | 0 | 7 | 231 |
| 255 | 3 | 3 | 3 | 3 | 3 | 3 | 1 | 0 | 248 |

What is claimed is:

1. A computer implemented method for retrieving compressed data from a look-up table stored in a memory having $2^n$ addresses each capable of storing one n-bit word, where n is an integer, comprising the steps of:

storing a first n-bit word at a first address of said memory and a second n-bit word at a second address of said memory, wherein said first and second n-bit words are different;

inputting to said memory an n-bit code identifying said first address;

outputting said first n-bit word in response to inputting of said n-bit code identifying said first address;

inputting to said memory an n-bit code identifying said second address, wherein the n bits making up said n-bit code identifying said second address are derived from k bits of the n bits making up said first n-bit word, where k is an integer less than n;

outputting said second n-bit word in response to inputting of said n-bit code identifying said second address; and detecting at least one of said n bits making up said outputted second n-bit word having a position in said second n-bit word which does not correspond to the position of any one of said k bits making up said first n-bit word.

2. The method as defined in claim 1, further comprising the steps of:
- storing a third n-bit word at a third address of said memory, wherein said third n-bit word is different than each of said first and second n-bit words;
- inputting to said memory an n-bit code identifying said second address, wherein the n bits making up said n-bit code identifying said second address are not derived from said k bits of the n bits making up said first n-bit word;
- outputting said second n-bit word in response to inputting of said n-bit code identifying said second address;
- inputting to said memory an n-bit code identifying said third address, wherein the n bits making up said n-bit code identifying said third address comprise k bits of the n bits making up said second n-bit word;
- outputting said third n-bit word in response to inputting of said n-bit code identifying said third address; and
- detecting at least one of said n bits making up said outputted third n-bit word having a position in said third n-bit word which does not correspond to the position of any one of said k bits making up said second n-bit word.

3. The method as defined in claim 1, wherein n equals 8, k equals 5 and the number of said detected bits is 2.

4. The method as defined in claim 2, wherein n equals 8, k equals 5 and the number of said detected bits is 2.

5. The method as defined in claim 1, wherein said first n-bit word is derived from n bits of data output by an electro-optical mouse.

* * * * *